United States Patent
Fujita

(10) Patent No.: US 8,529,241 B2
(45) Date of Patent: Sep. 10, 2013

(54) METHOD FOR MANUFACTURING THERMOPLASTIC RESIN FILM, AND OPTICAL COMPENSATION FILM AND POLARIZATION PLATE FOR LIQUID CRYSTAL DISPLAY PANEL

(75) Inventor: Akihide Fujita, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 22 days.

(21) Appl. No.: 12/053,565

(22) Filed: Mar. 22, 2008

(65) Prior Publication Data
US 2008/0233310 A1    Sep. 25, 2008

(30) Foreign Application Priority Data

Mar. 22, 2007 (JP) ................................. 2007-075248
Aug. 17, 2007 (JP) ................................. 2007-213009

(51) Int. Cl.
*B29C 47/88* (2006.01)
(52) U.S. Cl.
USPC .......................................................... 425/367
(58) Field of Classification Search
CPC .................................................. B29C 47/886
USPC ................................................................ 425/367
See application file for complete search history.

(56) References Cited

U.S. PATENT DOCUMENTS

| | | | |
|---|---|---|---|
| 5,149,481 A * | 9/1992 | Gross et al. | 264/210.2 |
| 5,158,724 A * | 10/1992 | Yagi et al. | 264/40.1 |
| 5,219,510 A | 6/1993 | Machell et al. | |
| 5,288,715 A | 2/1994 | Machell et al. | |
| 6,773,649 B2 * | 8/2004 | Bourne et al. | 264/210.2 |
| 2005/0186360 A1 * | 8/2005 | Oya et al. | 428/1.1 |
| 2006/0227695 A1 * | 10/2006 | Nagaoka | 369/275.1 |
| 2007/0126144 A1 * | 6/2007 | Jin et al. | 264/210.2 |

FOREIGN PATENT DOCUMENTS

| | | | |
|---|---|---|---|
| EP | 0899081 A | * | 3/1999 |
| JP | 06-501040 A | | 2/1994 |
| JP | 11-235747 A | | 8/1999 |
| JP | 2000-280315 A | | 10/2000 |
| JP | 2006-327160 A | | 12/2006 |
| WO | 92/05213 A1 | | 4/1992 |

OTHER PUBLICATIONS

Machine translation of JP 200-280315 to Kawada, original made of record by IDS May 4, 2012.*

(Continued)

*Primary Examiner* — Yogendra Gupta
*Assistant Examiner* — Alison Hindenlang
(74) *Attorney, Agent, or Firm* — Sughrue Mion, PLLC

(57) ABSTRACT

In an aspect of the present invention, since the maximum linear pressure when a sheet-like melted resin is nipped between an elastic roller and a cooling roller is controlled at 0.3 MPa to 3 MPa, the development of retardation in film forming can be prevented. According to the aspect, since an elastic roller and a cooling roller are rotated at nearly the same speed with the periphery speed ratio thereof at 0.99 to 1.01, a sheet-like melted resin can be transported without applying a stress caused by a rotation difference between the rollers, whereby the development of retardation on the unstretched thermoplastic resin film can be prevented. Further, since the surface temperature of a cooling roller is controlled so as to be 0.01° C. to 30° C. higher than that of an elastic roller, a sheet-like melted resin is pulled toward the elastic roller side, whereby the development of retardation can be prevented.

8 Claims, 8 Drawing Sheets

(56) References Cited

OTHER PUBLICATIONS

Notification of Reasons for Rejection, dated Mar. 29, 2012, issued in corresponding JP Application No. 2007-213009, 6 pages in English and Japanese.

The Second Office Action, dated Dec. 4, 2012, issued in corresponding CN Application No. 200810086249.3, 17 pages in English and Chinese.

The Third Office Action, dated Apr. 23, 2013, issued in corresponding CN Application No. 200810086249.3, 19 pages in English and Chinese.

\* cited by examiner

FIG.5A

| TEST NO. | CELLULOSE ACYLATE SUBSTITUTION DEGREE | | | MOLECULAR WEIGHT (Mw) (×10,000) | SHEAR VISCOSITY (Pa·s) | EXTRUDABILITY | TG (°C) | ROLLER CONDITION | | | | | PERIPHERY SPEED RATIO (Vcd/Vtr) | SURFACE TEMPERATURE DIFFERENCE (°C) (Tcd-Ttr) | ROLLER LINEAR PRESSURE (MPa) |
| | ACETATE GROUP A | PROPIONATE GROUP B | A+B | | | | | ELASTIC ROLLER (Vtr) | | | COOLING ROLLER (Vcd) | | | | |
| | | | | | | | | SURFACE ROUGHNESS (nm) | OUTER CYLINDER THICKNESS (mm) | ROLLER TEMPERATURE (°C) | SURFACE ROUGHNESS (nm) | ROLLER TEMPERATURE (°C) | | | |
|---|---|---|---|---|---|---|---|---|---|---|---|---|---|---|---|
| 1  | 0.2 | 2.7 | 2.9 | 5.0  | 80   | GOOD        | 135 | 25  | 2   | 125 | 25 | 130 | 1     | 5  | 0.8  |
| 2  | 0.2 | 2.7 | 2.9 | 7.0  | 200  | GOOD        | 135 | 25  | 2   | 125 | 25 | 130 | 1     | 5  | 0.8  |
| 3  | 0.2 | 2.7 | 2.9 | 10.0 | 490  | GOOD        | 135 | 50  | 2   | 125 | 25 | 130 | 1     | 5  | 0.8  |
| 4  | 0.2 | 2.7 | 2.9 | 13.0 | 990  | GOOD        | 135 | 25  | 2   | 125 | 25 | 130 | 1     | 5  | 0.8  |
| 5  | 0.2 | 2.7 | 2.9 | 17.0 | 1930 | GOOD        | 135 | 25  | 2   | 125 | 25 | 130 | 1     | 5  | 0.8  |
| 6  | 0.2 | 2.7 | 2.9 | 20.0 | 2780 | NEARLY GOOD | 135 | 25  | 2   | 125 | 25 | 130 | 1     | 5  | 0.8  |
| 7  | 0.2 | 2.7 | 2.9 | 24.0 | 3920 | BAD         | 135 | 25  | 2   | 125 | 25 | 130 | 1     | 5  | 0.8  |
| 8  | 0.2 | 2.7 | 2.9 | 13.0 | 990  | GOOD        | 135 | 125 | 2   | 125 | 25 | 130 | 1     | 5  | 0.8  |
| 9  | 0.2 | 2.7 | 2.9 | 13.0 | 990  | GOOD        | 135 | 200 | 2   | 125 | 25 | 130 | 1     | 5  | 0.8  |
| 10 | 0.2 | 2.7 | 2.9 | 13.0 | 990  | GOOD        | 135 | 25  | 2   | 135 | 25 | 130 | 1     | -5 | 0.8  |
| 11 | 0.2 | 2.7 | 2.9 | 13.0 | 990  | GOOD        | 135 | 25  | 2   | 135 | 25 | 134 | 1     | -1 | 0.8  |
| 12 | 0.2 | 2.7 | 2.9 | 13.0 | 990  | GOOD        | 135 | 25  | 2   | 134 | 25 | 135 | 1     | 1  | 0.8  |
| 13 | 0.2 | 2.7 | 2.9 | 13.0 | 990  | GOOD        | 135 | 25  | 2   | 130 | 25 | 135 | 1     | 5  | 0.8  |
| 14 | 0.2 | 2.7 | 2.9 | 13.0 | 990  | GOOD        | 135 | 25  | 2   | 115 | 25 | 135 | 1     | 20 | 0.8  |
| 15 | 0.2 | 2.7 | 2.9 | 13.0 | 990  | GOOD        | 135 | 25  | 2   | 100 | 25 | 135 | 1     | 35 | 0.8  |
| 16 | 0.2 | 2.7 | 2.9 | 13.0 | 990  | GOOD        | 135 | 25  | 2   | 125 | 25 | 130 | 0.98  | 5  | 0.8  |
| 17 | 0.2 | 2.7 | 2.9 | 13.0 | 990  | GOOD        | 135 | 25  | 2   | 120 | 25 | 120 | 0.995 | 5  | 0.8  |
| 18 | 0.2 | 2.7 | 2.9 | 13.0 | 990  | GOOD        | 135 | 25  | 2   | 115 | 25 | 120 | 1.005 | 5  | 0.8  |
| 19 | 0.2 | 2.7 | 2.9 | 13.0 | 990  | GOOD        | 135 | 25  | 2   | 90  | 25 | 90  | 1.02  | 5  | 0.8  |
| 20 | 0.2 | 2.7 | 2.9 | 13.0 | 990  | GOOD        | 135 | 25  | 0.1 | 125 | 25 | 130 | 1     | 5  | 0.15 |
| 21 | 0.2 | 2.7 | 2.9 | 13.0 | 990  | GOOD        | 135 | 25  | 2   | 125 | 25 | 130 | 1     | 5  | 0.6  |
| 22 | 0.2 | 2.7 | 2.9 | 13.0 | 990  | GOOD        | 135 | 25  | 2   | 125 | 25 | 130 | 1     | 5  | 2    |
| 23 | 0.2 | 2.7 | 2.9 | 13.0 | 990  | GOOD        | 135 | 25  | 8   | 125 | 25 | 130 | 1     | 5  | 4    |

FIG.5B

| TEST NO. | FILM FORMING SPEED (m/min) | FILM THICKNESS (μm) | Re (nm) | Rth (nm) | FILM STRENGTH | FILM HAZE | FILM FORMABILITY | OVERALL EVALUATION |
|---|---|---|---|---|---|---|---|---|
| 1 | 30 | 80 | 0.6 | 1 | × | ○ | △ | △ |
| 2 | 30 | 80 | 0.7 | 1.1 | △ | ○ | ○ | △ |
| 3 | 30 | 80 | 0.8 | 1.2 | ○ | ○ | ○ | ○ |
| 4 | 30 | 80 | 0.8 | 1.2 | ○ | ○ | ○ | ◎ |
| 5 | 30 | 80 | 0.9 | 1.5 | ○ | ○ | ○ | ○ |
| 6 | 30 | 80 | 1 | 1.6 | ○ | ○ | △ | △ |
| 7 | 30 | 80 | 1.4 | 2.1 | ○ | ○ | × | △ |
| 8 | 30 | 80 | MEASUREMENT IMPOSSIBLE | MEASUREMENT IMPOSSIBLE | ○ | × | ○ | × |
| 9 | 30 | 80 | MEASUREMENT IMPOSSIBLE | MEASUREMENT IMPOSSIBLE | ○ | × | ○ | × |
| 10 | 30 | 80 | 0.8 | 1.2 | ○ | ○ | × | × |
| 11 | 30 | 80 | 0.9 | 1.3 | ○ | ○ | × | × |
| 12 | 30 | 80 | 0.7 | 1 | ○ | ○ | ○ | ◎ |
| 13 | 30 | 80 | 1.1 | 1.8 | ○ | ○ | ○ | ◎ |
| 14 | 30 | 80 | 5.8 | 13.4 | ○ | ○ | ○ | △ |
| 15 | 30 | 80 | 7.8 | 21.4 | ○ | ○ | ○ | × |
| 16 | 30 | 80 | 17.6 | 31.2 | ○ | ○ | ○ | × |
| 17 | 30 | 80 | 1.3 | 1.9 | ○ | ○ | ○ | ○ |
| 18 | 30 | 80 | 1.2 | 2.1 | ○ | ○ | ○ | ○ |
| 19 | 30 | 80 | 18.2 | 29.4 | ○ | ○ | ○ | × |
| 20 | 30 | 80 | 0.7 | 0.8 | ○ | ○ | × | × |
| 21 | 30 | 80 | 0.8 | 1.2 | ○ | ○ | ○ | ◎ |
| 22 | 30 | 80 | 5.3 | 10.5 | ○ | ○ | ○ | ○ |
| 23 | 30 | 80 | 20.6 | 31.2 | ○ | ○ | ○ | × |

FIG.6A

TABLE-2

| TEST NO. | CYCLIC POLYOLEFIN KIND | CYCLIC POLYOLEFIN GRADE NO. | EXTRUSION TEMPERATURE (°C) | SHEAR VISCOSITY (Pa·s) | EXTRUDABILITY | TG (°C) | ELASTIC ROLLER (Vtr) SURFACE ROUGHNESS (nm) | ELASTIC ROLLER (Vtr) OUTER CYLINDER THICKNESS (mm) | ELASTIC ROLLER (Vtr) ROLLER TEMPERATURE (°C) | COOLING ROLLER (Vcd) SURFACE ROUGHNESS (nm) | COOLING ROLLER (Vcd) ROLLER TEMPERATURE (°C) | PERIPHERY SPEED RATIO (Vcd/Vtr) | SURFACE TEMPERATURE DIFFERENCE (°C) (Tcd-Ttr) | ROLLER LINEAR PRESSURE (MPa) | FILM FORMING SPEED (m/min) |
|---|---|---|---|---|---|---|---|---|---|---|---|---|---|---|---|
| 24 | ZEONOR | ZF-14 | 260 | 860 | GOOD | 138 | 25 | 2 | 125 | 25 | 130 | 1 | 5 | 0.8 | 30 |
| 25 | ZEONOR | ZF-14 | 260 | 860 | GOOD | 138 | 50 | 2 | 125 | 25 | 130 | 1 | 5 | 0.8 | 30 |
| 26 | ZEONOR | ZF-14 | 260 | 860 | GOOD | 138 | 125 | 2 | 125 | 25 | 130 | 1 | 5 | 0.8 | 30 |
| 27 | ZEONOR | ZF-14 | 260 | 860 | GOOD | 138 | 200 | 2 | 125 | 25 | 130 | 1 | 5 | 0.8 | 30 |
| 28 | ZEONOR | ZF-14 | 260 | 860 | GOOD | 138 | 25 | 2 | 135 | 25 | 130 | 1 | -5 | 0.8 | 30 |
| 29 | ZEONOR | ZF-14 | 260 | 860 | GOOD | 138 | 25 | 2 | 135 | 25 | 134 | 1 | -1 | 0.8 | 30 |
| 30 | ZEONOR | ZF-14 | 260 | 860 | GOOD | 138 | 25 | 2 | 134 | 25 | 135 | 1 | 1 | 0.8 | 30 |
| 31 | ZEONOR | ZF-14 | 260 | 860 | GOOD | 138 | 25 | 2 | 130 | 25 | 135 | 1 | 5 | 0.8 | 30 |
| 32 | ZEONOR | ZF-14 | 260 | 860 | GOOD | 138 | 25 | 2 | 115 | 25 | 135 | 1 | 20 | 0.8 | 30 |
| 33 | ZEONOR | ZF-14 | 260 | 860 | GOOD | 138 | 25 | 2 | 100 | 25 | 135 | 1 | 35 | 0.8 | 30 |
| 34 | ZEONOR | ZF-14 | 260 | 860 | GOOD | 138 | 25 | 2 | 125 | 25 | 130 | 0.98 | 5 | 0.8 | 30 |
| 35 | ZEONOR | ZF-14 | 260 | 860 | GOOD | 138 | 25 | 2 | 120 | 25 | 120 | 0.995 | 5 | 0.8 | 30 |
| 36 | ZEONOR | ZF-14 | 260 | 860 | GOOD | 138 | 25 | 2 | 115 | 25 | 120 | 1.005 | 5 | 0.8 | 30 |
| 37 | ZEONOR | ZF-14 | 260 | 860 | GOOD | 138 | 25 | 2 | 90 | 25 | 90 | 1.02 | 5 | 0.8 | 30 |
| 38 | ZEONOR | ZF-14 | 260 | 860 | GOOD | 138 | 25 | 0.1 | 125 | 25 | 130 | 1 | 5 | 0.15 | 30 |
| 39 | ZEONOR | ZF-14 | 260 | 860 | GOOD | 138 | 25 | 8 | 125 | 25 | 130 | 1 | 5 | 0.6 | 30 |
| 40 | ZEONOR | ZF-14 | 260 | 860 | GOOD | 138 | 25 | 2 | 125 | 25 | 130 | 1 | 5 | 2 | 30 |
| 41 | ZEONOR | ZF-14 | 260 | 860 | GOOD | 138 | 25 | 2 | 125 | 25 | 130 | 1 | 5 | 4 | 30 |
| 42 | TOPAS | 6031 | 260 | 740 | GOOD | 136 | 25 | 2 | 125 | 25 | 130 | 1 | 5 | 0.8 | 30 |
| 43 | TOPAS | 6031 | 260 | 740 | GOOD | 136 | 50 | 2 | 125 | 25 | 130 | 1 | 5 | 0.8 | 30 |
| 44 | TOPAS | 6031 | 240 | 2750 | SLIGHTLY BAD | 136 | 25 | 2 | 125 | 25 | 130 | 1 | 5 | 0.8 | 30 |
| 45 | TOPAS | 6031 | 240 | 2750 | SLIGHTLY BAD | 136 | 50 | 2 | 125 | 25 | 130 | 1 | 5 | 0.8 | 30 |
| 46 | TOPAS | 5031 | 260 | 270 | GOOD | 136 | 25 | 2 | 125 | 25 | 130 | 1 | 5 | 0.8 | 30 |
| 47 | TOPAS | 5031 | 260 | 270 | GOOD | 136 | 50 | 2 | 125 | 25 | 130 | 1 | 5 | 0.8 | 30 |
| 48 | TOPAS | 5031 | 240 | 660 | GOOD | 136 | 25 | 2 | 125 | 25 | 130 | 1 | 5 | 0.8 | 30 |
| 49 | TOPAS | 5031 | 240 | 660 | GOOD | 136 | 50 | 2 | 125 | 25 | 130 | 1 | 5 | 0.8 | 30 |

FIG.6B

TABLE-2

| TEST NO. | FILM THICKNESS (μm) | Re (nm) | Rth (nm) | FILM STRENGTH | FILM HAZE | FILM FORMABILITY | OVERALL EVALUATION |
|---|---|---|---|---|---|---|---|
| 24 | 80 | 1.1 | 3.4 | O | O | O | ◎ |
| 25 | 80 | 1.4 | 3.7 | O | O | O | ◎ |
| 26 | 80 | MEASUREMENT IMPOSSIBLE | MEASUREMENT IMPOSSIBLE | O | × | O | × |
| 27 | 80 | MEASUREMENT IMPOSSIBLE | MEASUREMENT IMPOSSIBLE | O | × | O | × |
| 28 | 80 | 1.5 | 4.2 | O | O | × | × |
| 29 | 80 | 1.1 | 5.3 | O | O | × | × |
| 30 | 80 | 1.2 | 5.8 | O | O | O | ◎ |
| 31 | 80 | 1.8 | 7.6 | O | O | O | ◎ |
| 32 | 80 | 6.4 | 11.4 | O | O | O | △ |
| 33 | 80 | 8.3 | 19.4 | O | O | O | × |
| 34 | 80 | 18.9 | 28.7 | O | O | O | × |
| 35 | 80 | 1.2 | 5.4 | O | O | O | O |
| 36 | 80 | 1.4 | 3.9 | O | O | O | O |
| 37 | 80 | 19.7 | 29.4 | O | O | O | × |
| 38 | 80 | 0.8 | 3.4 | O | O | O | × |
| 39 | 80 | 0.9 | 4.2 | O | O | O | ◎ |
| 40 | 80 | 6.1 | 10.4 | O | O | O | O |
| 41 | 80 | 21.6 | 33.8 | O | O | O | × |
| 42 | 80 | 1.3 | 1.9 | O | O | O | O |
| 43 | 80 | 1.4 | 2.1 | △ | O | O | O |
| 44 | 80 | 4.3 | 9.4 | △ | O | O | △ |
| 45 | 80 | 4.6 | 10.1 | △ | O | O | △ |
| 46 | 80 | 0.5 | 1.2 | △ | O | △ | O |
| 47 | 80 | 0.8 | 1.4 | △ | O | △ | O |
| 48 | 80 | 0.5 | 1.2 | △ | O | O | O |
| 49 | 80 | 0.8 | 1.4 | △ | O | O | O |

METHOD FOR MANUFACTURING THERMOPLASTIC RESIN FILM, AND OPTICAL COMPENSATION FILM AND POLARIZATION PLATE FOR LIQUID CRYSTAL DISPLAY PANEL

BACKGROUND OF THE INVENTION

1. Field of the Invention

The present invention relates to a method for manufacturing a thermoplastic resin film, and an optical compensation film and a polarization plate for liquid crystal display panels, and particularly to a technology to manufacture by a melt-film forming method an unstretched thermoplastic resin film for a stretched thermoplastic resin film having a suitable quality for liquid crystal display panels.

2. Description of the Related Art

Thermoplastic resin films such as cellulose acylate films are formed by melting a thermoplastic resin and extruding the thermoplastic resin to a die by an extruder, and cooling and solidifying the melted resin as a sheet-like melted resin from the die. Then, the thermoplastic film formed as a film is stretched in the longitudinal (length) direction and in the transverse (width) direction to develop the in-plane retardation (Re) and the thickness-direction retardation (Rth), and is used as a retardation film for liquid crystal display elements, and is put into practice for enlarged viewing angle (for example, see National Publication of International Patent Application No. 6-501040).

Here is proposed a film forming apparatus of touch roll type in which thermoplastic resin films unstretched (prior to stretching) are manufactured by nipping a sheet-like melted resin discharged from a die between an elastic roller and a cooling roller. According to the film forming apparatus, a sheet-like melted resin can be planarly pressed by nipping the sheet-like melted resin between an elastic roller and a cooling roller, improving the precision in thickness of thermoplastic resin films.

SUMMARY OF THE INVENTION

However, conventional apparatuses have a problem of developing retardation in an unstretched thermoplastic resin film when the film forming speed is made high.

The present invention is achieved in consideration of such situations, and has an object to provide a manufacturing method of touch roll type of a thermoplastic resin film, which method can prevent the development of retardation in film forming, and provide an optical compensation film for liquid crystal display panels.

A first aspect of the present invention, for achieving the above-mentioned object, provides a manufacturing method of a thermoplastic resin film by a melt-film forming method in which a thermoplastic resin melted by an extruder is extruded as a sheet-like melted resin from a die, and the sheet-like melted resin is nipped between a metallic elastic roller and a cooling roller and cooled and solidified on the cooling roller, wherein the elastic roller and the cooling roller have an arithmetic average height Ra of their surfaces of not more than 100 nm; the periphery speed ratio (Vcd/Vtr) of the periphery speed Vtr of the elastic roller and the periphery speed Vcd of the cooling roller is 0.99 to 1.01; the difference (Tcd−Ttr) between the surface temperature Ttr of the elastic roller and the surface temperature Tcd of the cooling roller is 0.01° C. to 30° C.; and the maximum linear pressure when the sheet-like melted resin is nipped between the elastic roller and the cooling roller nip is 0.3 MPa to 3 MPa.

The present inventor has noticed, as a cause of developing retardation when the film forming speed is made high, a maximum linear pressure when a sheet-like melted resin is nipped between an elastic roller and a cooling roller, and found that controlling the maximum linear pressure at 0.3 to 3 MPa enables suppression of the development of retardation in film forming. Specifically, in the film forming method of touch roll type, the average linear pressure when a sheet-like melted resin is nipped between an elastic roller and a cooling roller is generally controlled, but the present inventor has found that not an average linear pressure but a maximum linear pressure has a larger influence on the development of retardation as the film forming speed is made higher.

The first aspect of the present invention has been achieved based on such a finding, and since the maximum linear pressure when a sheet-like melted resin is nipped between an elastic roller and a cooling roller is controlled at 0.3 MPa to 3 MPa, the development of retardation in film forming can be prevented.

According to the first aspect, since an elastic roller and a cooling roller are rotated at nearly the same speed with the periphery speed ratio thereof at 0.99 to 1.01, a sheet-like melted resin can be transported without applying a stress caused by a rotation difference between the rollers, whereby the development of retardation on the unstretched thermoplastic resin film can be prevented.

Further according to the first aspect, since the surface temperature of a cooling roller is controlled so as to be 0.01° C. to 30° C. higher than that of an elastic roller, a sheet-like melted resin is pulled toward the elastic roller side, whereby the development of retardation can be prevented.

A second aspect of the present invention has a feature that in the first aspect, the metallic elastic roller has a wall thickness Z of the outer cylinder thereof of 0.05 mm to 7.0 mm.

According to the second aspect, since a nipped sheet-like melted resin is cooled without an excess pressure being acted thereon due to a restoring force to restore the shape of the elastically deformed elastic roller to its original shape, the retardation due to residual strain is not generated, and an effect on improving image quality can be provided.

A third aspect of the present invention has a feature that in any of the first and second aspects, the cooling roller has a periphery speed thereof of not less than 20 m/min.

According to the third aspect, even if the periphery speed, i.e. the film forming speed, of a cooling roller is made high, in a film forming process section, retardation in a sheet-like melted resin due to residual strain is not generated.

A fourth aspect of the present invention has features that in any of the first to third aspects, the thermoplastic resin has a weight-average molecular weight of 70,000 to 200,000; and with "A" denoting a substitution degree of an acetyl group and "B" denoting a sun total of substitution degrees of acyl groups having 3 to 7 carbon atoms, the acyl group satisfies the following substitution degree: $2.0 \leq A+B \leq 3.0$, $0.0 \leq A \leq 2.0$, and $1.2 \leq B \leq 2.9$.

According to the fourth aspect, a thermoplastic resin film which has a low melting point, easy stretchability and excellent moisture-proofness, and does not generate retardation in the sheet-like melted resin due to residual strain in a film forming process section is provided.

A fifth aspect of the present invention has a feature that in any of the first to third aspects, the thermoplastic resin is a cyclic polyolefinic resin.

A sixth aspect of the present invention has a feature that in any of the first to fifth aspects, the thermoplastic resin has a zero-shear viscosity of not more than 2,000 Pa·s when the thermoplastic resin is discharged from the die.

According to the sixth aspect, since leveling between an elastic roller and a cooling roller is securely achieved because a sheet-like melted resin is provided with flexibility, a thermoplastic resin film which has an excellent image quality and no retardation generated can be provided in a film forming process section.

A seventh aspect of the present invention has features that in any of the first to sixth aspects, the thermoplastic resin film has a thickness of 20 μm to 300 μm, an in-plane retardation Re of not more than 20 nm, and an thickness-direction retardation Rth of not more than 20 nm.

According to the seventh aspect, a thermoplastic resin film which is used for optical applications such as liquid crystal displays can be provided.

An eighth aspect of the present invention provides an optical compensation film for liquid crystal displays which has a feature that the film uses as a base material a thermoplastic resin film manufactured by the manufacturing method according to any one of the first to seventh aspects.

According to the eighth aspect, a thermoplastic resin film used for optical applications such as liquid crystal displays can be provided.

A ninth aspect of the present invention provides a polarization plate which uses, as a protection film for a polarization layer, at least one sheet of a thermoplastic resin film manufactured by the manufacturing method according to any one of the first to seventh aspects.

According to the ninth aspect, a thermoplastic resin film used for applications to a protection film for a polarization layer can be provided.

According to the present invention, when a sheet-like melted resin is discharged from a die in the manufacturing method of a thermoplastic resin film by the melt-film forming method, the film forming process stage can avoid generating residual strain and developing retardation in the sheet-like melted resin.

Further, according to the present invention, a thermoplastic resin film used for optical applications such as liquid crystal displays can be provided.

BRIEF DESCRIPTION OF THE DRAWINGS

FIGS. 5A and 5B are tables showing results of Examples; and

FIGS. 6A and 6B are tables showing results of Examples.

DETAILED DESCRIPTION OF THE PREFERRED EMBODIMENTS

Hereinafter, preferable embodiments of the manufacturing method of a thermoplastic resin film, an optical compensation film and a polarization plate according to the present invention will be described referring to the accompanying drawings. Here in the embodiments, examples of manufacturing cellulose acylate films will be shown, but the scope of the present invention is not limited thereto, and includes applications to manufacture of thermoplastic resin films other than cellulose acylate films.

Figure 1:
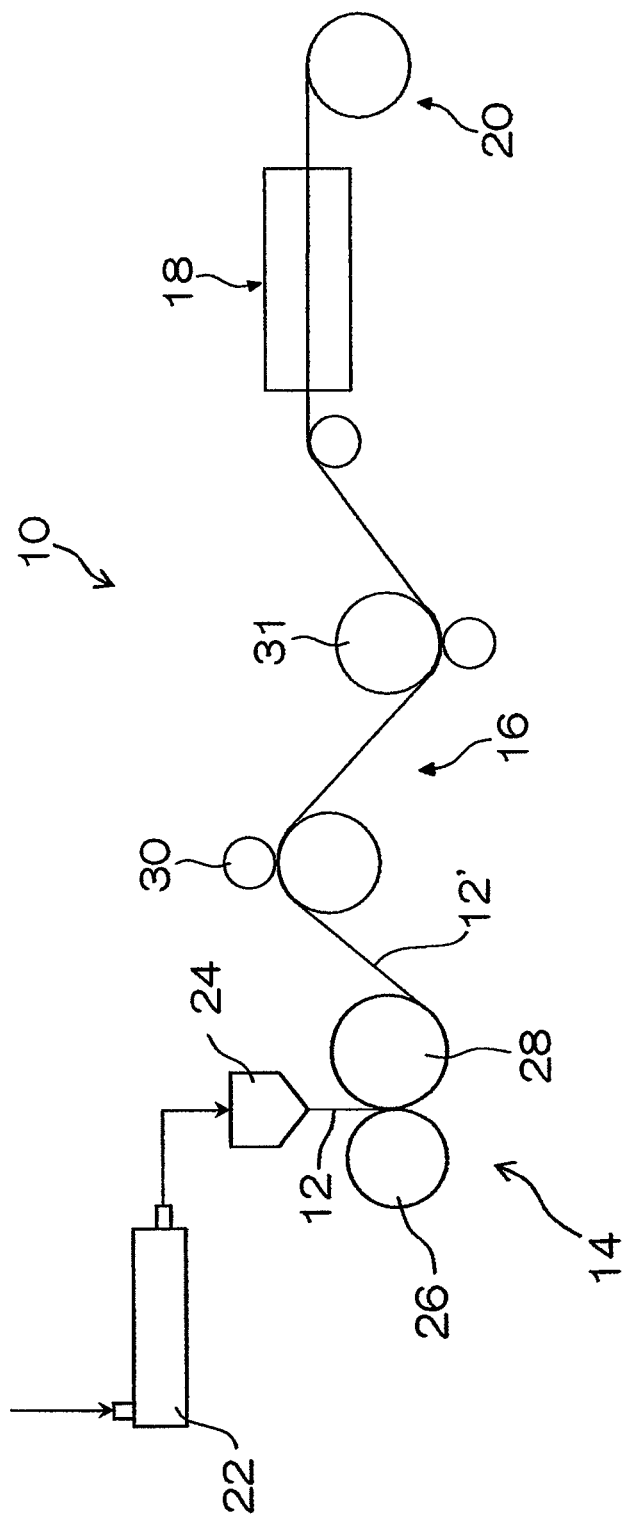
FIG. 1 is a constitution diagram of a film manufacturing apparatus applied to the present invention.

FIG. 1 shows an example of an outline constitution of a manufacturing apparatus of a cellulose acylate film. As shown in FIG. 1, a manufacturing apparatus 10 is constituted mainly of a film forming process section 14 to manufacture an unstretched cellulose acylate film 12', a longitudinal stretching process section 16 to longitudinally stretch the cellulose acylate film 12' manufactured in the film forming process section 14, a transverse stretching process section 18 to transversely stretch the film 12', and a winding-up process section 20 to wind the stretched cellulose acylate film 12'.

In the film forming process section 14, a cellulose acylate resin melted in an extruder 22 is discharged in a sheet-like form from a die 24, and is fed to between a rotating elastic roller 26 and a rotating cooling roller 28. Then, the cellulose acylate film 12' cooled and solidified on the cooling roller 28 is peeled off the cooling roller 28, and thereafter, the film 12' is transported to the longitudinal stretching process section 16 and the transverse stretching process section 18 in turn, and wound up in a roll shape on the winding-up process section 20. Thereby, a stretched cellulose acylate film 12' is manufactured. Hereinafter, each process section will be described in detail.

Figure 2:
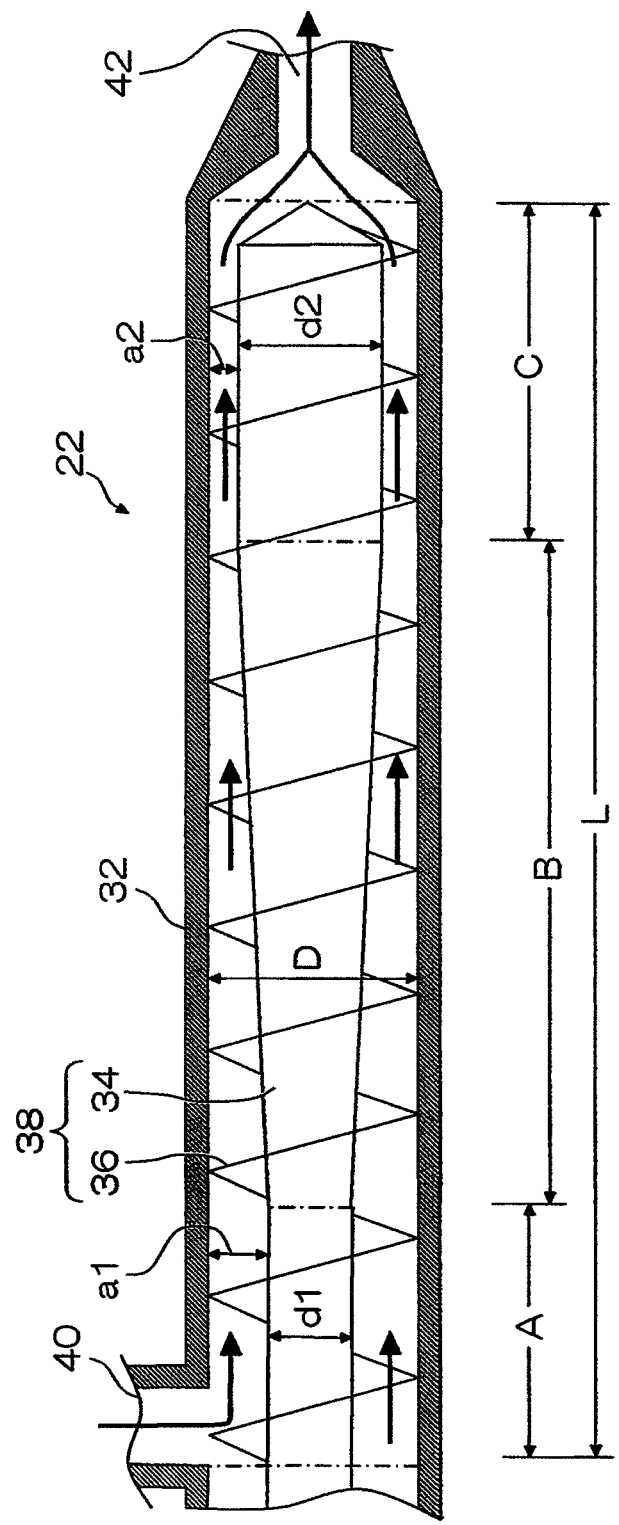
FIG. 2 is a schematic diagram showing a constitution of an extruder.

FIG. 2 shows the extruder 22 of a single screw in the film forming process section 14. As shown in FIG. 2, a single screw 38 having a screw shaft 34 and a flight 36 thereon are arranged in a cylinder 32. A cellulose acylate resin is fed from a hopper not shown in the figure through a feed port 40 into the cylinder 32. The interior of the cylinder 32 is constituted, in order from the feed port 40 side, of a feed portion (a region shown as A) to quantitatively transport the cellulose acylate resin fed from the feed port 40, a compression portion (a region shown as B) to knead and compress the cellulose acylate resin, and a metering portion (a region shown as C) to meter the kneaded and compressed cellulose acylate resin. The cellulose acylate resin melted in the extruder 22 is continuously transported from a discharge port 42 to a die 24.

The screw compression ratio of the extruder 22 is set at 2.5 to 4.5; the L/D thereof is set at 20 to 50. Here, the screw compression ratio is expressed in terms of volume ratio of the feed portion A to the metering portion C, i.e. a volume per unit length of the feed portion A/a volume per unit length of the metering portion C, and is calculated using an outer diameter d1 of the screw shaft 34 of the feed portion A, an outer diameter d2 of the screw shaft 34 of the metering portion C, a groove diameter a1 of the feed portion A and a groove diameter a2 of the metering portion C. The L/D refers to the ratio of a cylinder inner diameter (D) to a cylinder length (L). The extruding temperature is set at 190 to 240° C. In the case where the temperature in the extruder 22 exceeds 240° C., a chiller (not shown in the figure) is preferably installed between the extruder 22 and the die 24.

The extruder 22 may be a single screw extruder or a twin screw extruder, but too small a screw compression ratio of less than 2.5 leads to insufficient kneading, generation of unmelted parts, insufficient melting of crystals due to small shearing heat generation, and easily leaves fine crystals in the cellulose acylate film after manufacture, and further, easily results in entrainment of bubbles. Thereby, when the cellulose acylate film 12' is stretched, the residual crystals left inhibit the stretchability, not enabling to sufficiently enhance the orientation. By contrast, too large a screw compression ratio of more than 4.5 easily deteriorates the resin by heat generation due to too large a shearing stress imparted, easily bringing about yellowing in the cellulose acylate film after manufacture. Too large a shearing stress imparted causes the molecular scission and reduces the molecular weight, reducing the mechanical strength of the film. Therefore, for hardly exhibiting yellowing in the cellulose acylate film after manufacture and hardly causing stretching rupture, the screw compression ratio is preferably in the range of 2.5 to 4.5, more preferably 2.8 to 4.2, particularly preferably 3.0 to 4.0.

Too small an L/D of less than 20 leads to insufficient melting and insufficient kneading, easily leaving fine crystals in the cellulose acylate film after manufacture as in the case of the small compression ratio. By contrast, too large an L/D of more than 50 brings about too long a residence time of the cellulose acylate resin in the extruder 22, easily causing deterioration of the resin. The long residence time causes molecular scission and reduces the molecular weight, reducing the mechanical strength. Therefore, for hardly exhibiting yellowing in the cellulose acylate film after manufacture and hardly causing stretching rupture, the L/D is preferably in the range of 20 to 50, more preferably 22 to 45, particularly preferably 24 to 40.

Too low an extruding temperature of less than 190° C. results in insufficient melting of crystals, easily leaves fine crystals in the cellulose acylate film after manufacture, and inhibits stretchability when the cellulose acylate film is stretched, not enabling to sufficiently enhance the orientation. By contrast, too high an extruding temperature exceeding 240° C. deteriorates the cellulose acylate resin and degrades the degree of yellowing (YI value). Therefore, for hardly exhibiting yellowing in the cellulose acylate film after manufacture and hardly causing stretching rupture, the extruding temperature is preferably 190° C. to 240° C., more preferably in the range of 195° C. to 235° C., particularly preferably 200° C. to 230° C.

Figure 3:
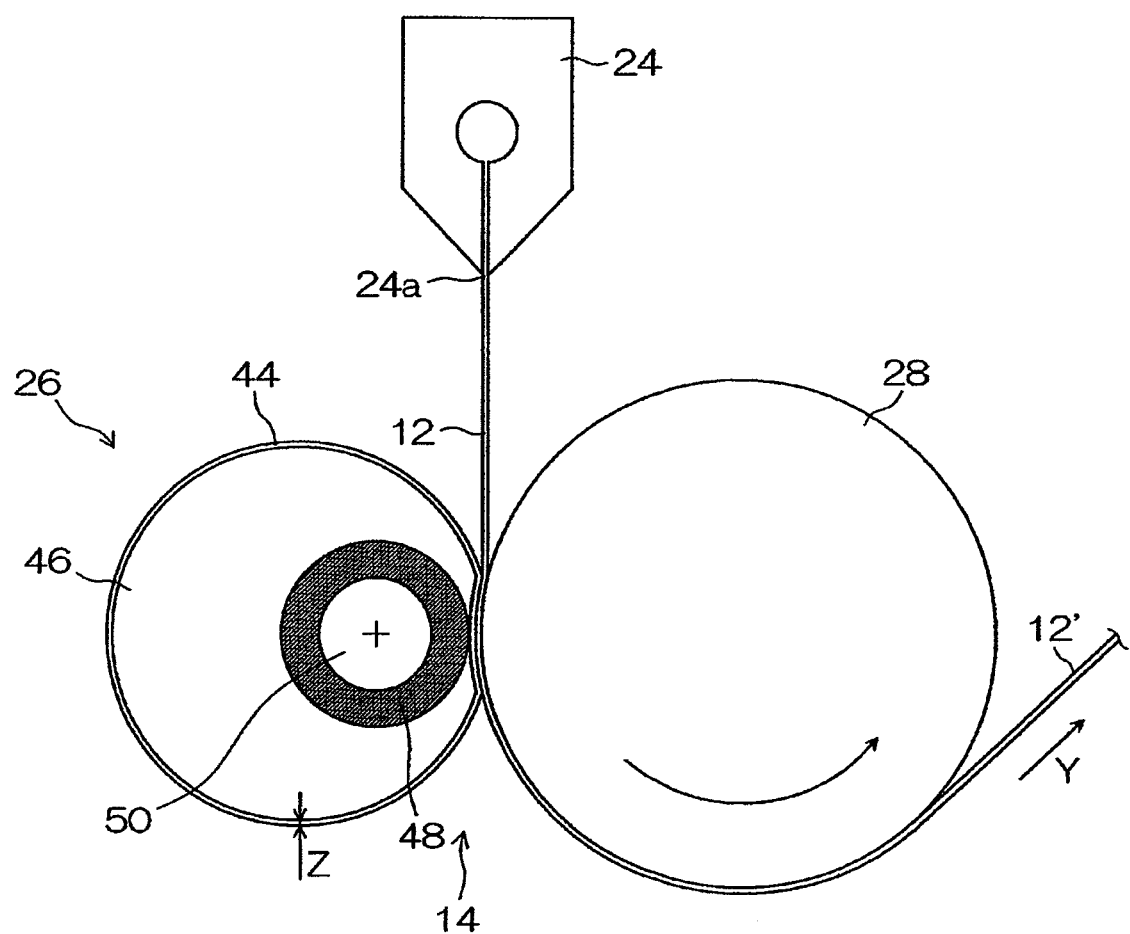
FIG. 3 is a schematic diagram showing a film forming process section.

The cellulose acylate film is melted using the extruder 22 constituted as described above; the melted resin is continuously fed to the die 24, and discharged in a sheet-like form from the tip end (lower end) of the die 24. Then, the discharged sheet-like melted resin 12 is fed between the elastic roller 26 and the cooling roller 28 as shown in FIG. 3. Herein, the cellulose acylate resin when discharged has preferably a zero-shear viscosity of not more than 2,000 Pa·s. With the zero-shear viscosity exceeding 2,000 Pa·s, the melted resin discharged from the die largely extends right after its discharge and easily attaches to the tip end of the die, thereby causing stains and easily generating streak trouble.

FIG. 3 shows an enlarged diagram of the vicinity of a nip roller in the embodiment. The elastic roller 26 and the cooling roller 28 have a mirror surface or a near-mirror surface, and the surfaces are processed to a mirror surface having an arithmetic average height Ra of not more than 100 nm, preferably not more than 50 nm, more preferably not more than 25 nm.

The periphery speed Vtr of the elastic roller 26 and the periphery speed Vcd of the cooling roller 28 are controlled by their rotations such that the ratio Vcd/Vtr of the periphery speeds of the elastic roller 26 and the cooling roller 28 (hereinafter, referred to as "periphery speed ratio") becomes 0.99 to 1.01. That is, the periphery speeds of the elastic roller 26 and the cooling roller 28 are controlled so as to become nearly equal. The reason is that if there is a difference in periphery speed between the elastic roller 26 and the cooling roller 28, when the sheet-like melted resin 12 is nipped between the elastic roller 26 and the cooling roller 28, a shearing stress acts on the sheet-like melted resin 12 by the elastic roller 26 and the cooling roller 28, and a residual strain is generated inside the sheet-like melted resin 12.

The elastic roller 26 and the cooling roller 28 are constituted so as to control their surface temperatures. The surface temperatures can be controlled, for example, by circulating a liquid medium such as water inside the elastic roller 26 and the cooling roller 28.

The surface temperature Ttr of the elastic roller 26 and the surface temperature Tcd of the cooling roller 28 are controlled such that the temperature difference (Tcd−Ttr) becomes 0.01° C. to 30° C. The reason is that with the temperature difference of less than 0.01° C., when nipped, the sheet-like melted resin 12 is liable to be pulled toward the elastic roller 26 side, and a residual strain is generated inside the sheet-like melted resin 12, thus developing retardation in a film forming process stage. By contrast, with the temperature difference exceeding 30° C., since a difference in cooling between the front and back surfaces of the film due to temperature difference of rollers is generated, the residual strain is likely to increase, which is unpreferable.

The elastic roller 26 is formed with its diameter smaller than that of the cooling roller 28, and its surface is constituted of a metallic material.

The elastic roller 26 is constituted of a metallic cylinder (outer cylinder) 44 forming an outer shell, a liquid medium layer 46, an elastic body layer (inner cylinder) 48 and a metallic shaft 50 in this order from the outer layer. The metallic cylinder 44 and the elastic body layer 48 are rotated by the rotation of the cooling roller 28, bringing the cylinder 44 into contact with the elastic body layer 48 through the sheet-like melted resin 12. Thereby, when the sheet-like melted resin 12 is nipped between the elastic roller 26 and the cooling roller 28, the elastic roller 26 receives a reaction force from the cooling roller 28 through the sheet-like melted resin 12, and elastically deforms in a recessed shape profiling the surface of the cooling roller 28. Therefore, the sheet-like melted resin 12 is cooled by the cooling roller 28 while the elastic roller 26 and the cooling roller 28 surface-contact with the sheet-like melted resin 12 and the restoring force to restore the shape of the elastically deformed elastic roller 26 to its original shape presses planarly the nipped sheet-like melted resin 12. The metallic cylinder 44 is made of a metallic thin film, and preferably has a seamless structure with no welding seam. The metallic cylinder 44 preferably has a wall thickness Z in the range of 0.05 mm<Z<7.0 mm. This is because the outer cylinder wall thickness Z of the elastic roller 26 of less than 0.05 mm does not only provide any plane quality improving effect due to a small above-mentioned restoring force, but also weakens the roller strength. This is also because the wall thickness Z exceeding 7.0 mm does not exhibit an eliminating effect of the residual strain due to an insufficient elasticity. The wall thickness Z of the metallic cylinder 44 has no problem as long as satisfying 0.05 mm<Z<7.0 mm, but it is more preferably 0.2 mm<Z<5.0 mm.

Figure 4:
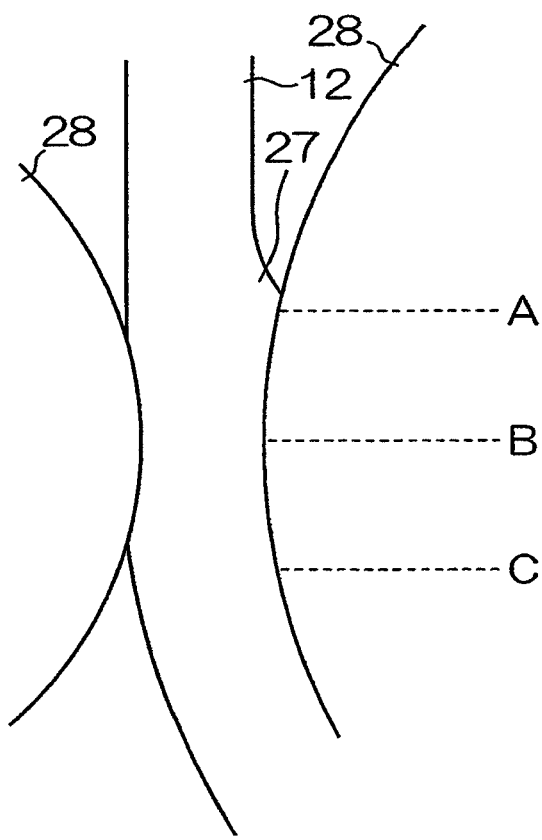
FIG. 4 is a schematic diagram illustrating a state between a pair of rollers in a film forming process section.

FIG. 4 is a schematic diagram illustrating a state in which the elastic roller 26 and the cooling roller 28 nip the sheet-like melted resin 12.

As shown in FIG. 4, the sheet-like melted resin 12 discharged form the die 24 forms a very small liquid bank 27 between the elastic roller 26 and the cooling roller 28 and the cellulose acylate resin is made to be of a film form while the thickness thereof is adjusted by being nipped between the elastic roller 26 and the cooling roller 28. At this time, the elastic roller 26 receives a reaction force from the cooling roller 28 through the cellulose acylate resin, and elastically deforms in a recessed shape profiling the surface of the cooling roller 28, whereby the cellulose acylate resin is pressed planarly by the elastic roller 26 and the cooling roller 28.

Herein, a relationship of maximum linear pressures imparted on the sheet-like melted resin 12 pressed between the elastic roller 26 and the cooling roller 28, and film forming speeds will be described.

As shown in FIG. 4, in a plane traversing the sheet-like melted resin 12 in the nip portions, portions are donated as a nip portion A, a nip portion B and a nip portion C in the order from a portion nearest to the liquid bank 27.

The sheet-like melted resin 12, on having passed through the nip portion A, receives a linear pressure by the pressure from the elastic roller 26 and the cooling roller 28, and on having passed through the nip portion C, is relieved from the linear pressure by the pressure. When the sheet-like melted resin 12 passes through the vicinity of the nip portion B which is a portion where the gap between the elastic roller 26 and the cooling roller 28 in the nip portions becomes narrowest, the sheet-like melted resin 12 receives a largest linear pressure (maximum linear pressure). The difference in linear pressure between the maximum linear pressure and the linear pressures in the vicinities of the nip portion A and the nip portion C increases as the speed of the sheet-like melted resin 12 when passing through the nip portions, i.e. the film forming speed, increases. Therefore, for not generating the residual strain when the sheet-like melted resin 12 passes through the nip portions, especially in the case of a large film forming speed, the value of the maximum linear pressure must be given attention to suppress the value to a low one. That is, in the case of a large film forming speed, it is important that the value of a linear pressure (maximum linear pressure) acted when the sheet-like melted resin 12 passes through, especially, the vicinity of the nip portion B in the nip portions is suppressed to a low one.

Herein, in the present invention, the maximum linear pressure between the elastic roller 26 and the cooling roller 28 is controlled so as to become 0.3 MPa to 3 MPa. That is because with the maximum linear pressure of less than 0.3 MPa, the pressing force is insufficient, leading to insufficient leveling and generating unevenness in the film thickness, and, that is because, by contrast, with the pressure exceeding 3 MPa, the sheet-like melted resin 12 passing through the nip portions between the elastic roller 26 and the cooling roller 28 generates a residual strain. For measuring the maximum linear pressure, the linear pressure distribution between the rollers is measured using a pressure-sensitive paper. For controlling the maximum linear pressure within the above-mentioned range, not only the pressure to make the rollers nip, but also the outer cylinder wall thickness of the elastic roller and the length where the rollers contact with each other are adjusted to enable the control.

In the present invention, the film forming speed Y (m/min) of the cellulose acylate resin is preferably not less than 20 m/min, more preferably 25 m/min to 80 m/min, still more preferably 30 m/min to 70 m/min.

According to the embodiments as described above, since especially the value of the maximum linear pressure the sheet-like melted resin 12 receives particularly when the sheet-like melted resin 12 discharged from the die 24 is nipped and leveled between the elastic roller 26 and the cooling roller 28 in the film forming process section 14 is given attention, and the maximum linear pressure is controlled at a predetermined value, the cellulose acylate film 12' in which no retardation is developed can be manufactured in the film forming process section 14, i.e. before stretching.

Further, according to the embodiments, the cellulose acylate film 12' which has a film thickness of 20 to 300 μm, an in-plane retardation Re of not more than 20 nm, and a thickness-direction retardation Rth of not more than 20 nm can be manufactured.

The retardations Re and Rth are determined by the following expressions:

$$Re(nm)=|n(MD)-n(TD)|\times T(nm)$$

$$Rth(nm)=|\{n(MD)+n(TD)/2\}-n(TH)|\times T(nm)$$

Wherein $n(MD)$, $n(TD)$ and $n(TH)$ denote refractive indexes in the longitudinal (flowing) direction, width direction and thickness direction, respectively; and T denotes a thickness expressed in nm.

Thereafter, the cellulose acylate film 12' nipped between the elastic roller 26 and the cooling roller 28 is wound up around and cooled by the metallic cooling roller 28, then peeled off the surface of the cooling roller 28, and transported to the poststage longitudinal stretching process section 16.

Hereinafter, thermoplastic resins, a film forming method of an unstretched thermoplastic resin film and a processing method of a thermoplastic film suitable for the present invention will be described in detail. The present invention can be suitably applied to cellulose acylate films and polyolefin films as thermoplastic films, and the films will be hereinafter described in turn.

(Cellulose Acylate Resins)

Cellulose acylates used in the present invention preferably have a weight-average molecular weight of 70,000 to 200,000, and the following features. Wherein, "A" denotes a substitution degree of an acetyl group; and "B" denotes the sum total of substitution degrees of acyl groups having 3 to 7 carbon atoms.

| | |
|---|---|
| $2.0 \leq A + B \leq 3.0$ | Expression (1) |
| $0 \leq A \leq 2.0$ | Expression (2) |
| $1.2 \leq B \leq 2.9$ | Expression (3) |

The cellulose acylates of the present invention have a feature that "A+B" satisfies 2.0 to 3.0 as shown in Expression (1). "A+B" is preferably 2.4 to 3.0, more preferably 2.5 to 2.95. "A+B" of less than 2.0 increases the hydrophilicity of the cellulose acylates and the moisture permeability of films thereof, which is unpreferable.

The numerical range expressed using "to" in the present specification means the range including the numerics described before and after "to" as the lower limit and the upper limit, respectively.

As shown in Expression (2), the cellulose acylates have a feature that "A" satisfies 0 to 2.0. "A" is preferably 0.05 to 1.8, more preferably 0.1 to 1.6.

The cellulose acylates have a feature that "B" shown in Expression (3) satisfies 1.2 to 2.9. "B" is preferably 1.3 to 2.9, more preferably 1.4 to 2.9, still more preferably 1.5 to 2.9.

It is preferable that in the case where ½ or more of "B" is a propionyl group, $2.4 \leq A+B \leq 3.0$ and $2.0 \leq B \leq 2.9$; and in the case where less than ½ of "B" is a propionyl group, $2.4 \leq A+B \leq 3.0$ and $1.3 \leq B \leq 2.5$. It is further preferable that in the case where ½ or more of "B" is a propionyl group, $2.5 \leq A+B \leq 2.95$ and $2.4 \leq B \leq 2.9$; and in the case where less than ½ of "B" is a propionyl group, $2.5 \leq A+B \leq 2.95$ and $1.4 \leq B \leq 2.0$.

The present invention has a feature that the substitution degree of an acetyl group occupying in acyl groups is made low and the sum total of substitution degrees of a propionyl group, butyryl group, pentanoyl group and hexanoyl group is made high. Thereby, changes in Re and Rth over time after stretching can be made small. This is because since employing more of these groups longer than an acetyl group can improve the flexibility and the stretchability of the film, the orientation of cellulose acylate molecules hardly becomes disordered along with the stretching, reducing changes over time in Re and Rth developed thereby. However, employing longer acyl groups than the above decreases too much the glass transition temperature (Tg) and elastic modulus, which is unpreferable. Therefore, a propionyl group, a butyryl group, a pentanoyl group and a hexanoyl group, which are larger than an acetyl group, are preferable, and a propionyl group and a butyryl group are more preferable.

The basic principle of synthesizing methods of these cellulose acylates is described in "Uda et al., Wood Chemistry, pp. 180-190 (Kyoritsu Shuppan Co., Ltd., 1968)", in Japanese. A typical synthesizing method is a liquid phase acylation method using a carboxylic anhydride-acetic acid-a sulfuric acid catalyst. Specifically, cellulose raw materials such as cotton linter and wood pulp are pre-treated with an appropriate amount of acetic acid, and thereafter, the pre-treated materials are charged in a mixed liquid for carboxylation previously cooled for esterification to synthesize a complete cellulose acylate (the total of substitution degrees of an acyl group for the 2-, 3- and 6-positions is nearly 3.00). The mixed liquid for carboxylation generally contains acetic acid as a solvent, carboxylic anhydride as an esterification agent, and sulfuric acid as a catalyst. Carboxylic anhydride is commonly used in a stoichiometrically more excess amount than the total of celluloses reacting with it and moisture present in the system. After the completion of the acylation reaction, for hydrolysis of excess carboxylic anhydride remaining in the system and for neutralization of a part of the esterification catalyst, an aqueous solution of a neutralizing agent (for example, a carbonate, acetate or oxide of calcium, magnesium, iron, aluminum or zinc) is added. Then, the obtained complete cellulose acylate is held at 50 to 90° C. in the presence of a small amount of an acylation reaction catalyst (generally, remaining sulfuric acid) for saponification and aging to be converted up to a cellulose acylate having a desired acyl substitution degree and a desired polymerization degree. The catalyst remaining in the system is completely neutralized using a neutralizing agent as described above at the time when the desired cellulose acylate has been obtained, or without the neutralization, the cellulose acylate solution is charged in water or a diluted sulfuric acid (or, water or a diluted sulfuric acid is charged in the cellulose acylate solution) to separate the cellulose acylate, and the separated cellulose acylate is subjected to washing and a stabilization treatment to obtain a cellulose acylate.

The cellulose acylates preferably used in the present invention have a viscosity-average polymerization degree of 150 to 600, preferably 160 to 500, further preferably 170 to 400, particularly preferably 180 to 300. The viscosity-average polymerization degree can be measured by the limiting viscosity method by Uda et al., (K. Uda, H. Saito, Journal of Fiber Science and Technology, Japan, Vol. 18, No. 1, pp. 105-120, 1962). The method is in detail described in Japanese Patent application Laid-Open No. 9-95538.

Control of such viscosity-average polymerization degree can be achieved also by removal of low molecular components. Removal of low molecular components raises the average molecular weight (polymerization degree), but the viscosity becomes lower than that of usual cellulose acylates, which is useful. Removal of low molecular components can be achieved by washing the cellulose acylate with an appropriate organic solvent. Further, polymerization methods can also control the molecular weight. For example, in the case of manufacturing a cellulose acylate containing a small amount of low molecular components, the amount of sulfuric acid catalyst in the acylation reaction is controlled preferably to be 0.5 to 25 parts by mass to 100 parts by mass of the cellulose. Controlling the sulfuric acid catalyst amount in the above range enables to synthesize a cellulose acylate preferable in view of the molecular weight distribution (uniform in the molecular weight distribution).

Cellulose acylates used in the present invention preferably have a ratio of the weight-average molecular weight Mw/the number-average molecular weight Mn of 1.5 to 5.5. Cellulose acylates having the ratio of further preferably 2.0 to 5.0, especially preferably 2.5 to 5.0, and most preferably 3.0 to 5.0, are used.

These cellulose acylates may be used singly or as a mixture of two or more. Further, polymeric components other than cellulose acylates may suitably be mixed. The polymeric components to be mixed are preferably ones having an excellent compatibility with cellulose esters, and cellulose acylate films made of the cellulose acylates and the polymeric components preferably have a transmissivity of not less than 80%, more preferably not less than 90%, still more preferably not less than 92%.

Further in the present invention, a plasticizer may be added. Addition of a plasticizer can not only reduce the crystal melting temperature (Tm) of cellulose acrylates, but also diminish changes over time in Re and Rth. This is because addition of a plasticizer hydrphobizes cellulose acylates and the relaxation of the stretching orientation of cellulose acylate molecules due to moisture absorption can be suppressed. However, since a plasticizer reduces the glass transition temperature of cellulose acylate films, and reduces the heat resisting temperature of the films themselves, the addition amount of the plasticizer is preferably as small as possible from the view point of the heat resistance of films.

The molecular weight of a plasticizer to be used is not especially limited, and may be low or high. The type of plasticizer includes phosphates, alkyl phthalyl alkyl glycolates, carboxylates and fatty acid esters of polyhydric alcohols. The form of these plasticizers may be solid or oily. That is, the melting point and the boiling point thereof are not especially limited. In the case of performing the melt-film formation, a plasticizer with nonvolatility may be particularly preferably used.

Specific examples of phosphates include triphenyl phosphate, tributyl phosphate, tributoxyethyl phosphate, tricresyl phosphate, trioctyl phosphate, trinaphthyl phosphate, trixylyl phosphate, trisortho-biphenyl phosphate, cresylphenyl phosphate, octyldiphenyl phosphate, biphenyldiphenyl phosphate and 1,4-phenylene-tetraphenyl phosphate. A phosphate plasticizer described in claims 3 to 7 in National Publication of International Patent Application No. 6-501040 also is preferably used.

Alkyl phthalyl alkyl glycolates include, for example, methyl phthalyl methyl glycolate, ethyl phthalyl ethyl glycolate, propyl phthalyl propyl glycolate, butyl phthalyl butyl glycolate, octyl phthalyl octyl glycolate, methyl phthalyl ethyl glycolate, ethyl phthalyl methyl glycolate, ethyl phthalyl propyl glycolate, methyl phthalyl butyl glycolate, ethyl phthalyl butyl glycolate, butyl phthalyl methyl glycolate, butyl phthalyl ethyl glycolate, propyl phthalyl butyl glycolate, butyl phthalyl propyl glycolate, methyl phthalyl octyl glycolate, ethyl phthalyl octyl glycolate, octyl phthalyl methyl glycolate and octyl phthalyl ethyl glycolate.

Carboxylates include, for example, phthalates such as dimethyl phthalate, diethyl phthalate, dibutyl phthalate, dioctyl phthalate and diethylhexyl phthalate, citrates such as acetyltrimethyl citrate, acetyltriethyl citrate and acetyltributyl citrate, adipates such as dimethyl adipate, dibutyladipate, diisobutyl adipate, bis(2-ethylhexyl) adipate, di-isodecyl adipate and bis(butyldiglycol adipate), aromatic polycarboxylates such as tetraoctyl pyromellitate and trioctyl trimellitate, aliphatic polycarboxylates such as dibutyl adipate, dioctyl adipate, dibutyl sebacate, dioctyl sebacate, diethyl azelate, dibutyl azelate and dioctyl azelate, and fatty acid esters of polyhydric alcohols such as glycerol triacetate, diglycerol tetraacetate, acetylated glycerides, monoglycerides and diglycerides. Besides, butyl oleate, methylacetyl ricinoleate, dibutyl sebacate, triacetin and the like are preferably used singly or concurrently.

Further, plasticizers include polymeric plasticizers such as: aliphatic polyesters derived from a glycol and a dibasic acid such as polyethylene adipate, polybutylene adipate, polyethylene succinate and polybutylene succinate; aliphatic polyesters derived from oxycarboxylic acids such as polylactic acid and polyglycolic acid; aliphatic polyesters derived from lactones such as polycaprolactone, polypropiolactone and polyvalerolactone; and vinyl polymers such as polyvinyl pyrrolidone. These plasticizers may be used singly or concurrently with a low molecular plasticizer.

The polyhydric alcoholic plasticizers are ones having a high compatibility with cellulose fatty acid esters and remarkably exhibiting the thermoplasticizing effect, including glycerol-based ester compounds such as glycerol esters and diglycerol esters, polyalkylene glycols such as polyethylene glycol and polypropylene glycol, and compounds in which an acyl group is bonded to a hydroxyl group of a polyalkylene glycol.

Specific glycerol esters include glycerol diacetate stearate, glycerol diacetate palmitate, glycerol diacetate mystyrate, glycerol diacetate laurate, glycerol diacetate caprate, glycerol diacetate nonanate, glycerol diacetate octanoate, glycerol diacetate heptanoate, glycerol diacetate hexanoate, glycerol diacetate pentanoate, glycerol diacetate oleate, glycerol acetate dicaprate, glycerol acetate dinonanate, glycerol acetate dioctanoate, glycerol acetate diheptanoate, glycerol acetate dicaproate, glycerol acetate divalerate, glycerol acetate dibutyrate, glycerol dipropionate caprate, glycerol dipropionate laurate, glycerol dipropionate mystyrate, glycerol dipropionate palmitate, glycerol dipropionate stearate, glycerol dipropionate oleate, glycerol tributyrate, glycerol tripentanoate, glycerol monopalmitate, glycerol monostearate, glycerol distearate, glycerol propionate laurate and glycerol oleate propionate, but are not limited thereto. These may be used singly or concurrently.

Among these, glycerol diacetate caprylate, glycerol diacetate pelargonate, glycerol diacetate caprate, glycerol diacetate laurate, glycerol diacetate myristate, glycerol diacetate palmitate, glycerol diacetate stearate and glycerol diacetate oleate are preferable. Specific examples of diglycerol esters include mixed acid esters of diglycerols, such as diglycerol tetraacetate, diglycerol tetrapropionate, diglycerol tetrabutyrate, diglycerol tetravalerate, diglycerol tetrahexanoate, diglycerol tetraheptanoate, diglycerol tetracaprylate, diglycerol tetrapelargonate, diglycerol tetracaprate, diglycerol tetralaurate, diglycerol tetramystyrate, diglycerol tetrapalmitate, diglycerol triacetate propionate, diglycerol triacetate butyrate, diglycerol triacetate valerate, diglycerol triacetate hexanoate, diglycerol triacetate heptanoate, diglycerol triacetate caprylate, diglycerol triacetate pelargonate, diglycerol triacetate caprate, diglycerol triacetate laurate, diglycerol triacetate mystyrate, diglycerol triacetate palmitate, diglycerol triacetate stearate, diglycerol triacetate oleate, diglycerol diacetate dipropionate, diglycerol diacetate dibutyrate, diglycerol diacetate divalerate, diglycerol diacetae dihexanoate, diglycerol diacetate diheptanoate, diglycerol diacetate dicaprylate, diglycerol diacetate dipelargonate, diglycerol diacetate dicaprate, diglycerol diacetate dilaurate, diglycerol diacetate dimystyrate, diglycerol diacetate dipalmitate, diglycerol diacetate distearate, diglycerol diacetate dioleate, diglycerol acetate tripropionate, diglycerol acetate tributyrate, diglycerol acetate trivalerate, diglycerol acetate trihexanoate, diglycerol acetate triheptanoate, diglycerol acetate tricaprylate, diglycerol acetate tripelargonate, diglycerol acetate tricaprate, diglycerol acetate trilaurate, diglycerol acetate trimystyrate, diglycerol acetate tripalmitate, diglycerol acetate tristearate, diglycerol acetate trioleate, diglycerol laurate, diglycerol stearate, diglycerol caprylate, diglycerol myristate and diglycerol oleate, but are not limited thereof. These may be used singly or concurrently.

Among these, diglycerol tetraacetate, diglycerol tetrapropionate, diglycerol tetrabutyrate, diglycerol tetracaprylate and diglycerol tetralaurate are preferable.

Specific examples of polyalkylene glycols include polyethylene glycol and polypropylene glycol having an average molecular weight of 200 to 1,000, but are not limited thereto. These may be used singly or concurrently.

Specific examples of compounds in which an acyl group is bonded to a hydroxyl group of polyalkylene glycols include polyoxyethylene acetate, polyoxyethylene propionate, polyoxyethylene butyrate, polyoxyethylene valerate, polyoxyethylene caproate, polyoxyethylene heptanoate, polyoxyethylene octanoate, polyoxyethylene nonanate, polyoxyethylene caprate, polyoxyethylene laurate, polyoxyethylene myristylate, polyoxyethylene palmitate, polyoxyethylene stearate, polyoxyethylene oleate, polyoxyethylene linolate, polyoxypropylene acetate, polyoxypropylene propionate, polyoxypropylene butyrate, polyoxypropylene valerate, polyoxypropylene caproate, polyoxypropylene heptanoate, polyoxypropylene octanoate, polyoxypropylene nonanate, polyoxypropylene caprate, polyoxypropylene laurate, polyoxypropylene myristylate, polyoxypropylene palmitate, polyoxypropylene stearate, polyoxypropylene oleate and polyoxypropylene linolate, but are not limited thereto. These may be used singly or concurrently.

The addition amount of a plasticizer is preferably 0 to 10% by weight, more preferably 0 to 8% by weight, most preferably 0 to 5% by weight.

With the content of a plasticizer of more than 10% by weight, although the thermal fluidity of cellulose acylates becomes good, the plasticizer oozes out on the surface of a melt formed film, and the glass transition temperature Tg, which reflects a heat resistance, decreases.

In the present invention, as a stabilizer for preventing thermal degradation and coloration, a phosphite-based compound, a phosphorous acid ester compound, a phosphate, a thiophosphate, a weak organic acid, an epoxy compound and the like may be added singly or as a mixture of two or more as required, in the range of not damaging performances required. As specific examples of phosphite-based stabilizers, compounds described in paragraphs [0023] to [0039] of Japanese Patent Application Laid-Open No. 2004-182979 can be more preferably used. As specific examples of phosphorous acid ester stabilizers, compounds described in Japanese Examined Application Publication Nos. 51-70316, 10-306175, 57-78431, 54-157159 and 55-13765 can be used.

The addition amount of a stabilizer in the present invention is preferably 0.005 to 0.5% by weight to a cellulose acylate, more preferably 0.01 to 0.4% by weight, still more preferably 0.05 to 0.3% by weight. The addition amount of less than 0.005% by weight is unpreferable because of insufficient effects on preventing degradation and suppressing coloration in melt-film forming. By contrast, the addition amount of not less than 0.5% by weight is unpreferable because of oozing of the stabilizer on the surface of a melt formed cellulose acylate film.

Additions of a deterioration preventing agent and an antioxidant are also preferable. Addition of a phenolic compound, thioether compound, phosphorus-based compound or the like as a degradation preventing agent or an antioxidant exhibits a synergistic effect on preventing degradation and oxidation. As other stabilizers, materials described in JIII Journal of Technical Disclosure (No. 2001-1745, issued on Mar. 15, 2001, Japan Institute of Invention and Innovation) can be preferably used.

The cellulose ester cellulose acylates of the present invention have a feature of containing an ultraviolet preventing agent, and may contain one type or at least two types of ultraviolet absorbents. Ultraviolet absorbents for liquid crystals are preferably those having an excellent ultraviolet absorption capability of not more than 380 nm in wavelength from the view point of preventing degradation of liquid crystals and exhibiting little absorption of visible light of not less than 400 nm in wavelength from the view point of displayability of liquid crystals. For example, the ultraviolet absorbents include oxybenzophenone compounds, benzotriazol compounds, salicylate compounds, benzophenone compounds, cyanoacrylate compounds and nickel complex salt compounds. Particularly preferable ultraviolet absorbents are benzotriazol compounds and benzophenone compounds. Among these, benzotriazole compounds are preferable because of little unnecessary coloration of cellulose ester cellulose acylates.

Preferable ultraviolet preventing agents include 2,6-di-tert-butyl-p-cresol, pentaerythrityl-tetrakis[3-(3,5-di-tert-butyl-4-hydroxyphenyl)propionate], triethylene glycol-bis[3-(3-tert-butyl-5-methyl-4-hydroxyphenyl)propionate], 1,6-hexandiol-bis[3-(3,5-di-tert-butyl-4-hydroxyphenyl) propionate], 2,4-bis-(n-octylthio)-6-(4-hydroxy-3,5-di-tert-butylanilino)-1,3,5-triazine, 2,2-thio-diethylenebis[3-(3,5-di-tert-butyl-4-hydroxyphenyl)propionate], octadecyl-3-(3, 5-di-tert-butyl-4-hydroxyphenyl)propionate, N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene and tris-(3,5-di-tert-butyl-4-hydroxybenzyl)-isocyanurate. Further, 2-(2'-hydroxy-5'-methylphenyl)benzotriazole, 2-(2'-hydroxy-3',5'-di-tert-buthylphenyl)benzotriazole, 2-(2'-hydroxy-3'-tert-butyl-5'-methylphenyl)benzotriazole, 2-(2'-hydroxy-3',5'-di-tert-buthylphenyl)-5-chlorobenzotriazole, 2-(2'-hydroxy-3'-(3'', 4'',5'',6''-tetrahydrophthalimidomethyl)-5'-methylphenyl) benzotriazole, 2,2-methylenebis(4-(1,1,3,3-tetramethylbutyl)-6-(2H-benzotriazol-2-yl)phenol), 2-(2'-hydroxy-3'-tert-butyl-5'-methylphenyl)-5-chlorobenzotriazole, 2-(2H-benzotriazol-2-yl)-6-(straight chain and side chain dodecyl)-4-methylphenol, octyl-3-[3-tert-butyl-4-hydroxy-5-(chloro-2H-benzotriazol-2-yl)phenyl]propionate, 2-ethylhexyl-3-[3-tert-butyl-4-hydroxy-5-(5-chloro-2H-benzotriazol-2-yl)phenyl]propionate and a mixture thereof, are preferably used. As ultraviolet absorbents, polymer ultraviolet absorbents, a polymer type ultraviolet absorbent described in Japanese Patent Application Laid-Open No. 6-148430 and the like are also preferably used.

Further, 2,6-di-tert-butyl-p-cresol, pentaerythrityl-tetrakis [3-(3,5-di-tert-butyl-4-hydroxyphenyl)propionate] and triethylene glycol-bis[3-(3-tert-butyl-5-methyl-4-hydroxyphenyl)propionate] are preferable. Besides, for example, hydrazine-based metal deactivating agents such as N,N'-bis [3-(3,5-di-tert-butyl-4-hydroxyphenyl)propionyl]hydrazine, and phosphorus-based processing stabilizers such as tris(2,4-di-tert-buthylphenyl)phosphite may be used concurrently with these compounds. The addition amount of these compounds is preferably 1 ppm to 3.0% in terms of mass proportion to a cellulose ester cellulose acylate, more preferably 10 ppm to 2%.

As these ultraviolet absorbents, the following commercially available ones can be utilized. Benzotriazole-based ones include TINUBIN P (Ciba Specialty Chemicals Corp.), TINUBIN 234 (Ciba Specialty Chemicals Corp.), TINUBIN 320 (Ciba Specialty Chemicals Corp.), TINUBIN 326 (Ciba Specialty Chemicals Corp.), TINUBEN 327 (Ciba Specialty Chemicals Corp.), TINUBIN 328 (Ciba Specialty Chemicals Corp.), and SUMISORB 340 (Sumitomo Chemical Co., Ltd.). Benzophenone-based ultraviolet absorbents include SEESORB 100 (Shipro Kasei Kaisha, Ltd.), SEESORB 101 (Shipro Kasei Kaisha, Ltd.), SEESORB 101S (Shipro Kasei Kaisha, Ltd.), SEESORB 102 (Shipro Kasei Kaisha, Ltd.), SEESORB 103 (Shipro Kasei Kaisha, Ltd.), ADK STAB LA-51 (Adeka Corp.), CHEMISORP 111 (Chemipro Kasei Kaisha, Ltd.), UVINUL D-49 (BASF AG). Oxalic acid anilide-based ultraviolet absorbents include TINUBIN 312 (Ciba Specialty Chemicals Corp.) and TINUBIN 315 (Ciba Specialty Chemicals Corp.). Salicylic acid-based ultraviolet absorbents include SEESORB 201 (Shipro Kasei Kaisha, Ltd.) and SEESORB 202 (Shipro Kasei Kaisha, Ltd.). Cyanoacrylate-based ultraviolet absorbents include SEESORB 501 (Shipro Kasei Kaisha, Ltd.) and UVINUL N-539 (BASF AG).

Further, other than plasticizers, various additives (for example, optical anisotropic control agents, microparticles, infrared absorbents, surfactants and odor trapping agents (amines)) can be added. As an infrared absorbing dye, for example, one described in Japanese Patent Application Laid-Open No. 2001-194522 can be used. As microparticles, those having an average particle size of 5 to 3,000 nm are preferably used and those composed of a metal oxide or a crosslinked polymer can be used, and are preferably contained in an amount of 0.001 to 5% by mass to a cellulose acylate.

An optical anisotropic control agent (Re developing agent) is preferably contained in an amount of 0 to 10% by mass to a cellulose acylate for controlling the retardation of the cellulose acylate film. As retardation enhancing agents, aromatic compounds having at least two aromatic rings are used. The aromatic compound having at least two aromatic rings is preferably a compound in which the at least two aromatic rings form the same plane as its molecular structure, and may be a rod-shaped compound. The aromatic rings of the aromatic compound contain an aromatic hetero ring in addition to an aromatic hydrocarbon ring. The aromatic hydrocarbon ring is particularly preferably a six-membered ring (i.e. benzene ring). The aromatic hetero ring is generally an unsaturated hetero ring. The aromatic hetero ring is preferably a five-, six- or seven-membered ring, more preferably a five- or six-membered ring. The aromatic hetero ring generally has a maximum number of double bonds. As a hetero atom, a nitrogen atom, an oxygen atom, and a sulfur atom are preferable, and a nitrogen atom is particularly preferable. Examples of aromatic hetero rings include a furan ring, a thiophene ring, a pyrrole ring, an oxazole ring, an isoxazol ring, a thiazole ring, an isothiazole ring, an imidazole ring, a pyrazole ring, a furazan ring, a triazole ring, a pyran ring, a pyridine ring, a pyridazine ring, a pyrimidine ring, a pyrazine ring and a 1,3,5-triazine ring. Aromatic rings preferably include a benzene ring, a furan ring, a thiophene ring, a pyrrole ring, an oxazole ring, a thiazole ring, an imidazole ring, a triazole ring, a pyridine ring, a pyrimidine ring, a pyrazine ring and a 1,3,5-triazine ring, more preferably a benzene ring and a 1,3,5-triazine ring. Aromatic compounds particularly preferably have at least a 1,3,5-triazine ring. As such retardation enhancing agents, those described in Japanese Patent Application Laid-Open Nos. 2000-275434, 2000-284124, 2001-13323, WO00/65384, etc. can be used.

(Melt-Film Forming)

(1) Drying

A cellulose acylate resin may be used in a powder form as it is, but is more preferably used in a pellet form for lessening the variation in thickness of film forming.

The cellulose acylate resin, after its moisture content is made to be not less than 0.02% by mass and not more than 2.0% by mass, more preferably not less than 0.03% by mass and not more than 1.5% by mass, still more preferably not less than 0.05% by mass and not more than 1.0% by mass, is charged in a hopper of an extruder. Since the cellulose acylate resin has a high hygroscopicity, and contains moisture exceeding 3 wt. % in a high temperature and high humidity condition, the moisture content must be previously controlled for extrusion. The contained moisture percentage of a cellulose acylate resin can be controlled by the drying temperature, the drying time and the dew point temperature of a dehumidifying air. Especially the influence of the drying temperature is large and lowering the drying temperature raises the contained moisture percentage. Further, although the adjustment of the drying time also can control the contained moisture percentage, since the unevenness in contained moisture percentage is likely to occur, the control by the drying temperature is preferable. Hence, a drying facility which allows a strict drying temperature control is needed. On the other hand, in the case where there arises a need for raising the contained moisture percentage, the contained moisture percentage can be controlled by circulating an air of a high humidity. At this time, the temperature of the hopper is set at not less than $Tg-50°$ C. and not more than $Tg+30°$ C., more preferably not less than $Tg-40°$ C. and not more than $Tg+10°$ C., still more preferably not less than $Tg-30°$ C. and not more than $Tg$. This allows the suppression of reabsorption of moisture in the hopper and the easier development of the drying efficiency. Additionally, a dehydrated air or an inert gas (for example, nitrogen) is more preferably blown into the hopper.

(2) Kneading and Extrusion

The cellulose acylate resin is kneaded and melted at not less than 180° C. and not more than 230° C., more preferably not less than 185° C. and not more than 225° C., still more preferably not less than 190° C. and not more than 220° C. At this time, the melting temperature may be imparted in a constant temperature, or may be controlled in several divided temperatures. The kneading time is preferably not less than 2 min and not more than 60 min, more preferably not less than 3 min and not more than 40 min, still more preferably not less than 4 min and not more than 30 min. Further, the kneading and extrusion is performed preferably in an inert gas flow (nitrogen or the like) inside an extruder, or while the extruder is being vacuum-evacuated using the extruder with a vent.

(3) Casting

The melted cellulose acylate resin is passed through a gear pump to eliminate the pulsation of the extruder, then filtered with a metallic mesh filter or the like, and extruded as a sheet-like form from a T-type die attached to the back of the filter onto a cooling drum. The extrusion may be performed in a monolayer, or in multilayer by using a multimanifold die or a feed block die. At this time, the unevenness in thickness in the width direction can be controlled by adjusting the interval of lips of the die.

Thereafter, the melted sheet is extruded onto the cooling drum. At this time, the adhesion of the cooling drum and the melt extruded sheet is preferably enhanced by using a method such as an electrostatic impressing method, air knife method, air chamber method, vacuum nozzle method or touch roll method. Such an adhesion enhancing method may be applied on the entire surface of the melt extruded sheet, or on parts thereof (for example, both edges only).

The temperature of the cooling drum is preferably not less than 60° C. and not more than 160° C., more preferably not less than 70° C. and not more than 150° C., still more preferably not less than 80° C. and not more than 140° C. Thereafter, the sheet is peeled off the cooling drum, passed through nip rollers and a tenter, and then wound up. The winding-up speed is preferably not less than 10 m/min and not more than 100 m/min, more preferably not less than 15 m/min and not more than 80 m/min, still more preferably not less than 20 m/min and not more than 70 m/min.

The film forming width is preferably not less than 1 m and not more than 5 m, more preferably not less than 1.2 m and not more than 4 m, still more preferably not less than 1.3 m and not more than 3 m. The unstretched cellulose acylate film thus obtained preferably has a thickness of not less than 30 μm and not more than 400 μm, more preferably not less than 40 μm and not more than 300 μm, still more preferably not less than 50 μm and not more than 200 μm.

Both edges of the cellulose acylate film thus obtained are trimmed, and preferably once wound up on a winder. The trimmed part may be crushed, or subjected to, as required, the granulating process, depolymerization process, repolymerization process or the like, and then recycled as a raw material for cellulose acylate films of the same class or a raw material for cellulose acylate films of different classes. Before the winding-up, attaching a lamifilm at least on one surface of the cellulose acylate film is preferable from the view point of preventing scratches.

The cellulose acylate film thus obtained preferably has a glass transition temperature (Tg) of not less than 70° C. and not more than 180° C., more preferably not less than 80° C. and not more than 160° C., still more preferably not less than 90° C. and not more than 150° C.

(Processing of the Cellulose Acylate Film)

The cellulose acylate film formed by the method described above is uniaxially or biaxially stretched by the method described above to fabricate a stretched cellulose acylate film. This may be used singly or in combination with a polarization plate, or may be provided thereon with a liquid crystal layer, a layer whose refractive index has been controlled (low refraction layer) or a hard coat layer to use. These can be obtained by the following processes.

(1) Surface Treatment

By subjecting the cellulose acylate film to a surface treatment, its adhesion with each functional layer (for example, an undercoat layer and a back layer) can be improved. For example, a glow discharge treatment, ultraviolet irradiation treatment, corona treatment, flame treatment, and acid or alkali treatment can be used. The glow discharge process mentioned herein preferably may use a low-temperature plasma which is generated in a low-pressure gas of $10^{-3}$ to $10^{-20}$ Torr, a plasma treatment in the atmospheric pressure is also preferable. The plasma-excited gas refers to a gas plasma-excited under the above-mentioned conditions, and includes argon, helium, neon, krypton, xenon, nitrogen, carbon dioxide, chlorofluorocarbons such as tetrafluoromethane, and a mixture thereof. These are in detail described on page 30 to page 32 in JIII Journal of Technical Disclosure (No. 2001-1745, issued on Mar. 15, 2001, Japan Institute of Invention and Innovation). The plasma treatment in the atmospheric pressure recently given attention uses an irradiation energy, for example, of 20 to 500 kGy under 10 to 1,000 keV, and more preferably uses an irradiation energy of 20 to 300 kGy under 30 to 500 keV. Particularly preferable among these is an alkali saponification treatment.

The alkali saponification treatment may be performed by immersing the cellulose acylate film in a saponifying liquid (immersion method), or by coating a saponifying liquid (coating method) on the cellulose acylate film. The immersion method is achieved by passing the cellulose acylate film through a bath of an aqueous solution of pH 10 to 14 containing NaOH, KOH or the like, heated at 20° C. to 80° C., for 0.1 min to 10 min, neutralizing, washing with water and drying the film.

The coating method to be used includes dip coating, curtain coating, extrusion coating, bar coating and E-type coating. A solvent to be selected for a coating liquid for alkali saponification treatment, since the saponifying liquid is applied on a transparent supporting body, preferably has a good wettability, and preferably can maintain the good planarity as it is without forming irregularities of the transparent supporting body surface by the solvent of the saponifying liquid. Specifically, the solvent is preferably an alcoholic solvent, particularly preferably isopropyl alcohol. An aqueous solution of a surfactant can also be used as a solvent. The alkali of an alkali saponification coating liquid is preferably an alkali to dissolve in the above-mentioned solvent, more preferably KOH and NaOH. The saponification coating liquid preferably has pH of not less than 10, more preferably not less than 12. The reaction condition on alkali saponification is preferably not less than 1 sec and not more than 5 min at room temperature, more preferably not less than 5 sec and not more than 5 min, particularly preferably not less than 20 sec and not more than 3 min. After the alkali saponification reaction, the saponifying liquid-applied surface is preferably washed with water or washed with water after washed with an acid. Further, the coating-type saponification treatment and an alignment oriented film process described later can be continuously performed, enabling to reduce the number of processes. These saponifying methods are specifically described, for example, in Japanese Patent Application Laid-Open No. 2002-82226 and WO02/46809.

Providing an undercoat layer for adhesion with a functional layer is preferable. The undercoat layer may be applied after the above-mentioned surface treatment, or with no surface treatment. The undercoat layer is in detail described on page 32 of JIII Journal of Technical Disclosure (No. 2001-1745, issued on Mar. 15, 2001, Japan Institute of Invention and Innovation).

These surface treatment and undercoat process may be incorporated as the last process of a film forming process, performed singly, or performed in a function imparting process described later.

(2) Imparting of Functional Layers

Combination of functional layers with the cellulose acylate film of the present invention is preferable which is in detail described on page 32 to page 45 of JIII Journal of Technical Disclosure (No. 2001-1745, issued on Mar. 15, 2001, Japan Institute of Invention and Innovation). Preferable among them are the imparting of a polarization layer (polarization plate), the imparting of an optical compensation layer (optical compensation sheet) and the imparting of a reflection preventing layer (reflection preventing film).

<Cyclic Polyolefinic Resins>

In the present invention, as a cyclic polyolefinic resin (cycloolefin resin), any of a cycloolefin resin A and a cycloolefin resin B described later can be preferably used.

(Cycloolefin Resins-A/Ring-Opening Polymerization Type)

Cycloolefinic resins (cycloolefin resins-A) used in the present invention include, for example, (1) a resin obtained by hydrogenating a ring-opened (co)polymer of a norbornenic monomer after subjecting it to a polymer modification such as maleic acid addition or cyclopentadiene addition, as required, (2) a resin obtained by addition polymerization of a norbornenic monomer, and (3) a resin obtained by addition polymerization of a norbornenic monomer with an olefinic monomer such as ethylene or an α-olefin. The polymerization and the hydrogenation can be performed by conventional methods.

The above-mentioned norbornenic monomer includes, for example, norbornene and its alkyl- and/or alkylidene-substituted compound, for example, 5-methyl-2-norbornene, 5-dimethyl-2-norbornene, 5-ethyl-2-norbornene, 5-butyl-2-norbornene and 5-ethylidene-2-norbornene, and a compound thereof substituted by a polar group such as a halogen; dicyclopentadiene and 2,3-dihydrodicyclopentadiene; dimethanooctahydronaphthalene, its alkyl- and/or alkylidene-substituted compound and a compound thereof substituted by a polar group such as a halogen, for example, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano 1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, 6-methoxycarbonyl-1,4:5,8-dimethano-1,4,4a,5,6,7,8,8a-octahydronaphthalene; an adduct of cyclopentadiene with tetrahydroindene, etc.; and a trimer or tetramer of cyclopentadiene, for example, 4,9:5,8-dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentaanthracene.

(Cycloolefinic Resins-B/Ring-Opening Polymerization Type)

Cycloolefinic resins further include those represented by the following general formulas (1) to (4). Most preferable among these are compounds represented by the following general formula (1).

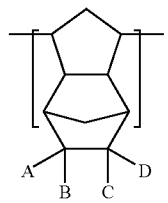

General Formula (1)

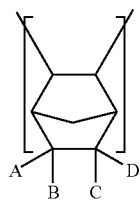

General Formula (2)

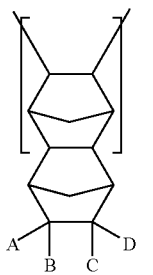

General Formula (3)

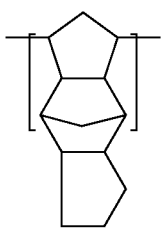

General Formula (4)

(In the general formulas (1) to (4), A, B, C and D each denotes a hydrogen atom or a monovalent organic group, and at least one of them is a polar group.)

These cycloolefin resins preferably have a weight-average molecular weight of 5,000 to 1,000,000, more preferably 8,000 to 200,000.

Cycloolefin resins in the present invention include resins described, for example, in Japanese Patent Application Laid-Open Nos. 60-168708, 62-252406, 62-252407, 2-133413, 63-145324, 63-264626 and 1-240517, and Japanese Examined Application Publication No. 57-8815.

Particularly preferable among these resins is a compound obtained by addition polymerization with a norbornenic monomer.

These cycloolefin resins preferably have a glass transition temperature (Tg) of not less than 80° C. and not more than 230° C., more preferably not less than 100° C. and not more than 200° C., still more preferably not less than 120° C. and not more than 180° C. The saturated water absorption rate is preferably not more than 1% by mass, more preferably not more than 0.8% by mass. The glass transition temperatures and the saturated water absorption rates of cycloolefin resins represented by the general formulas (1) to (4) can be controlled by selecting the kinds of the substituents A, B, C and D.

A cycloolefin resin to be used in the present invention may be a hydrogenated polymer obtained by hydrogenating a type of a tetracyclododecene derivative represented by the general formula (5) singly or by hydrogenating a polymer obtained by subjecting the tetracyclododecene derivative and an unsaturated cyclic compound copolymerizable therewith to metathesis polymerization.

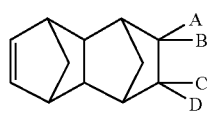

General Formula (5)

(wherein A, B, C and D each denotes a hydrogen atom or a monovalent organic group, and at least one of them is a polar group.)

Since in the tetracyclododecene derivative represented by the general formula (5), at least one of A, B, C and D is a polar group, a polarization film excellent in adhesiveness with other materials and the heat resistance can be obtained. Further, the polar group represented by $-(CH_2)_n COOR$ (wherein R denotes a hydrocarbon group having 1 to 20 carbon atoms; n is an integer of 0 to 10) finally gives a hydrogenated polymer (a base material of a polarization film) having a high glass transition temperature, which is preferable. Particularly, one polar substituent represented by $-(CH_2)_n COOR$ is preferably contained per one molecule of a tetracyclododecene derivative of the general formula (5) in view of reducing the water absorption rate. Although the fact that a hydrocarbon denoted by R having more carbon atoms in the polar substituent provides a hydrogenated polymer having a less hygroscopicity is preferable, from the view point of a balance between the hygroscopicity and the glass transition temperature of the obtained hydrogenated polymer, the hydrocarbon group is preferably a linear alkyl group having 1 to 4 carbon atoms or a (poly)cyclic alkyl group having 5 or more carbon atoms, particularly preferably a methyl group, an ethyl group or a cyclohexyl group.

Further, a tetracyclododecene derivative of the general formula (5) in which a hydrocarbon group having 1 to 10 carbon atoms is bonded as a substituent to a carbon atom to which a group represented by $-(CH_2)_n COOR$ is bonded is preferable because an obtained hydrogenated polymer has a low hygroscopicity. Especially a tetracyclododecene derivative of the general formula (5) containing a methyl group or an ethyl group as the substituent is preferable in view of its easy synthesis. Specifically, 8-methyl-8-methoxycarbonyltetracyclo[4,4,0,12.5,17.10]dodeca-3-ene is preferable. A mixture of such a tetracyclododecene derivative and an unsaturated cyclic compound copolymerizable therewith can be subjected to metathesis polymerization and hydrogenation, for example, by a method described on the 12th line of upper right column on page 4 to the 6th line of lower right column on page 6 of Japanese Patent Application Laid-Open No. 4-77520.

These cycloolefinic resins preferably have an inherent viscosity (ηinh) of 0.1 to 1.5 dl/g as measured in chloroform at 30° C., more preferably 0.4 to 1.2 dl/g. The hydrogenation rate of a hydrogenated polymer has a value of not less than 50% as measured at 60 MHz by $^1$H-NMR, preferably not less than 90%, more preferably not less than 98%. The higher hydrogenation rate provides a cycloolefin film more stable in heat and light. The gel content contained in the hydrogenated polymer is preferably not more than 5% by mass, more preferably not more than 1% by mass.

A cycloolefin resin (addition polymerization type) having a structure described below can further be used for the film of the present invention. Cycloolefin resins in the present invention include [A-1]: a hydrogenated random copolymer of an α-olefin having 2 to 20 carbon atoms and a cyclic olefin represented by the below chemical formula (1), and [A-2]: a hydrogenated ring-opening polymer or copolymer of a cyclic olefin represented by the below chemical formula (1).

Chemical Formula (1)

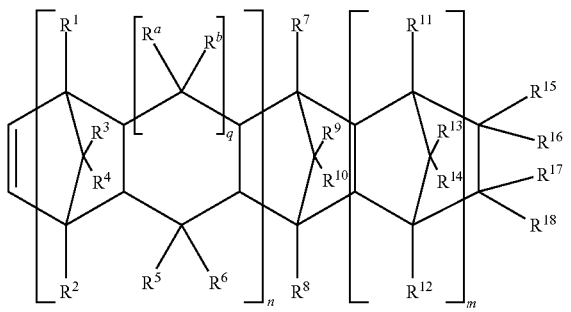

These cycloolefin resins preferably have a glass transition temperature (Tg) measured by DSC of not less than 70° C., more preferably 70 to 250° C., particularly preferably 120 to 180° C.

Further, these cycloolefin resins have noncrystallinity or a low crystallinity and the crystallinity degree measured by X-ray diffractometry is commonly not more than 20%, preferably not more than 10%, more preferably not more than 2%.

Besides, the cyloolefin of the present invention commonly has a limiting viscosity [η] of 0.01 to 20 dl/g as measured in decalin at 135° C., preferably 0.03 to 10 dl/g, more preferably 0.05 to 5 dl/g, and commonly has a melt flow index (MFR) of 0.1 to 200 g/10 min as measured at 260° C. and at a load of 2.16 kg according to ASTM D1238, preferably 1 to 100 g/10 min, more preferably 5 to 50 g/10 min.

Further, the cycloolefin resin commonly has a softening point measured by a thermal mechanical analyzer (TMA) of not less than 30° C., preferably not less than 70° C., more preferably 80 to 260° C.

The detail of the structure of the cycloolefin resin represented by the above-mentioned chemical formula (1) will be described.

In the chemical formula (1), n is 0 or 1; m is 0 or an integer of not less than 1; and q is 0 or 1. Herein, in the case of q being 1, $R^a$ and $R^b$ each independently denotes an atom or a hydrocarbon group described below; and in the case of q being 0, each bond is bonded to each other to form a five-membered ring.

$R^1$ to $R^{18}$, and $R^a$ and $R^b$ are each independently a hydrogen atom, a halogen atom or a hydrocarbon group. Herein, the halogen atom is a fluorine atom, a chlorine atom, a bromine atom or an iodide atom.

The hydrocarbon groups commonly include each independently an alkyl group having 1 to 20 carbon atoms, a cycloalkyl group having 3 to 15 carbon atoms and an aromatic hydrocarbon group. More specifically, the alkyl groups include a methyl group, an ethyl group, a propyl group, an isopropyl group, an amyl group, a hexyl group, an octyl group, a decyl group, a dodecyl group and an octadecyl group; the cycloalkyl groups include a cyclohexyl group; and the aromatic hydrocarbon groups include a phenyl group and a naphthyl group. These hydrocarbon groups may be substituted with a halogen atom. Further in the above chemical formula (1), $R^{15}$ to $R^{18}$ may be each bonded to one another (mutually cooperating) to form a monocyclic or a polycyclic, and the monocyclic or the polycyclic thus formed may have a double bond.

The cyclic olefins represented by the chemical formula (1) are more specifically exemplified below.

General Formula (6)

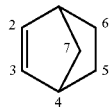

Examples include bicyclo[2.2.1]-2-heptene (norbornene) represented by the general formula (6) (in the general formula (6), the numbers of 1 to 7 denote position numbers of carbon atoms.) and derivatives obtained by substituting the compound with a hydrocarbon group.

The substituting hydrocarbon groups are exemplified by 5-methyl, 5,6-dimethyl, 1-methyl, 5-ethyl, 5-n-butyl, 5-isobutyl, 7-methyl, 5-phenyl, 5-methyl-5-phenyl, 5-benzyl, 5-tolyl, 5-(ethylphenyl), 5-(isopropylphenyl), 5-(biphenyl), 5-(β-naphthyl), 5-(α-naphthyl), 5-(anthracenyl), and 5,6-diphenyl.

Besides, other derivatives are exemplified by bicyclo[2.2.1]-2-heptene derivatives such as a cyclopentadiene-acenaphthylene adduct, 1,4-methano-1,4,4a,9a-tetrahydrofluorene and 1,4-methano-1,4,4a,5,10,10a-hexahydroanthracene.

Besides, the cycloolefins include tricyclo[4.3.0.1$^{2,5}$]-3-decene derivatives such as tricyclo[4.3.0.1$^{2,5}$]-3-decene, 2-methyltricyclo[4.3.0.1$^{2,5}$]-3-decene and 5-methyltricyclo[4.3.0.1$^{2,5}$]-3-decene, tricyclo[4.4.0.1$^{2,5}$]-3-undecene derivatives such as tricyclo[4.4.0.1$^{2,5}$]-3-undecene and 10-methyltricyclo[4.4.0.1$^{2,5}$]-3-undecene, General Formula (7)

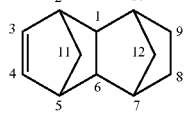

tetracyclo[4.4.0.1$^{2,5}$.1$^{7,10}$]-3-dodecene represented by the general formula (7), and derivatives thereof obtained by substituting with a hydrocarbon group.

The hydrocarbon groups are exemplified by 8-methyl, 8-ethyl, 8-propyl, 8-butyl, 8-isobutyl, 8-hexyl, 8-cyclohexyl, 8-stearyl, 5,10-dimethyl, 2,10-dimethyl, 8,9-dimethyl, 8-ethyl-9methyl, 11,12-dimethyl, 2,7,9-trimethyl, 2,7-dimethyl-9-ethyl, 9-isobutyl-2,7-dimethyl, 9,11,12-trimethyl, 9-ethyl-11,12-dimethyl, 9-isobutyl-11,12-dimethyl, 5,8,9,10-tetramethyl, 8-ethylidene, 8-ethylidene-9-methyl, 8-ethylidene-9-ethyl, 8-ethylidene-9-isopropyl, 8-ethylidene-9-butyl, 8-n-propylidene, 8-n-propylidene-9-methyl, 8-n-propylidene-9-ethyl, 8-n-propylidene-9-isopropyl, 8-n-propylidene-9-butyl, 8-isopropylidene, 8-isopropylidene-9-methyl, 8-isopropylidene-9-ethyl, 8-isopropylidene-9-isopropyl, 8-isopropylidene-9-butyl, 8-chloro, 8-bromo, 8-fluoro, 8,9-dichloro, 8-phenyl, 8-methyl-8-phenyl, 8-benzyl, 8-tolyl, 8-(ethylphenyl), 8-(isopropylphenyl), 8,9-diphenyl, 8-(biphenyl), 8-(β-naphthyl), 8-(α-naphthyl), 8-(anthracenyl) and 5,6-diphenyl.

Further, the cycloolefins are exemplified by tetracyclo[4.4.0.1$^{2,5}$.1$^{7,10}$]-3-dodecen derivatives such as an adduct of a (cyclopentadiene-acenaphthylene adduct) and cyclopentadiene, pentacyclo[6.5.1.1$^{3,6}$.0$^{2,7}$.0$^{9,13}$]-4-pentadecene and its derivatives, pentacyclo[7.4.0.1$^{2,5}$.1$^{9,12}$.0$^{8,13}$]-3-pentadecene and its derivatives, pentacyclo[8.4.0.1$^{2,5}$.1$^{9,12}$.0$^{8,13}$]-3-hexadecene and its derivatives, pentacyclo[6.6.1 1$^{3,6}$.0$^{2,7}$.0$^{9,14}$]-4-hexadecene and its derivatives, hexacyclo[6.6.1.1$^{3,6}$.1$^{10,13}$.0$^{2,7}$.0$^{9,14}$]-4-heptadecene and its derivatives, heptacyclo[8.7.0.1$^{2,9}$.1$^{4,7}$.1$^{11,17}$.0$^{3,8}$.0$^{12,16}$]-5-eicosene and its derivatives, heptacyclo [8.7.0.1$^{3,6}$.1$^{10,17}$.1$^{12,15}$.0$^{2,7}$.0$^{11,16}$]-4-eicosene and its derivatives, heptacyclo[8.8.0.1$^{2,9}$.1$^{4,7}$.1$^{11,18}$.0$^{3,8}$.0$^{12,17}$]-5-heneicosene and its derivatives, octacyclo [8.8.0.1$^{2,9}$.1$^{4,7}$.1$^{11,18}$.1$^{13,16}$.0$^{3,8}$.0$^{12,17}$]-5-docosene and its derivatives, and nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene and its derivative.

Specific examples of these cycloolefins are as described above, but more specific structures of these compounds are shown in paragraphs [0032] to [0054] of Japanese Patent Application Laid-Open No. 7-145213.

Synthesis methods of these cycloolefins can be performed referring to paragraphs [0039] to [0068] of Japanese Patent Application Laid-Open No. 2001-114836.

As the cycloolefin resin (addition polymerization type) of the present invention, the following can also be used. The cycloolefin resin may be at least one type of cycloolefin copolymer selected from combinations each composed of a polymer containing a polymerization unit of at least one type of cycloolefin represented by the chemical formula I, II, II', III, IV, V or VI:

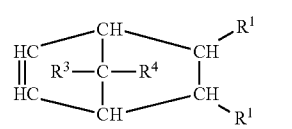

Chemical Formula (I)

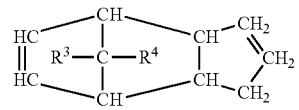

Chemical Formula (II)

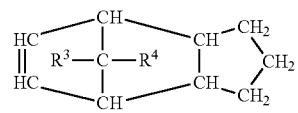

Chemical Formula (II')

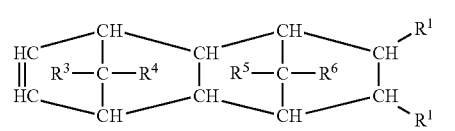

Chemical Formula (III)

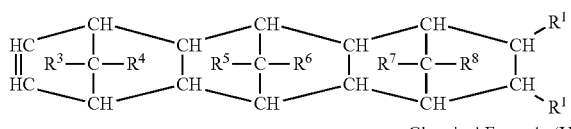

Chemical Formula (IV)

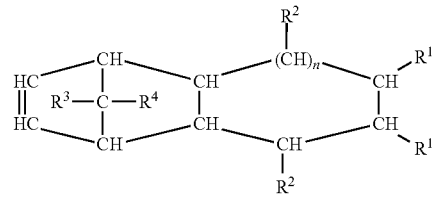

Chemical Formula (V)

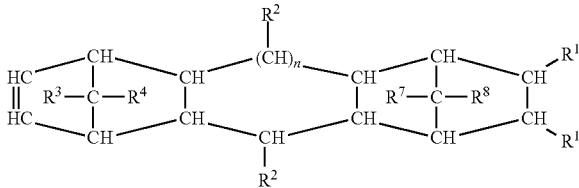

Chemical Formula (VI)

(wherein $R^1$, $R^2$, $R^3$, $R^4$, $R^5$, $R^6$, $R^7$ and $R^8$ are the same or different, and are a hydrogen atom or a $C_1$- to $C_{20}$-hydrocarbon group such as a linear or branched $C_1$- to $C_8$-alkyl group, a $C_6$- to $C_{18}$-aryl group, a $C_7$- to $C_{20}$-alkylenearyl group or a cyclic or noncyclic $C_2$- to $C_{20}$ alkenyl group; or $R^1$ to $R^8$ may form a saturated, unsaturated or aromatic ring; the same $R^1$ to $R^8$ in the chemical formulas (I) to (VI) may be different in each formula; n is 0 to 5) and a polymerization unit, of 0 to 99 mol % based on the total structure of the cycloolefin copolymer, derived from at least one type of noncyclic olefin represented by the following chemical formula (VII):

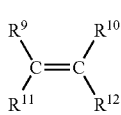

Chemical Formula (VII)

(wherein $R^9$, $R^{10}$, $R^{11}$ and $R^{12}$ are the same or different, and are a hydrogen atom or a liner or branched, saturated or unsaturated $C_1$- to $C_{20}$-hydrocarbon group such as a $C_1$- to $C_8$-alkyl group or a $C_6$- to $C_{18}$-aryl group).

Further, the cycloolefin polymer can also be obtained by subjecting at least one type of monomer represented by the chemical formulas (I) to (VI) to the ring-opening polymerization and hydrogenating the obtained product.

Additionally, the cycloolefin polymer may contain a polymerization unit, of 0 to 45 mol % based on the total structure of the cycloolefin copolymer, derived from at least one type of monocyclic olefin represented by the following chemical formula (VIII):

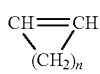

Chemical Formula (VIII)

(wherein n is an integer of 2 to 10).

The proportion of the polymerization unit derived from a cyclic, particularly a polycyclic olefin is preferably 3 to 75 mol % based on the total structure of the cyclolefin copolymer. The proportion of the polymerization unit derived from a noncyclic olefin is preferably 5 to 80 mol % based on the total structure of the cycloolefin copolymer.

The cycloolefin copolymer is preferably composed of a polymerization unit derived from at least one type of polycyclic olefin, particularly polycyclic olefin represented by the chemical formula (I) or (III) and a polymerization unit derived from at least one type of noncyclic olefin, particularly α-olefin having 2 to 20 carbon atoms, represented by the chemical formula (VII). Particularly preferable is a cycloolefin copolymer composed of a polymerization unit derived from the polycyclic olefin represented by the chemical formula (I) or (III) and a polymerization unit derived from the noncyclic olefin represented by the chemical formula (VII). Still more preferable is a terpolymer composed of a polymerization unit derived from the polycyclic monoolefin represented by the chemical formula (I) or (III), a polymerization unit derived from the noncyclic monoolefin represented by the chemical formula (VII) and a polymerization unit derived from a cyclic or noncyclic olefin (polyene) containing at least two double bonds, for example, a cyclic, preferably a polycyclic diene such as a norbornadiene, particularly preferably a polycyclic alkene, for example, a vinylnorbornene carrying a $C_2$- to $C_{20}$-alkenyl group.

The cycloolefin polymer according to the present invention contains preferably an olefin having a norbornene structure as a base, particularly preferably norbornene or tetracyclododecene, if desired, vinyl norbornene or norbornadiene. Further, the cycloolefin polymer is preferably a cycloolefin copolymer containing a polymerization unit derived from a noncyclic olefin having a double bond at its terminal such as an α-olefin having 2 to 20 carbon atoms, particularly preferably ethylene or propylene. Particularly preferable are a norbornene-ethylene copolymer and a tetracyclododecen-ethylene copolymer.

Among terpolymers, particularly preferable are a norbornene-vinylnorbornene-ethylene terpolymer, a norbornene-norbornadiene-ethylene terpolymer, a tetracyclododecene-vinylnorbornene-ethylene terpolymer and a tetracyclododecene-vinyltetracyclododecene-ethylene terpolymer. The proportion of a polymerization unit derived from a polyene, preferably vinyl norbornene or norbornadiene, is 0.1 to 50 mol % based on the total structure of the cycloolefin copolymer, particularly preferably 0.1 to 20 mol %; the proportion of the noncyclic monoolefin represented by the chemical formula (VII) is 0 to 99 mol %, preferably 5 to 80 mol %. In the above terpolymers, the proportion is 0.1 to 99 mol % based on the total structure of the cycloolefin copolymer, preferably 3 to 75 mol %.

Preferably, the cycloolefin copolymer according to the present invention contains at least one type of cycloolefin copolymer containing a polymerization unit drivable from the polycyclic olefin represented by the chemical formula (I) and a polymerization unit derived from the noncyclic olefin represented by the chemical formula (VII).

Such a cycloolefin copolymer can be synthesized according to paragraphs [0019] to [0020] of Japanese Patent Application Laid-Open No. 10-168201.

(Additives)
(1) Antioxidants

The cycloolefinic resins in the present invention can be stabilized by adding a well-known antioxidant, for example, 2,6-di-t-butyl-4-methylphenol, 2,2'-dioxy-3,3'-di-t-butyl-5,5'-dimethylphenylmethane, tetrakis[methylene-3-(3,5-di-t-butyl-4-hydroxyphenyl)propionate]methane, 1,1,3-tris(2-methyl-4-hydroxy-5-t-buthylphenyl)butane, 1,3,5-trimethyl-2,4,6-tris(3,5-di-t-butyl-4-hydroxybenzyl)benzene, stearyl-β-(3,5-di-t-butyl-4-hydroxyphenyl)propionate, 2,2'-dioxy-3,3'-t-butyl-5,5'-diethylphenylmethane, 3,9-bis[1,1-dimethyl-2-[β-(3-t-butyl-4-hydroxy-5-methylphenyl)propionyloxy]ethyl], 2,4,8,10-tetraoxaspiro[5,5]undecane, tris(2,4-di-t-buthylphenyl)phosphite, cyclic neopentanetetrayl bis(2,4-di-t-buthylphenyl)phosphite, cyclic neopentanetetrayl bis(2,6-di-t-butyl-4-methylphenyl)phosphite and 2,2-methylene bis(4,6-di-t-buthylphenyl)octyl phosphite; and an ultraviolet absorbent, for example, 2,4-dihydroxybenzophenone and 2-hydroxy-4-methoxybenzophenone. Further, additives such as lubricants can also be added for improving processability.

The addition amount of these antioxidants is commonly 0.1 to 3 parts by mass to 100 parts by mass of a cycloolefinic resin, preferably 0.2 to 2 parts by mass.

Additionally, if desired, the cycloolefinic resins may be added with any of additives such as an antiaging agent, antistatic agent, ultraviolet absorbent and lubricant, such as (for example) a phenolic or phosphorous agent.

(2) Stabilizers

The present invention preferably uses as a stabilizer one of or both of a phosphite-based compound and a phosphorous acid ester compound. The formulation amount of these stabilizers is 0.005 to 0.5% by mass to a cycloolefin resin, more preferably 0.01 to 0.4% by mass, still more preferably 0.02 to 0.3% by mass.

(i) Phosphite-Based Stabilizers

Specific phosphite-based stabilizers are not especially limited, but are preferably phosphite-based stabilizers represented by the chemical formulas (general formula) (2) to (4).

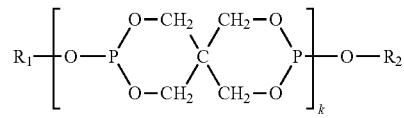

Chemical Formula (2)

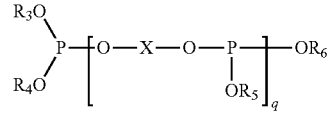

Chemical Formula (3)

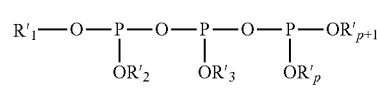

Chemical Formula (4)

In the above each formula, $R^1, R^2, R^3, R^4, R^5, R^6, R'^1, R'^2, R'^3 \ldots R'^p$ and $R'^{p+1}$ donate a hydrogen atom or a group selected from the group consisting of an alkyl group, an aryl group, an alkoxyalkyl group, an aryloxyalkyl group, an alkoxyaryl group, an arylalkyl group, an alkylaryl group, a polyaryloxyalkyl group, a polyalkoxyalkyl group and a polyalkoxyaryl group which all have 4 to 23 carbon atoms. Herein, all $R^1$ to $R'^{p+1}$ are not simultaneously a hydrogen atom in each of the chemical formulas (general formulas) (2), (3) and (4). X in the phophite-based stabilizer represented by the chemical formula (general formula) (3) denotes a group selected from the group consisting of an aliphatic chain, an aliphatic chain having an aromatic neucleus on its side chain, an aliphatic chain having an aromatic nucleus in its chain, and a chain containing oxygen atoms not including two or more continuously bonded oxygen atoms in the chain. Reference characters k and q are an integer of 1 or more and reference character p is an integer of 3 or more.

The values of reference characters k and q of these phosphite-based stabilizers are preferably 1 to 10. The values of reference characters k and q of not less than 1 lessen the volatility on heating and those of not more than 10 improve the compatibility with cellulose acetate propionates, which are preferable. The value of reference character p is preferably 3 to 10. The value of reference character p of not less than 3 lessens the volatility on heating and that of not more than 10 improves the compatibility with cellulose acetate propionates, which are preferable.

As specific examples of the phosphite-based stabilizer represented by the below chemical formula (general formula) (5), those represented by the below chemical formulas (6) to (9) are preferable.

Chemical Formula (5)

$$R_1 - \left[ O - P \underset{O-CH_2}{\overset{O-CH_2}{<}} C \underset{CH_2-O}{\overset{CH_2-O}{>}} P \right]_k O - R_2$$

Chemical Formula (6)

$$C_{18}H_{37} - O - P \underset{O-CH_2}{\overset{O-CH_2}{<}} C \underset{CH_2-O}{\overset{CH_2-O}{>}} P - O - C_{18}H_{37}$$

Chemical Formula (7)

[Structure: bis(2,4-di-tert-butylphenyl) cyclic neopentanetetrayl phosphite]

Chemical Formula (8)

[Structure: bis(2,6-di-tert-butylphenyl) cyclic neopentanetetrayl phosphite]

Chemical Formula (9)

[Structure: bis(nonylphenyl) cyclic neopentanetetrayl phosphite with $C_9H_{19}$ groups]

As specific examples of the phosphite-based stabilizer represented by the below chemical formula (general formula) (10), those represented by the below formulas (11), (12), and (13) are preferable.

Chemical Formula (10)

$$\underset{R_4O}{\overset{R_3O}{>}} P - \left[ O - X - O - P \underset{OR_5}{\overset{}{|}} \right]_q OR_6$$

Chemical Formula (11)

[Structure with $C_{13}H_{27}O$ groups and tBu, $C_3H_7$ substituents]

Chemical Formula (12)

[Structure with $C_{13}H_{27}O$ groups, tBu, $CH_2$, CH, $CH_3$ substituents]

Chemical Formula (13)

[Structure: RO-P(OR)-O-phenyl-C(CH₃)₂-phenyl-O-P(OR)-OR]

R = alkyl group with 12 to 15 carbon atoms (ii) Phosphorous Acid Ester Stabilizers The phosphorous acid ester stabilizers include, for example, cyclic neopentanetetrayl bis(octadecyl)phosphite, cyclic neopentanetetrayl bis(2,4-di-tert-buthylphenyl)phosphite, cyclic neopentanetetrayl bis(2,6-di-tert-butyl-4-methylphenyl)phosphite, 2,2-methylene bis(4,6-di-tert-butylphenyl)octyl phosphite and tris(2,4-di-tert-butylphenyl) phosphite.

(iii) Other Stabilizers

Besides, weak organic acids, thioether compounds, epoxy compounds and the like may also be formulated as stabilizers.

The weak acids are those having pKa of not less than 1, and are not especially limited as long as they do not interfere with the action of the present invention and have coloring preventiveness and physical properties-deterioration preventiveness. They include, for example, tartaric acid, citric acid, malic acid, fumaric acid, oxalic acid, succinic acid and maleic acid. These may be used singly or concurrently in two or more.

The thioether compounds include, for example, dilauryl thiodipropionate, ditridecyl thiodipropionate, dimyristyl thiodipropionate, distearyl thiodipropionate and palmityl stearyl thiodipropionate, and these may be used singly or concurrently in two or more.

The epoxy compounds include, for example, compounds derived from epichlorohydrin and bisphenol A, and also derivatives from epichlorohydrin and glycerol, and cyclics such as vinylcyclohexene oxides and 3,4-epoxy-6-methylcyclohexylmethyl-3,4-epoxy-6-methylcyclohexanecarboxylate. Epoxidized soybean oils, epoxidized castor oils and long chain-α-olefin oxides can also be used. These may be used singly or concurrently in two or more.

(3) Matting Agents

Microparticles are preferably added as a matting agent. Microparticles used in the present invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate.

These microparticles generally forms a secondary particle of 0.1 to 3.0 μm in average particle size, exist as aggregates of primary particles in films, and forms irregularities of 0.1 to 3.0 μm on the surface of films. The average secondary particle size is preferably 0.2 μm to 1.5 μm, more preferably 0.4 μm to 1.2 μm, most preferably 0.6 μm to 1.1 μm. The particles in films are observed for primary and secondary particle sizes by a scanning electron microscope, and the diameter of a circle circumscribing particles is defined as a particle size. 200 particles on different places are observed, and the average value is defined as an average particle size.

The preferable addition amount of the microparticles is 1 ppm to 500 ppm to a cycloolefin resin in terms of mass, more preferably 5 ppm to 1,000 ppm, still more preferably 10 ppm to 500 ppm.

Microparticles containing silicon are preferable because they can reduce the turbidity, and silicon dioxide is particularly preferable. Microparticles of silicon dioxide preferably have an average primary particle size of not more than 20 nm and an apparent specific gravity of not less than 70 g/l. Microparticles having primary particles having a small average diameter of 5 to 16 nm are more preferable because they can reduce the haze of films. The apparent specific gravity is preferably 90 to 200 g/l or more, more preferably 100 to 200 g/l or more. A larger apparent specific gravity thereof enables to fabricate a higher-concentration dispersion, preferably improving the haze and the aggregates.

Usable microparticles of silicon dioxide are, for example, commercially-available ones such as AEROJIL R972, R972V, R974, R812, 200, 200V and 300, R202, OX50 and TT600 (manufactured by Japan Aerojil Co., Ltd.). Microparticles of zirconium oxide are commercially available and usable with trade names of, for example, AEROJIL R976 and R811 (manufactured by Japan Aerojil Co., Ltd.).

Among them, since AEROJIL 200V and AEROJIL R972V are silicon dioxide microparticles having an average primary particle size of not more than 20 nm and an apparent specific gravity of not less than 70 g/l, the AEROJILs are particularly preferable because these have an effect of reducing the friction coefficient of optical films while maintaining the turbidity thereof at a low level.

(4) Other additives

As other additives, an infrared absorbing dye, an optical adjusting agent and a surfactant can be added. Materials as these additives described in detail on pages 17 to 22 in JIII Journal of Technical Disclosure No. 2001-1745 (issued on Mar. 15, 2001, Japan Institute of Invention and Innovation) are preferably used.

Usable infrared absorbing agents are those, for example, in Japanese Patent Application Laid-Open No. 2001-194522. Usable ultraviolet absorbents are those described, for example, in Japanese Patent Application Laid-Open No. 2001-151901. Each is preferably contained in 0.001 to 5% by mass to a cellulose acylate.

The optical adjusting agents include retardation adjusting agents, and usable ones are described, for example, in Japanese Patent Application Laid-Open Nos. 2001-166144, 2003-344655, 2003-248117 and 2003-66230. Thereby, the in-plane retardation (Re) and the thickness-direction retardation (Rth) can be controlled. The preferable addition amount is 0 to 10% by mass to a cellulose acylate, more preferably 0 to 8% by mass, still more preferably 0 to 6% by mass.

Usable ultraviolet absorbents are benzophenone ultraviolet absorbents, benzotriazole ultraviolet absorbents, acrylnitrile ultraviolet absorbents and the like, and among them, benzophenone ultraviolet absorbents are preferable and the addition amount thereof is commonly 10 to 100,000 ppm, preferably 100 to 10,000 ppm.

<Film Forming>
(1) Pelletizing

The thermoplastic resin and the additives are preferably mixed and palletized prior to the melt-film forming.

The thermoplastic resin and the additives are preferably dried previously for the pelletization, but use of a vent-type extruder can substitute for the drying. The drying can use a method of heating at 90° C. for 8 or more hours in a heating furnace, but the method is not limited thereto. Pellets can be fabricated by melting the thermoplastic resin and the additives in a twin screw kneading extruder at 150° C. to 280° C. and then solidifying the extruded noodle-like melt in water and cutting the solidified noodle. Pelletization can also be performed by the underwater cutting method, in which the solidified noodle is cut while being directly extruded from a mouthpiece of an extruder into water after melting by the extruder, or other methods.

As long as an extruder provides sufficient melting and kneading, any well-known single screw extruder, a nonintermeshing counter-rotating twin screw extruder, an intermeshing counter-rotating twin screw extruder, an intermeshing co-rotating twin screw extruder and the like can be used.

The preferable size of pellets is 1 mm$^2$ to 300 mm$^2$ in sectional area and 1 mm to 30 mm in length, more preferably 2 mm$^2$ to 100 mm$^2$ in sectional area and 1.5 mm to 10 mm in length.

On pelletization, the above-mentioned additives can be charged from a feedstock charging port or a vent mouth on the way of an extruder.

The rotation frequency of an extruder is preferably 10 rpm to 1,000 rpm, more preferably 20 rpm to 700 rpm, still more preferably 30 rpm to 500 rpm. The rotation speed lower than this elongates residence time, decreases the molecular weight due to heat degradation, and easily deteriorates yellowishness, which is therefore unpreferable. Too high a rotation speed easily causes problems such as reducing the molecular weight due to easy scission of molecules due to shearing, and increasing generation of crosslinked gel.

The extrusion residence time on pelletization is not less than 10 sec and not more than 30 min, more preferably 15 sec to 10 min, still more preferably 30 sec to 3 min. The shorter residence time, as long as sufficient melting is carried out, is preferable from the view point of enabling to suppress resin deterioration and yellowishness generation.

(2) Drying

Moisture in pellets is preferably reduced prior to the melt-film forming. Drying methods often involves drying performed using a dehumidified air drier, but are not especially limited as long as a target moisture content can be obtained (Drying is preferably performed effectively by using a method such as heating, air blowing, pressure reduction and stirring singly or in combination thereof. More preferably, a drying hopper has a heat insulating structure.). The drying temperature is preferably 0 to 200° C., more preferably 40 to 180° C., particularly preferably 60 to 150° C. Too low a drying temperature not only takes a long time for drying, but also brings about a moisture content of more than a target value, which are unpreferable. By contrast, too high a drying temperature unpreferably brings about the sticking and blocking of the resin. The amount of drying air is preferably 20 to 400 m$^3$/h, more preferably 50 to 300 m$^3$/h, particularly preferably 100 to 250 m$^3$/h. A small drying air amount unpreferably worsens the drying efficiency. By contrast, a larger drying air amount than a certain amount gives little of a further improvement in the drying effect, and is not economical. The dew point of the air is preferably 0 to −60° C., more preferably −10 to −50° C., particularly preferably −20 to −40° C. At least 15 min of drying time is needed, more preferably at least 1 hour, particularly preferably 2 hours. By contrast, drying for more than 50 hours gives only a small effect on further reducing moisture content, and needlessly elongating the drying time is unpreferable because of concern about thermal degradation of the resin. The thermoplastic resin of the present invention preferably has a moisture content of not more than 1.0% by mass, more preferably not more than 0.1% by mass, particularly preferably not more than 0.01% by mass.

(3) Melt Extrusion

The cycloolefin resin described above is fed into a cylinder of an extruder through a feed port thereof. The interior of the cylinder is constituted of, in order from the feed port side, a feed portion (region A) to quantitatively feed the thermoplastic resin fed from the feed port, a compression portion (region B) to melt, knead and compress the thermoplastic resin, and a metering portion (region C) to meter the thermoplastic resin melted, kneaded and compressed. The resin is preferably dried by the method described above for reducing the moisture content, but more preferably dried in an inert gas (nitrogen, etc.) flow inside the extruder or while the interior of the extruder is being vacuum evacuated using an extruder with a vent for preventing oxidation of the melted resin due to residual oxygen. The screw compression ratio of the extruder is set at 2.5 to 4.5 and the L/D thereof is set at 20 to 70. Here, the screw compression ratio is expressed in terms of volume ratio of the feed portion A to the metering portion C, i.e. a volume per unit length of the feed portion A/a volume per unit length of the metering portion C, and is calculated using an outer diameter d1 of the screw shaft of the feed portion A, an outer diameter d2 of the screw shaft of the metering portion C, a groove diameter a1 of the feed portion A and a groove diameter a2 of the metering portion C. The L/D refers to the ratio of a cylinder inner diameter to a cylinder length. The extruding temperature is set at 200 to 300° C. The temperature in the extruder may be wholly the same, or may have a distribution. More preferably, the temperature of the feed portion is made higher than that of the compression portion.

Too small a screw compression ratio of less than 2.5 leads to insufficient kneading, generates unmelted parts and easily leaves unmelted foreign matters in the thermoplastic film after manufacture, and further, easily results in entrainment of bubbles. Thereby, the strength of the thermoplastic film decreases and when the film is stretched, the film easily ruptures and the orientation cannot be sufficiently enhanced. By contrast, too large a screw compression ratio of more than 4.5 easily deteriorates the resin by heat generation due to too large a shearing stress imparted, bringing about yellowing in the thermoplastic film after manufacture. Too large a shearing stress imparted causes the molecular scission and reduces the molecular weight, reducing the mechanical strength of the film. Therefore, for hardly exhibiting yellowing in the thermoplastic film after manufacture and raising the film strength and hardly causing stretching rupture, the screw compression ratio is preferably in the range of 2.5 to 4.5, more preferably 2.8 to 4.2, particularly preferably 3.0 to 4.0.

Too small an L/D of less than 20 leads to insufficient melting and insufficient kneading, easily generating unmelted foreign matters in the thermoplastic film after manufacture as in the case of the small compression ratio. By contrast, too large an L/D exceeding 70 brings about too long a residence time of the thermoplastic resin in the extruder, easily causing deterioration of the resin. A long residence time causes molecular scission and reduces the molecular weight, reducing the mechanical strength of the thermoplastic resin. Therefore, for hardly exhibiting yellowing in the thermoplastic film after manufacture and raising the film strength and hardly causing stretching rupture, the L/D is preferably in the range of 20 to 70, more preferably 22 to 65, particularly preferably 24 to 50.

The cycloolefin film thus obtained has characteristic values of a haze of not more than 2.0% and a yellow index (YI value) of not more than 10.

As types of extruders, single screw extruders, which generally have a relatively inexpensive facility cost, are often used, and include screw types such as full-flight, Maddock and dulmage, preferably full-flight type for cycloolefin resins. By altering the screw segment although the facility cost becomes high, a twin screw extruder installed on the way with a vent port and enabling extrusion while volatilizing unnecessary volatile components can be used. Twin screw extruders are largely classified into types of co-rotation and counter rotation and either of them can be used, but the co-rotation type, which hardly causes residence parts and has a high self-cleaning performance, is preferable. By suitably arranging a vent port, cycloolefin pellets and powder in undried state can also be used as they are. Further, trimmings and the like of the film produced on the way of film forming can also be recycled without being dried.

The preferable diameter of the screw is, depending on a target extrusion amount per unit time, 10 mm to 300 mm, more preferably 20 mm to 250 mm, still more preferably 30 mm to 150 mm.

(4) Filtration

Filtration of the so-called breaker plate type, in which a filter medium is installed at an extruder outlet, is preferably performed for filtering foreign matters in the resin and avoiding gear pump damage due to the foreign matters. The filtration of the foreign matters and the avoidance of the gear pump damage can be achieved by adjustment of the bore diameter and the flowing rate of a melted resin as described above.

For filtration of foreign matters with higher precision, a filtering apparatus in which a so-called leaf disk filter is incorporated is preferably installed after passing through the gear pump. Filtration may be performed by installing a filtering section at one place or by a multistage filtration in which a plurality of filtering sections are installed. Although it is preferable that a filter medium have a higher filtration precision, the filtration precision is preferably 15 μmm to 3 μmm in view of the pressure resistance of the filter medium and a rise of the filtering pressure due to the clogging of the filter medium, more preferably 10 μmm to 3 μmm. Particularly, in the case of using a leaf disk filter apparatus to finally filter foreign matters, use of a filter medium having a high filtration precision in view of the quality is preferable and the filtration precision can be adjusted by the number of filtering sheets to be loaded for securing the aptitude with the pressure resistance and the filter life. With respect to the kind of a filter medium, iron and steel materials are preferably used in view of its use under a high temperature and high pressure, and among iron and steel materials, especially a stainless steel, a steel or the like is preferably used, and especially a stainless steel is desirably used in view of corrosion. With respect to the constitution of a filter medium, in addition to a filter medium obtained by knitting wire rods, for example, a sintered filter medium formed by sintering metallic filaments or a metallic powder can be used, and the sintered filter medium is preferable in view of the filtration precision and the filter life.

(5) Gear Pump

Reducing the variation in the discharging amount is important for improving the precision in thickness, and the installation of a gear pump between an extruder and a die and the feeding of a cellulose acylate resin of a certain amount from the gear pump have an effect. The gear pump refers to a pump in which a pair of gears composed of a drive gear and a driven gear is intermeshingly housed in a housing, and by intermeshingly rotating both the gears by driving the drive gear, a melting resin is sucked from a suction port formed on the housing into a cavity and the resin is discharged in a certain amount from a discharge port formed on the housing. Even if there is a slight variation in the resin pressure at the end portion of the extruder, use of a gear pump absorbs the variation and the variation in the resin pressure downstream of the film forming apparatus becomes very small, improving the variation in thickness. Use of a gear pump allows the variation width of the resin pressure at a die portion of within ±1%.

For improving the fixed-amount feeding performance by a gear pump, a method can also be used in which the pressure before the gear pump is controlled to be constant by varying the rotation frequency of the screw. Further, a high-precision gear pump using three or more gears in which the variation of the gears has been eliminated is also effective.

Other merits to use a gear pump, since film forming can be performed with the pressure at the tip end of the screw reduced, lie in expectations of reduction of the energy consumption, prevention of a rise in the resin temperature, improvement of the transport efficiency, reduction of the residence time and reduction of the L/D of the extruder. In the case of using a filter for removing foreign matters, with no gear pump, the resin amount fed from the screw sometimes varies along with the rising filtration pressure, but with a gear pump used in combination, the variation can be eliminated. By contrast, demerits of the gear pump lie in that depending on a selection method the length of the facility becomes long and the residence time of the resin becomes long, and that cleavage of molecular chains is sometimes caused due to a shearing force of the gear pump portion, which should be noticed.

A preferable residence time of a resin from when the resin enters an extruder from the feed port till when the resin goes out a die is 2 min to 60 min, more preferably 3 min to 40 min, still more preferably 4 min to 30 min.

Since there arises a problem that the sealing by a polymer of the drive portion and the bearing portion is degraded due to worsened flow of the polymer for the bearing circulation of a gear pump and the variation in the metering and resin-extruding pressure becomes large, the design (especially of clearance) of the gear pump matched to the melt viscosity of a thermoplastic resin is needed. In some cases, since the residence part of a gear pump causes degradation of a thermoplastic resin, a structure of as little residence as possible is preferable. A polymer pipe or an adaptor connecting an extruder and a gear pump, a gear pump and a die, or the like necessitates a design giving as little residence as possible; and for stabilizing the extruding pressure of a thermoplastic resin having a high dependence on temperature of the melt viscosity, the variation in temperature is preferably as small as possible. A band heater, low in the facility cost, is generally often used for heating a polymer pipe, but an aluminum-cast heater, having a less temperature variation, is more preferably used. Further, melting by heating the barrel of the extruder by a heater divided into three to twenty heaters in the extruder as described above is preferable.

(6) Die

A thermoplastic resin is melted by an extruder constituted as described before, and, as required, passes through a filtering machine and a gear pump, and the melted resin is continuously transported to a die. As a die, any of a commonly used T-die, fish tail die and hanger coat die can be used as long as the die is designed such that the residence inside the die is little. A static mixer for enhancing uniformity of the resin temperature can problemlessly be inserted right before the T-die. The clearance of a T-die outlet is commonly 1.0 to 5.0 times the film thickness, preferably 1.2 to 3 times, more preferably 1.3 to 2 times. With the lip clearance 1.0 time smaller than the film thickness, it is difficult to provide a planar and favorable sheet by film forming. By contrast, a large lip clearance exceeding 5.0 times the film thickness is unpreferable because the precision in the sheet thickness decreases. The die is a very important facility to decide the precision in a film thickness; a die which can strictly control the thickness adjustment is preferable. Dies can commonly adjust the thickness at 40 to 50 mm intervals, but the types thereof which can adjust the film thickness at not more than 35 mm intervals are preferable; those at not more than 25 mm intervals are more preferable. For improving uniformity of a formed film, a design in which a temperature unevenness and a flow-rate unevenness in the width direction of a die are as small as possible is important. An automatic thickness adjustment die, which measures a downstream film thickness, calculates the thickness deviation and feeds back the calculated result for the thickness adjustment of a die, is also effective for reduction of the film variation in the long-period continuous production.

Manufacture of films generally uses a single-layer film forming apparatus, whose facility cost is inexpensive, but in some cases, films having structures of two or more kinds can be manufactured using a multilayer film forming apparatus for providing a functional layer as an outer layer. Generally, a functional layer is preferably laminated as a thin layer on a surface layer, but the layer ratio is not especially limited.

(7) Casting

The melted resin extruded in a sheet-like form from the die under the conditions described above is cooled and solidified on a casting drum to obtain a film.

In the present invention, by using a method such as the electrostatic impression method, air knife method, air chamber method, vacuum nozzle method or touch roll method on the casting drum, the adhesion of the casting drum and the melted and extruded sheet is preferably enhanced, but among these methods, the touch roll method is preferably used.

The touch roll method involves placing a touch roll on the casting drum and shaping the film surface. At this time, the touch roll is not a common high-rigidity one, but is preferably one having elasticity. However, a touch roll in which an elastically deformable member (rubber, etc.) is covered with an extremely thin metal cannot provide a high surface pressure (since the deformation amount of the touch roll is large, resulting in too large a contact area with the cast roll, and a sufficient surface pressure cannot be provided), which is unpreferable. The touch roll of the present invention has a wall thickness of not less than 0.5 mm and not more than 7 mm, more preferably 1.1 to 6 mm, still more preferably 1.5 to 5 mm. The surfaces of the touch roll and the casting roll are preferably a mirror surface, and have an arithmetic average height Ra of not more than 100 nm, preferably not more than 50 nm, still more preferably not more than 25 nm. The preferable surface pressure of the touch roll is not less than 0.1 MPa and not more than 10 MPa, more preferably not less than 0.2 MPa and not more than 7 MPa, still more preferably not less than 0.3 MPa and not more than 5 MPa. The surface pressure described herein refers to a value of a force pressing the touch roll divided by a contact area of a thermoplastic film and the touch roll.

The touch roll is installed on a metal shaft, and a heat medium (liquid) may be passed therebetween; the touch roll includes one in which an elastic body layer is installed between an outer cylinder and the metal shaft, and a heat medium (liquid) is filled between the elastic body layer and the outer cylinder. The temperature of the any touch roll is preferably more than $Tg-10°$ C. and not more than $Tg+30°$ C., more preferably not less than $Tg-7°$ C. and not more than $Tg+20°$ C., still more preferably not less than $Tg-5°$ C. and not more than $Tg+10°$ C. The temperature of the casting roll is preferably in the similar temperature range.

Specific examples of touch rolls to be utilized are touch rolls described in Japanese Patent Application Laid-Open Nos. 11-314263 and 11-235747.

A plurality of casting drums (rolls) are preferably used for gradual cooling (the above-mentioned touch roll is arranged so as to touch the first casting roll of the most upstream side (nearest to the die)). Generally, three cooling rolls are relatively often used, but the number thereof is not limited thereto. The diameter of the roll is preferably 50 mm to 5,000 mm, more preferably 100 mm to 2,000 mm, still more preferably 150 mm to 1,000 mm. The interval between surfaces of a plurality of rolls is preferably 0.3 mm to 300 mm, more preferably 1 mm to 100 mm, still more preferably 3 mm to 30 mm. The line speed of the most upstream side of the cast rolls is preferably not less than 20 m/min and not more than 70 m/min.

(8) Winding-Up

After the film is peeled off the casting drum, the film is wound up through a nip roll.

The film forming width is 0.7 m to 5 m, preferably 1 m to 4 m, more preferably 1.3 m to 3 m. The thickness of the unstretched film thus obtained is preferably 20 μm to 250 μm, more preferably 25 μm to 200 μm, still more preferably 30 μm to 180 μm.

Trimming of both edges prior to winding-up is preferable. Any type of trimming cutters such as a rotary cutter, shear blade and knife can be used. Either material of the cutters of carbon steel and stainless steel may be used. Generally, use of a carbide blade or a ceramic blade is preferable because the blade has a long life and generation of chips is suppressed. Parts trimmed off by trimming may be shredded to be recycled again as a feedstock.

One edge or both edges are preferably subjected to thicknessing processing (knurling processing). The height of irregularity by thicknessing processing is preferably 1 μm to 200 μm, more preferably 10 μm to 150 μm, still more preferably 20 μm to 100 μm. The thicknessing processing may involve making convexes on both surfaces or on one surface. The width of the thicknessing processing is preferably 1 mm to 50 mm, more preferably 3 mm to 30 mm, still more preferably 5 mm to 20 mm. The extrusion processing can be performed at room temperature to 300° C.

The film thus formed may be stretched as it is (on-line stretching), or may be once wound up and then again reeled out and stretched (off-line stretching).

When the film is wound up, a lamifilm is also preferably attached to at least one surface thereof from the view point of preventing scratches. The thickness of the lamifilm is preferably 5 μm to 200 μm, more preferably 10 μm to 150 μm, still more preferably 15 μm to 100 μm. The material thereof can be polyethylene, polyester, polypropylene and the like, and is not especially limited thereto.

The preferable winding-up tension is 1 kg/m-width to 50 kg/m-width, more preferably 2 kg/m-width to 40 kg/m-width, still more preferably 3 kg/m-width to 20 kg/m-width. With the winding-up tension of less than 1 kg/m-width, it is difficult to wind up the film uniformly. The winding-up tension exceeding 50 kg/w-width winds up the film too tightly wound up, and not only deteriorates the winding appearance, but also causes waving of the film due to stretching by the creeping phenomenon of parts of lumps on the film, as well as generates the residual birefringence due to the elongation of the film, which are unpreferable. The winding-up tension is detected by a tension control on the way of the line, and the film is preferably wound up while being controlled so as to receive a defined winding-up tension. If there are differences in temperature of the film depending on palaces in the film forming line, since the lengths of the film are slightly different due to thermal expansion in some cases, the stretch ratio between the nip rolls must be adjusted so that the film on the way of the line is not subjected to a tension larger than a specified tension.

The winding-up can be performed in a defined tension by control of the tension control, but more preferably with a suitable winding-up tension tapered corresponding to the winding-up diameter. Generally, the tension is gradually decreased as the winding-up diameter increases, but in some cases, it is preferable that the tension be made larger as the winding-up diameter becomes large.

<Stretching Process>

The melt-film formed cycloolefin film may be transversely and longitudinally stretched, and may further be subjected to the relaxation treatment in combination therewith. These can be carried out for example in the following combination.

1. transverse stretching
2. transverse stretching→relaxation treatment
3. longitudinal stretching→transverse stretching
4. longitudinal stretching→transverse stretching→relaxation treatment
5. longitudinal stretching→relaxation treatment→transverse stretching→relaxation treatment
6. transverse stretching→longitudinal stretching→relaxation treatment
7. transverse stretching→relaxation treatment→longitudinal stretching→relaxation treatment
8. longitudinal stretching→transverse stretching→longitudinal stretching
9. longitudinal stretching→transverse stretching→longitudinal stretching→relaxation treatment
10. longitudinal stretching
11. longitudinal stretching→relaxation treatment Among these, more preferable are 1 to 4 and 10 and 11; still more preferable are 2, 4 and 11. Among these, more preferable are 1 to 4; still more preferable are 2 and 4.

Performing the stretching of the present invention described below can effectively reduce tailing streaks of the present invention and also improve the rupture elongation. When a film becomes thin in stretching, the thickness of tailing parts decreases and the number thereof decreases, but in a common stretching method, the stretching stress is liable to concentrate on weak parts, and tailing parts, whose thickness is slightly thicker, are hardly stretched. By contrast, since the stretching method of the present invention can apply a uniform in-plane stretching stress, tailing parts as well as regular parts are similarly stretched, whereby tailing trouble can be effectively reduced. Additionally, such a uniform stretching can effectively stretch molecules curling in a film and consequently can form intermolecular entanglement, thus providing also an effect of improving rupture elongation.

(Longitudinal Stretching)

In the present invention, transverse stretching and longitudinal stretching can be preferably performed in combination thereof. In this case, the transverse stretching is more preferably performed after the longitudinal stretching.

Longitudinal stretching can be achieved by installing two pairs of nip rolls and making the periphery speed of the outlet-side nip rolls higher than that of the inlet-side nip rolls while heating between the pairs. At this time, the development of the thickness-direction retardation can be varied by altering the interval (L) between the pairs of nip rolls and the film width (W) before stretching. The L/W (referred to as a length/width ratio) exceeding 2 and not more than 50 (long span stretching) can make Rth small; and the length/width ratio of not less than 0.01 and not more than 0.3 (short span stretching) can make Rth large. In the present invention, any of the long span stretching, short span stretching and a region therebetween (intermediate stretching=L/W exceeding 0.3 and not more than 2) may be used, but the long span stretching and the short span stretching, which can make the orientation angle small, are preferable. Further, in the case of aiming at a higher Rth, the short span stretching is more preferably used; and in the case of aiming at a lower Rth, separately the long span stretching is more preferably used.

(1-1) Long Span Stretching

A film is stretched with stretching while the film reduces its thickness and width to make its volume change small. At this time, the contraction in the width direction is restricted by the friction between the nip rolls and the film. Therefore, making the nip roll interval large makes width-direction contraction easy and can suppress the thickness reduction. A large thickness reduction has the same effect as compression in the thickness direction of the film, and progresses molecular orientation in the film plane and is liable to raise Rth. A large length/width ratio and a small thickness reduction hardly develop Rth by contrast, and can achieve a low Rth.

Further, a large length/width ratio can improve the uniformity in the width direction. This is due to the following reason.

- A film tends to contract in the width direction with longitudinal stretching. The central part in the width direction cannot freely contract because it is placed in a pulling state due to that both edges each tending to contract in the width direction.
- On the other hand, an edge part in the width direction of a film is placed in a pulling state with the edge side only, so the film edge part can freely contract.
- This difference in contraction behavior involved in stretching between both the edge parts and the central part makes stretching unevenness. Due to such a nonuniformity between both the edge parts and the central part, the width-direction retardation and the axial deviation (orientation angle distribution of slow axis) are generated. By contrast, in the long span stretching, since a film is slowly stretched between the pairs of nip rolls, uniformization of such nonuniformities (molecular orientation is uniformized) progresses. By contrast, in common longitudinal stretching (length/width ratio exceeding 0.3 and less than 2), such a uniformity is not generated.

The length/width ratio is preferably more than 2 and not more than 50, more preferably 3 to 40, still more preferably 4 to 20. The preferable stretching temperature is (Tg−5° C.) to (Tg+100° C.), more preferably (Tg) to (Tg+50° C.), still more preferably (Tg+5° C.) to (Tg+30° C.). The preferable stretching magnification is 1.05 to 3 times, more preferably 1.05 to 1.7, still more preferably 1.05 to 1.4. Such a long span stretching may be achieved with a multi-stage stretching of three or more pairs of nip rolls as long as the most large length/width ratio of the multi-stage is in the above range.

Such a long span stretching is performed by heating a film between two pairs of nip rolls separated with a predetermined distance. The heating method may be heater heating methods (wherein infrared heaters, halogen heaters, panel heaters or the like are installed above and under a film to heat the film by radiant heat), or zone heating methods (wherein a film is heated in a zone where hot air is blown in to control the temperature at a predetermined one). In the present invention, the zone heating methods are preferable in view of the uniformity of the stretching temperature. At this time, the nip rolls may be installed inside the stretching zone or outside the zone, but the installation outside the zone is preferable for preventing adhesion of a film and the nip rolls. Preheating the film before such a stretching is preferable and the preheating temperature is not less than Tg−80° C. and not more than Tg+100° C.

According to such a stretching, the Re value is 0 to 200 nm, more preferably 10 to 200 nm, still more preferably 15 nm to 100 nm; the Rth value is 30 to 500 nm, more preferably 50 to 400 nm, still more preferably 70 to 350 nm. According to this stretching method, the ratio of Rth and Re (Rth/Re) can be made to be 0.4 to 0.6, more preferably 0.45 to 0.55. Films having such characteristics can be used as an A-plate type retardation plate. Further, according to this stretching, each of the dispersions in the Re value and the Rth value can be made to be not more than 5%, more preferably not more than 4%, still more preferably not more than 3%.

According to such a stretching, the ratio of film widths before and after stretching (a film width after stretching/a film width before stretching) is made to be 0.5 to 0.9, more preferably 0.6 to 0.85, still more preferably 0.65 to 0.83.

(1-2) Short Span Stretching

The longitudinal stretching (short span stretching) is performed with the length/width ratio (L/W) exceeding 0.01 and less than 0.3, more preferably 0.03 to 0.25, still more preferably 0.05 to 0.2. Stretching with a length/width ratio (L/W) in such a range enables the neck-in (contraction in the direction orthogonal to stretching following stretching) to be small. Although the width and the thickness are reduced to make up for the elongation in the stretching direction, in such a short span stretching, the width contraction is suppressed and the thickness reduction preferentially progresses. As a result, the thickness direction becomes like compressed and the orientation in the thickness direction (plane orientation) progresses. Consequently, Rth, which is a measure of the anisotropy in the thickness direction, is liable to increase. On the other hand, the stretching is conventionally generally performed with the length/width ratio (L/W) of about 1 (0.7 to 1.5). This is because in conventional stretching with heating heaters installed between nip rolls, if L/W is too large, a film is hardly uniformly heated by heaters and stretching unevenness is easily generated; if L/W is too small, the installation of heaters is difficult and heating cannot be sufficiently performed.

The above-mentioned short span stretching can be achieved by varying the transportation speeds between two or more pairs of nip rolls, but can be achieved by arranging diagonally two pairs of nip rolls (by deviating front nip rolls and back nip rolls up and down), different from the common roll arrangement. Along with this, a heating heater cannot be installed between nip rolls, so the temperature of a film is preferably raised by making a heat medium flow in the nip rolls. It is also preferable that a preheating rolls inside which a heat medium is made to flow be further installed prior to the inlet-side nip rolls and a film be heated before stretching.

The preferable stretching temperature is (Tg−5° C.) to (Tg+100° C.), more preferably (Tg) to (Tg+50° C.), still more preferably (Tg+5° C.) to (Tg+30° C.). The preferable preheating temperature is not less than Tg−80° C. and not more than Tg+100° C.

(Transverse Stretching)

The transverse stretching is achieved using a tenter. That is, both edge parts in the width direction of a film are grasped with clips and enlarged in the transverse directions for stretching. At this time, the stretching temperature can be controlled by blowing air of a desired temperature in the tenter. The stretching temperature is preferably not less than Tg−10° C. and not more than Tg+60° C., more preferably not less than Tg−5° C. and not more than Tg+45° C., still more preferably not less than Tg and not more than Tg+30° C.

Performing the preheating before the stretching and the thermal fixation after the stretching can lessen the Re and Rth distributions and the dispersion in orientation angle involved in bowing. Only one of the preheating and the thermal fixation is sufficient, but performing both is more preferable. The preheating and the thermal fixation are preferably performed while the film is being grasped with clips, that is, they are preferably performed continuously with stretching.

The preheating temperature is not less than 1° C. and not more than 50° C. higher than the stretching temperature, more preferably not less than 2° C. and not more than 40° C. higher than that, still more preferably not less than 3° C. and not more than 30° C. higher than that. The preferable preheating time is not less 1 sec than and not more than 10 min, more preferably not less 5 sec than and not more than 4 min, still more preferably not less 10 sec than and not more than 2 min. On the preheating, the width of the tenter is preferably kept nearly a constant. Here, "nearly" means ±10% of the unstretched film width.

The thermal fixation temperature is not less than 1° C. and not more than 50° C. lower than the stretching temperature, more preferably not less than 2° C. and not more than 40° C. lower than that, still more preferably not less than 3° C. and not more than 30° C. higher than that. The preferable preheating time is not less than 1 sec and not more than 10 min, more preferably not less than 5 sec and not more than 4 min, still more preferably not less than 10 sec and not more than 2 min. On the thermal fixation, the width of the tenter is preferably kept nearly a constant. Here, "nearly" means 0% of the tenter width after the finish of stretching (the same width as the tenter width after stretching) to −10% thereof (contracted by 10% from the tenter width after stretching=contracted width). Enlargement in width of more than the stretching width is unpreferably liable to generate the residual strain in the film and increase the variation over time of Re and Rth.

The thermal fixation temperature<the stretching temperature<the preheating temperature is thus preferable.

That such a preheating and a thermal fixation enable the dispersions in orientation angle and Re and Rth to be small comes from the following reason.

A film is stretched in the transverse directions and tends to thicken in the orthogonal direction (longitudinal direction)(neck-in). Therefore, the film before and after the transverse stretching is pulled and generates a stress. However, both edges in the width direction are fixed by chucks, so the edge parts are hardly susceptible to deformation due to the stress, but the central part in the width direction is susceptible to deformation. Consequently, the stress due to neck-in deforms in a bow shape and generates bowing. Thereby, the unevenness in the in-plane Re and Rth and the distribution of the orientation angle are generated.

For suppressing this, if the temperature of the preheating (before stretching) is raised and the temperature of the thermal treatment (after stretching) is lowered, the neck-in is generated at a higher temperature side (preheating), where the elasticity is lower, and is hardly generated at the thermal treatment (after stretching). Consequently, the bowing after stretching can be suppressed.

Such a stretching can further make the dispersions in the width and longitudinal directions of Re and Rth to be each not more than 5%, more preferably not more than 4%, still more preferably not more than 3%. That can further make the orientation angle to be not more than 90°±5°, or not more than 0°±5°, more preferably not more than 90°±3°, or not more than 0°±3°, still more preferably not more than 90°±1°, or not more than 0°±1°.

The present invention has a feature that such an effect can be achieved even in a high speed stretching, and remarkably exhibits the effect preferably at not less than 20 m/min, more preferably at not less than 25 m/min, still more preferably at not less than 30 m/min.

<Relaxation Treatment>

Additionally performing the relaxation treatment after stretching can improve the dimensional stability. The thermal relaxation is preferably performed after the longitudinal stretching or after the transverse stretching, or after the both, and more preferably after the transverse stretching. The relaxation treatment may be performed on-line continuously after the stretching, or off-line after winding-up after the stretching.

The thermal relaxation is preferably performed at not less Tg−30° C. than and not more than Tg+30° C., more preferably not less Tg−30° C. than and not more than Tg+20° C., still more preferably not less Tg−15° C. than and not more than Tg+10° C.; for not less than 1 sec and not more than 10 min, more preferably not less than 5 sec and not more than 4 min, still more preferably not less than 10 sec and not more than 2 min; and at a tension on transportation of not less than 0.1 kg/m and not more than 20 kg/m, more preferably not less than 1 kg/m and not more than 16 kg/m, still more preferably not less than 2 kg/m and not more than 12 kg/m.

<Volatile Components During Stretching>

In the above-mentioned longitudinal stretching and transverse stretching, volatile components (such as solvents and moisture) are preferably not more than 1% by weight to the resin, more preferably not more than 0.5% by weight, still more preferably 0.3% by weight. This enables the axial deviation generated during stretching to be slight. This is because in addition to a contraction stress exerted in the direction orthogonal to the stretching during stretching, a contraction stress involved in drying is exerted and the bowing becomes remarkable.

<Physical Properties After Stretching>

The thermoplastic film thus subjected to longitudinal stretching, transverse stretching or longitudinal and transverse stretching preferably has Re and Rth satisfying the following expressions (R-1) and (R-2), respectively.

$$0 \text{ nm} \leq Re \leq 200 \text{ nm} \quad \text{Expression (R-1)}$$

$$0 \text{ nm} \leq Rth \leq 600 \text{ nm} \quad \text{Expression (R-2)}$$

(wherein Re denotes an in-plane retardation of the thermoplastic film; and Rth denotes a thickness-direction retardation thereof.)

More preferably,
$Rth \geq Re \times 1.1$,
$180 \geq Re \geq 10$, and
$400 \geq Rth \geq 50$, and
still more preferably,
$Rth \geq Re \times 1.2$,
$150 \geq Re \geq 20$, and
$300 \geq Rth \geq 100$ An angle θ made by the film forming direction (longitudinal direction) and a slow axis of Re of the film is preferably as near to 0°, +90° or −90° as possible. That is, in the case of the longitudinal stretching, the angle is preferably as near to 0° as possible and preferably 0±3°, more preferably 0±2°, still more preferably 0+1°. In the case of the transverse stretching, the angle is preferably 90°±3° or −90°±3°, more preferably 90°±2° or −90°±2°, still more preferably 90°±1° or −90°±1°.

The dispersions in Re and Rth are each preferably 0% to 8%, more preferably 0% to 5%, still more preferably 0% to 3%.

The variations under preservation over time in Re and Rth (changes in Re and Rth before and after the elapse of 500 hours at 80° C., details will be described later.) are each preferably not less than 0% and not more than 8%, more preferably not less than 0% and not more than 6%, still more preferably not less than 0% and not more than 4%.

The thermoplastic film after stretching preferably has a thickness of 15 μm to 200 μm, more preferably 20 μm to 120

μm, still more preferably 30 μm to 80 μm. The thickness unevenness in either of the longitudinal direction and the width direction is preferably 0% to 3%, more preferably 0% to 2%, still more preferably 0% to 1%. Use of a thin film hardly remains a residual strain in the film after stretching and hardly generates retardation change over time. This is because when the film is cooled after stretching, if the film is thick, the cooling of the interior of the film is retarded as compared with that of the surface thereof, and a residual strain caused by a difference in thermal contraction amount is liable to generate.

The thermal dimensional changing rate is preferably not less than 0% and not more than 0.5%, more preferably not less than 0% and not more than 0.3%, still more preferably not less than 0% and not more than 0.2%. Here, the thermal dimensional changing rate refers to a dimensional change when a film is thermally treated at 80° C. for 5 hours (details will be described later.).

<Processing of the Cycloolefin Film>

The cycloolefin film of the present invention thus obtained may be used singly, used in combination with a polarization plate, or used with a liquid crystal layer, a layer whose refractive index has been controlled (low reflection layer) or a hard coat layer installed thereon. These can be achieved by the following processes.

(Surface Treatment)

The glow discharge treatment, ultraviolet irradiation treatment, corona treatment, flame treatment and acid or alkali treatment can be used. The glow discharge treatment mentioned here involves a low-temperature plasma treatment generated in a low-pressure gas of $10^{-3}$ to 20 Torr (0.13 to 2,700 Pa). The plasma treatment under atmospheric pressure is also a preferable glow discharge treatment.

A plasma excitable gas refers to a gas plasma-excited under the above-mentioned condition, and includes argon, helium, neon, krypton, xenon, nitrogen, carbon dioxide, chlorofluorocarbons such as tetrafluoromethane, and a mixture thereof. These are in detail described on page 30 to page 32 in JIII Journal of Technical Disclosure (No. 2001-1745, issued on Mar. 15, 2001, Japan Institute of Invention and Innovation). The plasma treatment under atmospheric pressure, which has been recently given attention, uses, for example, an irradiation energy of 20 to 500 kGy at 10 to 1,000 keV, more preferably that of 20 to 300 kGy at 30 to 500 keV.

Among these most preferable are the glow discharge treatment, corona treatment and flame treatment.

Providing of an undercoat layer for the adhesion with a functional layer is also preferable. This layer may be applied after the above-mentioned surface treatment, or without the surface treatment. The detail of the undercoat layer is described on page 32 in JIII Journal of Technical Disclosure (No. 2001-1745, issued on Mar. 15, 2001, Japan Institute of Invention and Innovation).

These surface treatment and undercoat process can be incorporated as the final of a film forming process, performed singly, or performed in a functional layer-imparting process described later.

(Imparting of Functional Layers)

The cycloolefin film of the present invention is preferably combined with functional layers described in detail on page 32 to page 45 in JIII Journal of Technical Disclosure (No. 2001-1745, issued on Mar. 15, 2001, Japan Institute of Invention and Innovation). Among them preferable are imparting of a polarization layer (polarization plate), imparting of an optical compensation layer (optical compensation sheet) and imparting of a reflection preventing layer (reflection preventing film).

(A) Imparting of a Polarization Layer (Fabrication of a Polarization Plate)

(A-1) Materials to be Used

At present, commercially available polarization layers are generally fabricated by immersing a stretched polymer in a solution of iodide or a dichroic dye in a bath to infiltrate the iodide or the dichroic dye into the binder. As a polarization film, a coating type polarization film typified by Optiva Inc. can be also utilized. Iodide and a dichroic dye in a polarization film develop the polarization performance by their orientation in a binder. As a dichroic dye, azo dyes, stilbene dyes, pyrazolone dyes, triphenylmethane dyes, quinoline dyes, oxazine dyes, thiazine dyes or anthraquinone dyes are used. The dichroic dyes are preferably water-soluble. The dichroic dyes preferably have a hydrophilic substituent (for example, a sulfo group, an amino group and a hydroxyl group). For example, compounds described on page 58 in JIII Journal of Technical Disclosure (No. 2001-1745, issued on Mar. 15, 2001, Japan Institute of Invention and Innovation) are included.

A binder to be used for the polarization film may be either of a self-crosslinkable polymer and a polymer to be crosslinked with a crosslinking agent, and a plurality of these combinations can be used. The binders include, for example, methacrylate copolymers, styrenic copolymers, polyolefins, polyvinyl alcohols and modified polyvinyl alcohols, poly(N-methylolacrylamide)s, polyesters, polyimides, vinyl acetate copolymers, carboxymethylcelluloses and polycarbonates, which are described in paragraph 0022 in Japanese Patent Application Laid-Open No. 8-338913. Silane coupling agents can be used as a polymer. Water-soluble polymers (for example, poly(N-methylolacrylamide)s, carboxymethylcelluloses, gelatin, polyvinyl alcohols and modified polyvinyl alcohols) are preferable; gelatin, polyvinyl alcohols and modified polyvinyl alcohols are more preferable; and polyvinyl alcohols and modified polyvinyl alcohols are most preferable. Two kinds of polyvinyl alcohols or modified polyvinyl alcohols having different polymerization degrees are especially preferably used. The saponification degree of the polyvinyl alcohol is preferably 70 to 100%, more preferably 80 to 100%. The polymerization degree of the polyvinyl alcohol is preferably 100 to 5,000. The modified polyvinyl alcohols are described in Japanese Patent Application Laid-Open Nos. 8-338913, 9-152509 and 9-316127. The polyvinyl alcohols and the modified polyvinyl alcohols may be used concurrently in two or more kinds.

The lower limit of the binder thickness is preferably 10 μm. The upper limit thereof is preferably as thin as possible in view of light leakage from a liquid crystal display. The upper-limit thickness is preferably not more than the thickness of polarization plates now commercially available (about 30 μm), preferably not more than 25 μm, more preferably not more than 20 μm.

The binder of a polarization film may be crosslinked. A polymer or monomer having a crosslinkable functional group may be mixed in the binder; or a crosslinkable functional group may be imparted to a binder polymer itself. Crosslinking can be carried out with light, heat or pH change to form a binder having a crosslinked structure. The crosslinking agents are described in U.S. Reissue Pat. No. 23297. Boron compounds (for example, borate and borax) can also be used as a crosslinking agent. The addition amount of a crosslinking agent of a binder is preferably 0.1 to 20% by mass to the binder. This brings about a favorable orientation of a polarization element and a favorable moisture and thermal resistance of a polarization film.

Even after the finish of the crosslinking reaction, the unreacted crosslinking agent is preferably not more than 1.0% by mass, more preferably not more than 0.5% by mass, thereby improving the weather resistance.

(A-2) Stretching of a Polarization Layer

A polarization film is preferably obtained by stretching a polarization film (stretching method), or dyeing with iodide or a dichroic dye after rubbing (rubbing method).

In the case of the stretching method, the stretching magnitude is preferably 2.5 to 30.0 times, more preferably 3.0 to 10.0 times. The stretching can be performed by the dry stretching in the air. The stretching can also be performed by the wet stretching in the state of immersing in water. The stretching magnitude of the dry stretching is preferably 2.5 to 5.0 times; that of the wet stretching is preferably 3.0 to 10.0 times. The stretching may be performed parallel with the MD direction (parallel stretching) or in the diagonal direction (diagonal stretching). The stretching may be performed once or by dividing in several times. Dividing in several times enables more uniform stretching even in a high-magnitude stretching.

a) Parallel Stretching Method

Prior to stretching, PVA film is swollen. The swelling degree is 1.2 to 2.0 times (a weight ratio of before and after swelling). Thereafter, the film is, while being continuously transported through guide rolls, stretched in an aqueous medium bath or a dyeing bath in which a dichroic substance is dissolved, at a bath temperature of 15 to 50° C., particularly 17 to 40° C. The stretching is achieved by grasping the film with two pairs of nip rolls and making the transport speed of the back-stage rolls higher than that of the front-stage rolls. The stretching magnitude, based on a length ratio of after stretching/initial state (same hereafter), is preferably 1.2 to 3.5 times, particularly 1.5 to 3.0 times in view of the above-mentioned effect. Thereafter, the film is dried at 50° C. to 90° C. to obtain a polarization film.

b) Diagonal Stretching Method

This method can use a stretching method using a tenter diagonally overhanging, described in Japanese Patent Application Laid-Open No. 2002-86554. Since this stretching is performed in the air, it is necessary to make stretching easy by previously hydrating the film. The preferable moisture content is not less than 5% and not more than 10%, more preferably not less than 10% and not more than 100%.

The temperature on stretching is preferably not less than 40° C. and not more than 90° C., more preferably not less than 50° C. and not more than 80° C. The humidity is preferably not less than 50% RH and not more than 100% RH, more preferably not less than 70% RH and not more than 100% RH, still more preferably not less than 80% RH and not more than 100% RH. The advancing speed in the longitudinal direction is preferably not less than 1 m/min, more preferably 3 m/min. After the finish of the stretching, the film is dried at not less than 50° C. and not more than 100° C., more preferably not less than 60° C. and not more than 90° C., for not less than 0.5 min and not more than 10 min. Not less than 1 min and not more than 5 min are more preferable.

The absorption axis of the polarization film thus obtained is preferably 10° to 80°, more preferably 30° to 60°, still more preferably substantially 45° (40° to 50°).

(A-3) Lamination

The cellulose acylate film after the above-mentioned saponification and the polarization layer prepared by stretching are laminated to prepare a polarization plate. The laminating direction is preferably made such that the casting axis direction of the cellulose acylate film and the stretching axis direction of the polarization plate make 45°.

An adhesive for the lamination is not especially limited, but includes PVA resins (including PVAs modified with an acetoacetyl group, sulfonic acid group, carboxyl group, oxyalkylene group or the like) and aqueous solutions of boron compounds, and particularly PVA resins among them are preferable. The thickness of the adhesive after drying is preferably 0.01 to 10 μm, particularly preferably 0.05 to 5 μm.

The light transmittance of the polarization plate thus obtained is preferably as high as possible, and the polarization degree thereof is preferably as high as possible. The transmittance of the polarization plate is preferably in the range of 30 to 50% at light of 550 nm in wavelength, more preferably in the range of 35 to 50%, most preferably in the range of 40 to 50%. The polarization degree thereof is preferably in the range of 90 to 100% at light of 550 nm in wavelength, more preferably in the range of 95 to 100%, most preferably in the range of 99 to 100%.

Further, circularly polarized light can be fabricated by laminating the polarization plate thus obtained with a λ/4 plate. In this case, the lamination is performed such that the slow axis of the λ/4 plate and the absorbing axis of the polarization plate make 45°. At this time, the λ/4 plate is not especially limited, but more preferably one having a wavelength dependence of exhibiting a smaller retardation at a lower wavelength. Additionally, a polarization film having an absorbing axis tilting through 20° to 70° against the longitudinal direction is preferably used; and a λ/4 plate composed of an optically anisotropic layer composed of a liquid crystalline compound is preferably used.

(B) Imparting of an Optical Compensation Layer (Fabrication of an Optical Compensation Sheet)

An optically anisotropic layer is for compensating for a liquid crystal compound in liquid crystal cells for black displaying of a liquid crystal display, and is formed by forming an alignment film on a cellulose acylate film and further imparting an optically anisotropic layer.

(B-1) Alignment Film

An alignment film is provided on a cellulose acylate film whose surface has been treated as above-mentioned. This film has a function of specifying the alignment direction of liquid crystalline molecules. However, if the alignment state of a liquid crystalline compound is fixed after the liquid crystalline compound has been aligned, since the alignment film serves its function, this process of providing an alignment film is not necessarily essential as the composing element of the present invention. That is, the polarization plate of the present invention can also be fabricated by transferring only an optically anisotropic layer on the alignment film whose alignment state has been fixed, on a polarizer.

The alignment film can be provided by a method such as the rubbing treatment of an organic compound (preferably, a polymer), the oblique deposition of an inorganic compound, the formation of a layer having a micro groove or the build-up of an organic compound (for example, ω-tricosanic acid, dioctadecylmethylammonium chloride and methyl stearate) by the Langmuir-Plodgett method (LB film). Further, alignment films generating the alignment function by imparting of electric field, imparting of magnetic field and light irradiation are also known.

The alignment film is preferably formed by the rubbing treatment of a polymer. The polymer used for the alignment film has, in principle, a molecular structure having a function of aligning liquid crystalline molecules.

In the present invention, in addition to the function of aligning liquid crystalline molecules, it is preferable that a side chain having a crosslinkable functional group (e.g. double bond) be bonded to the main chain, or a crosslinkable functional group having a function to align liquid crystalline molecules be incorporated into the side chain.

As the polymer used for the alignment film, either of a self-crosslinkable polymer and a polymer to be crosslinked with a crosslinking agent can be used, and a plurality of these combinations can be used. Examples of the polymers include methacrylate copolymers, styrenic copolymers, polyolefins, polyvinyl alcohols and modified polyvinyl alcohols, poly(N-methylolacrylamide)s, polyesters, polyimides, vinyl acetate copolymers, carboxymethylcelluloses and polycarbonates, which are described in paragraph 0022 in Japanese Patent Application Laid-Open No. 8-338913. Silane coupling agents can be used as the polymer. Water-soluble polymers (for example, poly(N-methylolacrylamide)s, carboxymethylcelluloses, gelatin, polyvinyl alcohols and modified polyvinyl alcohols) are preferable; gelatin, polyvinyl alcohols and modified polyvinyl alcohols are more preferable; and polyvinyl alcohols and modified polyvinyl alcohols are particularly preferable. Two kinds of polyvinyl alcohols or modified polyvinyl alcohols having different polymerization degrees are most preferably used. The saponification degree of the polyvinyl alcohol is preferably 70 to 100%, more preferably 80 to 100%. The polymerization degree of the polyvinyl alcohol is preferably 100 to 5,000.

Side chains having a function of aligning liquid crystalline molecules generally have a hydrophobic group as a functional group. The specific kind of a functional group is decided according to the kind of liquid crystalline molecule and the alignment state to be needed. For example, modifying groups for a modified polyvinyl alcohol can be incorporated by copolymerization modification, chain transfer modification or block polymerization modification. Examples of modifying groups include hydrophilic groups (a carboxylic acid group, sulfonic acid group, phosphonic acid group, amino group, ammonium group, amide group, thiol group, etc.), hydrocarbon groups having 10 to 100 carbon atoms, hydrocarbon groups substituted with a fluorine atom, a thioether group, polymerizable groups (an unsaturated polymerizable group, epoxy group, aziridinyl group, etc.), alkoxysilyl groups (trialkoxy, dialkoxy, monoalkoxy). Specific examples of these modified polyvinyl alcohol compounds include those described, for example, in paragraphs 0022 to 0145 of Japanese Patent Application Laid-Open No. 2000-155216 and in paragraphs 0018 to 0022 of Japanese Patent Application Laid-Open No. 2002-62426.

If a side chain having a crosslinkable functional group is bonded to the main chain of an alignment film polymer, or a crosslinkable functional group is incorporated to the side chain having a function to align liquid crystalline molecules, the polymer of the alignment film and polyfunctional monomers contained in an optically anisotropic layer can be copolymerized. Consequently, not only a polyfunctional monomer and a polyfunctional monomer, but an alignment film polymer and an alignment film polymer, as well as a polyfunctional monomer and an alignment film polymer are firmly bonded with a covalent bond. Therefore, incorporation of a crosslinkable functional group to an alignment film polymer can remarkably improve the strength of an optical compensation sheet.

The crosslinking functional group of an alignment film polymer preferably contains a polymerizable group as the polyfunctional monomer. Specific examples include those described in paragraphs 0080 to 0100 of Japanese Patent Application Laid-Open No. 2000-155216. The alignment film polymer can be crosslinked using a crosslinking agent, separatedly from the above-mentioned crosslinkable functional group.

The crosslinking agent includes aldehydes, N-methylol compounds, dioxane derivatives, compounds which act by activation of a carboxyl group, active vinyl compounds, active halogen compounds, isoxazol and dialdehyde starch. Two or more crosslinking agents may be concurrently used. Specific examples include compounds described in paragraphs 0023 to 0024 of Japanese Patent Application Laid-Open No. 2002-62426. Aldehydes, which have a high reactive activity, especially glutaraldehyde, are preferable.

The addition amount of a crosslinking agent is preferably 0.1 to 20% by mass to a polymer, more preferably 0.5 to 15% by mass. The amount of an unreacted crosslinking agent remaining in an alignment film is preferably not more than 1.0% by mass, more preferably not more than 0.5% by mass. Such a control allows a sufficient durability generating no reticulation even if the alignment film is used for a long time for a liquid crystal display and is left for a long time under a high-temperature and high-humidity atmosphere.

The alignment film can be formed basically by applying the above-mentioned polymer containing a crosslinking agent, which is an alignment film forming material, on a transparent supporter, and then heating for drying (crosslinking) the applied material and subjecting the heated material to rubbing treatment. The crosslinking reaction may be performed at any period after the application on the transparent supporter as described above. In the case where a water-soluble polymer like a polyvinyl alcohol is used as an alignment film forming material, the applying liquid is preferably a mixed solvent of an organic solvent having a defoaming function (e.g. methanol) and water. The mixing ratio by mass of water:methanol is preferably 0:100 to 99:1, more preferably 0:100 to 91:9. Thereby, generation of bubbles is suppressed and defects of an alignment film and further the layer surface of an optically anisotropic layer are remarkably reduced.

As an applying method of an alignment film, the spin coating, dip coating, curtain coating, extrusion coating, rod coating or roll coating is preferable. Especially the rod coating method is preferable. The thickness after drying is preferably 0.1 to 10 μm. The heat drying can be performed at 20° C. to 110° C. For forming a sufficient crosslinking, it is preferably 60° C. to 100° C., particularly preferably 80° C. to 100° C. The drying time can be 1 min to 36 hours, preferably 1 min to 30 min. The pH is preferably set at an optimum value for a crosslinking agent to be used; in the case of using glutaraldehyde, pH is preferably 4.5 to 5.5, particularly preferably 5.0.

The alignment film is provided on a transparent supporter or the above-mentioned undercoat layer. The alignment film can be obtained by crosslinking a polymer layer as described above, and then subjecting its surface to rubbing treatment.

A treatment method broadly adopted as a liquid crystal alignment process of LCDs can be applied to the above rubbing treatment. That is, the method is one in which the surface of an alignment film is rubbed in a certain direction using paper, gauze, felt, rubber, nylon, polyester fibers or the like to obtain the alignment. Generally, the alignment is performed by rubbing several times using a fabric on which fibers uniform in length and thickness are evenly transplanted or other materials.

In the industrial alignment, the alignment is achieved by bringing a rotating rubbing roll into contact against a film being transported with a polarization layer attached, and the circularity, cylindricity and fluctuation (eccentricity) of the rubbing roll are each preferably not more than 30 μm. The lapping angle of the film on the rubbing roll is preferably 0.1° to 90°. Herein, a stable rubbing treatment can also be provided by winding the film by not less than 360° as described in Japanese Patent Application Laid-Open No. 8-160430. The transportation speed of a film is preferably 1 to 100 m/min. A suitable rubbing angle is preferably selected in the range of 0 to 60°. In the case of using the film for liquid crystal displays, the angle is preferably 40 to 50°, particularly preferably 45°.

The thickness of the alignment film thus obtained is preferably in the range of 0.1 to 10 μm.

Then, liquid crystalline molecules in an optically anisotropic layer are aligned on the alignment film. Thereafter, as required, the alignment film polymer and polyfunctional monomers contained in the optically anisotropic layer are allowed to react, or the alignment film polymer is crosslinked with a crosslinking agent.

Liquid crystalline molecules used in the optically anisotropic layer include a rod-shaped liquid crystalline molecule and a disc-shaped liquid crystalline molecule. The rod-shaped liquid crystalline molecule and the disc-shaped liquid crystalline molecule may be a polymeric liquid crystal or a low molecular liquid crystal, and further include also a low molecular liquid crystal which has been crosslinked and exhibits no crystallinity.

(B-2) Rod-Shaped Liquid Crystalline Molecules

As a rod-shaped liquid crystalline molecule preferably used are azomethines, azoxys, cyanobiphenyls, cyanophenyl esters, benzoates, cyclohexanecarboxylic acid phenyl esters, cyanophenylcyclohexanes, cyano-substituted phenylpyrimidines, alkoxy-substituted phenylpyrimidines, phenyldioxanes, tolans and alkenylcyclohexylbenzonitriles.

Rod-shaped liquid crystalline molecules include metal complexes as well. Further, liquid crystal polymers containing a rod-shaped liquid crystalline molecule in their repeating unit are also used as a rod-shaped liquid crystalline molecule. In other words, a rod-shaped liquid crystalline molecule may be bonded to a (liquid crystal) polymer.

Rod-shaped liquid crystalline molecules are described in chapters 4, 7 and 11 of Quarterly chemical Review Vol. 22 "Chemistry of Liquid Crystal" (1994), edited by the Chemical Society of Japan, and in chapter 3 of Liquid Crystal Device Handbook, edited by The Japan Society of the Promotion of Science, No. 142 committee.

The birefractive index of the rod-shaped liquid crystalline molecule is preferably in the range of 0.001 to 0.7. The rod-shaped liquid crystalline molecule preferably has a polymerizable group for fixing its alignment state. The polymerizable group is preferably a radical polymerizable unsaturated group or a cationic polymerizable group, and specifically includes, for example, polymerizable groups and polymerizable liquid crystal compounds described in paragraphs 0064 to 0086 of Japanese Patent Application Laid-Open No. 2002-62427.

(B-3) Disc-Shaped Liquid Crystalline Molecules

Disc-shaped (discotic) liquid crystalline molecules include benzene derivatives described in a research report of C. Destrade et al., Mol.Cryst., Vol. 71, p. 111(1981); toluxene derivatives described in research reports of C. Destrade et al., Mol.Cryst., Vol. 122, p. 141(1985) and Physieslett, A, Vol. 78, p. 82(1990); cyclohexane derivatives described in a research report of Kohne et al., Angew. Chem., Vol. 96, p. 70(1984); and azacrown and phenylacetylene macrocycles described in a research report of J. M. Lehn et al., J. Chem. Commun., p. 1794(1985) and a research report of J. Zhang et al., J. Am. Chem. Soc., Vol. 116, p. 2655(1994).

Disc-shaped liquid crystalline molecules also include compounds exhibiting the crystallinity and having a structure in which a linear alkyl group, alkoxy group or substituted benzoyloxy group is radially substituted as a side chain of a mother nucleus at the molecular center. A molecule or an assembly of a molecule is preferably a compound having a rotary symmetry and capable of imparting a defined alignment. For an optically anisotropic layer formed of a disc-shaped liquid crystalline molecule, a compound finally contained in the optically anisotropic layer is not necessarily a disc-shaped liquid crystalline molecule, and also includes, for example, a compound formed by polymerization or crosslinking of a low molecular disc-shaped liquid crystalline molecule which has a reactive group to react by heat or light, and is eventually polymerized and crosslinked by heat or light and is macromolecularized and loses liquid crystallinity. A preferable example of a disc-shaped liquid crystalline molecule is described in Japanese Patent Application Laid-Open No. 8-50206. The polymerization of a disc-shaped liquid crystalline molecule is described in Japanese Patent Application Laid-Open No. 8-27284.

For fixing a disc-shaped liquid crystalline molecule by polymerization, a polymerizable group as a substituent must be bonded to the disc-shaped core of the disc-shaped liquid crystalline molecule. A compound obtained by bonding a disc-shaped core and a polymerizable group through a linking group is preferable, thereby enabling to hold the alignment state in the polymerization reaction. The compound includes, for example, a compound described in paragraphs 0151 to 0168 of Japanese Patent Application Laid-Open No. 2000-155216.

In a hybrid alignment, the angle made by the major axis (disc plane) of a disc-shaped liquid crystalline molecule and the plane of a polarization film increases or decreases with the increasing distance from the polarization film in the depth direction of an optically anisotropic layer. The angle preferably decreases with the increasing distance. Further, the variation in the angle can be a continuous increase, a continuous decrease, an intermittent increase, an intermittent decrease, a variation containing a continuous increase and a continuous decrease, or an intermittent variation containing an increase and a decrease. The intermittent variation includes a region where the tilt angle does not vary on the way in the thickness direction. The angle is allowed to include a region where the angle does not vary as long as the angle increases or decreases as a whole. Additionally, the angle is preferably varied continuously.

The average direction of the major axis of a disc-shaped liquid crystalline molecule on a polarization film side can be generally controlled by selecting a material of the disc-shaped liquid crystalline molecule or the polarization film, or by selecting a rubbing treatment method. The major axis (disc plane) direction of a disc-shaped liquid crystalline molecule on the surface side (the air side) can be generally controlled by selecting a kind of additive used together with the disc-shaped liquid crystalline molecule. The additive used together with the disc-shaped liquid crystalline molecule includes, for example, plasticizers, surfactants, polymerizable monomers and polymers. The degree of the variation in the alignment direction of the major axis can also be controlled by selecting a liquid crystalline molecule and an additive.

(B-4) Other Compositions of the Optically Anisotropic Layer

Concurrent use of a plasticizer, a surfactant, a polymerizable monomer and the like with the above liquid crystalline molecule can improve the uniformity of a coated film, the strength of the film, the alignability of liquid crystal molecules and the like. These substances are preferably ones which have a compatibility with the liquid crystal molecules and can vary the tilt angle of the liquid crystal molecules or does not inhibit the alignment thereof.

Polymerizable monomers include radically polymerizable or cationically polymerizable compounds. Polyfunctional radically polymerizable monomers are preferable, and those copolymerizable with a liquid crystal compound containing the above-mentioned polymerizable group. The polymerizable monomers include, for example, those described in paragraphs 0018 to 0020 of Japanese Patent Application Laid-Open No. 2002-296423. The addition amount of the above compound is generally in the range of 1 to 50% by mass to a disc-shaped liquid crystalline molecule, preferably in the range of 5 to 30% by mass.

Surfactants include conventionally well-known compounds, and especially fluorine compounds are preferable. Specific examples include compounds described in paragraphs 0028 to 0056 of Japanese Patent Application Laid-Open No. 2001-330725.

A polymer used together with a disc-shaped liquid crystalline molecule is preferably one which can impart the variation of the tilt angle to the disc-shaped liquid crystalline molecule.

An example of the polymer includes cellulose esters. Preferable Examples of cellulose esters include those described in paragraph 0178 of Japanese Patent Application Laid-Open No. 2000-155216. The addition amount of the above polymer is preferably in the range of 0.1 to 10% by mass to a liquid crystalline molecule so as not to inhibit the alignment of the liquid crystalline molecule, more preferably in the range of 0.1 to 8% by mass.

The transition temperature of the discotic nematic liquid crystal phase-solid phase of a disc-shaped liquid crystalline molecule is preferably 70 to 300° C., more preferably 70 to 170° C.

(B-5) Formation of Optically Anisotropic Layers

An optically anisotropic layer can be formed by applying on an alignment film a coating liquid containing a liquid crystalline molecule, and, as required, a polymerization initiator described later and other components.

A solvent used for preparing the coating liquid is preferably an organic solvent. Examples of organic solvents include amides (e.g. N,N-dimethylformamide), sulfoxides (e.g. dimethylsulfoxide), heterocyclic compounds (i.e. pyridine), hydrocarbons (e.g. benzene and hexane), alkyl halides (e.g. chloroform, dichloromethane and tetrachloroethane), esters (e.g. methyl acetate and butyl acetate), ketones (e.g. acetone and methyl ethyl ketone), and ethers (e.g. tetrahydrofuran and 1,2-dimethoxyethane). Alkyl halides and ketones are preferable. Two or more organic solvents may be concurrently used.

Application of the coating liquid can be performed by well-known methods (for example, wire bar coating, extrusion coating, direct gravure coating, reverse gravure coating and die coating).

The thickness of an optically anisotropic layer is preferably 0.1 to 20 μm, more preferably 0.5 to 15 μm, most preferably 1 to 10 μm.

(B-6) Fixation of an Alignment State of Liquid Crystalline Molecules

Aligned liquid crystalline molecules can be fixed while maintaining the alignment state. The fixation is preferably performed by a polymerization reaction. The polymerization reaction includes a thermal polymerization reaction using a thermal polymerization initiator and a photopolymerization reaction using a photopolymerization initiator. The photopolymerization reaction is preferable.

Examples of photopolymerization initiators include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), a combination of triarylimidazole dimmer and p-aminophenyl ketone (described in U.S. Pat. No. 3,549,367), acridine and phenazine compounds (described in Japanese Patent Application Laid-Open No. 60-105667 and U.S. Pat. No. 4,239,850), and oxadiazole compounds (described in U.S. Pat. No. 4,212,970).

The using amount of a photopolymerization initiator is preferably in the range of 0.01 to 20% by mass to the solid fraction of a coating liquid, more preferably in the range of 0.5 to 5% by mass.

The light irradiation for polymerization of liquid crystalline molecules preferably uses ultraviolet rays.

The irradiation energy is preferably in the range of 20 mJ/cm$^2$ to 50 J/cm$^2$, more preferably in the range of 20 mJ/cm$^2$ to 5,000 mJ/cm$^2$, still more preferably in the range of 100 mJ/cm$^2$ to 800 mJ/cm$^2$. For promoting the photopolymerization, light irradiation may be performed under a heating condition.

A protection layer may be provided on an optically anisotropic layer.

The optical compensation film and a polarization layer are preferably combined. Specifically, an optically anisotropic layer is formed by applying the above-mentioned coating liquid for an optically anisotropic layer on the surface of a polarization film. As a result, without using a polymer film between a polarization film and an optically anisotropic layer, a thin polarization plate having a low stress (strain×cross section×elastic modulus) involved in a dimensional change of the polarization film is fabricated. If the polarization plate according to the present invention is mounted on a large-size liquid crystal display, images of a high display quality can be displayed with no problems such as light leakage.

The stretching is performed preferably such that the slant angle between the polarization layer and the optical compensation layer matches an angle made by the transmission axis of two sheets of polarization plates laminated on both sides of a liquid crystal cell constituting an LCD and the longitudinal or lateral direction of the liquid crystal cell. The common slant angle is 45°. However, recently, transmission-type, reflection-type and semi-transmission-type LCDs of which the angle is not always 45° have been developed, so it is preferable that the stretching direction can be controlled optionally according to the design of LCDs.

(B-7) Liquid Crystal Display

Each liquid crystal mode using such an optical compensation film will be described.

(TN Mode Liquid Crystal Display)

TN mode liquid crystal displays are most often utilized as color TFT liquid crystal displays, and are described in many documents. The alignment state in a liquid crystal cell in black display of TN mode is such that rod-shaped liquid crystalline molecules stand up in the cell center part and they lie in the vicinities of the cell substrates.

(OCB Mode Liquid Crystal Display)

OCB mode liquid crystal displays are liquid crystal cells of bend alignment mode in which rod-shaped liquid crystalline molecules are aligned in substantially reverse directions (symmetrically) in the upper and lower parts of a liquid crystal cell. Liquid crystal displays using liquid crystal cells of bend alignment mode are disclosed in U.S. Pat. Nos. 4,583,825 and 5,410,422. Since rod-shaped liquid crystalline molecules are aligned symmetrically in the upper and lower parts of a liquid crystal cell, the liquid crystal cell of bend alignment mode has a self-optical compensation function. Therefore, this liquid crystal mode is also named OCB mode (Optically Compensatory Bend) liquid crystal mode.

OCB mode liquid crystal cells have an alignment state in liquid crystal cells in black display as in TN mode, the alignment state being such that rod-shaped liquid crystalline molecules stand up in the cell center part and they lie in the vicinities of the cell substrates.

(VA Mode Liquid Crystal Display)

VA mode has a feature that rod-shaped liquid crystalline molecules are substantially vertically aligned at the time of no voltage impressed. The VA mode liquid crystal cells include (1) a narrowly-defined VA mode liquid crystal cell in which rod-shaped liquid crystalline molecules are substantially vertically aligned at the time of no voltage impressed and they are substantially horizontally aligned at a time of a voltage impressed (described in Japanese Patent Application Laid-Open No. 2-176625), besides, (2) a (MVA mode) liquid crystal cell in which VA mode is made of multi-domain for enlarging viewing angle (described in SID97, Digest of Tech. Papers (proceedings), 28(1997), 845), (3) a liquid crystal cell of a mode (n-ASM mode) in which rod-shaped liquid crystalline molecules are substantially vertically aligned at the time of no voltage impressed and they are aligned in twisted multi-domain at a time of a voltage impressed (described in Proceedings of Japan Liquid Crystal Society Symposium, 58-59(1998)), and (4) a SURVAIVAL mode liquid crystal cell (presented at LCD International 98).

(IPS Mode Liquid Crystal Display)

IPS mode has a feature that rod-shaped liquid crystalline molecules are aligned substantially horizontally in the plane at the time of no voltage impressed, and a feature that this alignment direction of the liquid crystal is varied by the presence and absence of a voltage impression to perform switching. Usable IPS mode liquid crystal displays are specifically described in Japanese Patent Application Laid-Open Nos. 2004-365941, 2004-12731, 2004-215620, 2002-221726, 2002-55341 and 2003-195333.

(Other Liquid Crystal Displays)

ECB mode and STN mode can also be optically compensated under the same consideration as the above described.

(C) Imparting of a Reflection Preventing Layer (Reflection Preventing Film)

A reflection preventing film is formed generally by providing a low-refractive index layer being also an antifouling layer, and at least one layer having a refractive index higher than the low-refractive index layer (i.e. a high-refractive index layer, a middle-refractive index layer), on a transparent substrate.

Methods for forming a reflection preventing layer include a method in which a thin film as a multilayer film obtained by laminating transparent thin films of inorganic compounds (metal oxide, etc.) having different refractive indexes is formed by forming colloidal metal oxide particle films by the chemical vapor deposition (CVD) method, the physical vapor deposition (PVD) method, or the sol-gel method of metal compounds such as metal alkoxides and by post-treating (ultraviolet irradiation: Japanese Patent Application Laid-Open No. 9-157855, plasma treatment: Japanese Patent Application Laid-Open No. 2002-327310).

On the other hand, various types of reflection preventing films having a high productivity are proposed in which thin films in which inorganic particles are dispersed in a matrix are laminatedly coated.

The reflection preventing films also include one in which the reflection preventing film obtained by coating as described above has a reflection preventing layer as an uppermost layer whose surface has fine irregularities to impart antiglareness.

Any of the above-mentioned systems can apply to the cellulose acylate film of the present invention, but most preferably, the system of coating (coating type) can.

(C-1) Layer Structure of the Coating-Type Reflection Preventing Film

A reflection preventing film composed of a layer structure in order of at least a middle-refractive index layer, a high-refractive index layer and a low-refractive index layer (outmost layer) on a substrate is designed so as to have a refractive index satisfying the following relationship.

The refractive indexes have the relationship: a refractive index of a high-refractive index layer>a refractive index of a middle-refractive index layer>a refractive index of a transparent supporter>a refractive index of a low-refractive index layer. A hard coat layer may be provided between the transparent supporter and the middle-refractive index layer. Further, the reflection preventing film may be structured of a middle refractive index hard coat layer, a high-refractive index layer and a low-refractive index layer.

The reflection preventing films include, for example, those described in Japanese Patent Application Laid-Open Nos. 8-122504, 8-110401, 10-300902, 2002-243906 and 2000-111706. Further, another function may be imparted to each layer, and examples thereof include a low-refractive index layer having antiglareness and a high-refractive index layer having antistaticity (for example, Japanese Patent Application Laid-Open Nos. 10-206603 and 2002-243906).

The haze of a reflection preventing film is preferably not more than 5%, more preferably not more than 3%. The strength of the film is preferably not less than H in terms of the pencil harness test according to JIS K5400, more preferably not less than 2H, most preferably not less than 3H.

(C-2) High-Refractive Index Layer and Middle-Refractive Index Layer

A layer having a high refractive index of a reflection preventing film is composed of a curable film containing, at least, inorganic compound ultrafine particles having an average particle size of not more than 100 nm and a high refractive index, and a matrix binder.

The inorganic microparticle of a high refractive index includes an inorganic compound having a refractive index of not less than 1.65, preferably one having a refractive index of not less than 1.9. The inorganic microparticle includes, for example, oxides such as oxides of Ti, Zn, Sb, Sn, Zr, Ce, Ta, La and In, and compound oxides containing these metal atoms.

Making such ultrafine particles includes a treatment of the particle surface with a surface treating agent (for example, a silane coupling agent: Japanese Patent Application Laid-Open Nos. 11-295503, 11-153703 and 2000-9908, an anionic compound or an organometallic coupling agent: Japanese Patent Application Laid-Open No. 2001-310432, etc.), making a core-shell structure with a high refractive index particle as the core (Japanese Patent Application Laid-Open No. 2001-166104, etc.), and concurrent use of a specific dispersant (for example, Japanese Patent Application Laid-Open Nos. 11-153703 and 2002-2776069 and U.S. Pat. No. 6,210, 858B1).

Materials forming a matrix include conventionally well-known thermoplastic resins and thermosetting resins.

Further, preferable is at least a composition selected from a composition containing a polyfunctional compound containing at least two polymerizable groups of radically polymerizable and/or cationically polymerizable groups, and a composition composed of an organometallic compound containing a hydrolysable group and its partial condensate. These include, for example, compounds described in Japanese Patent Application Laid-Open Nos. 2000-47004, 2001-315242, 2001-31871 and 2001-296401.

Besides, a colloidal metal oxide obtained from a hydrolyzed condensate of a metal alkoxide, and a curable film obtained from a metal alkoxide composition are also preferable. These are described, for example, in Japanese Patent Application Laid-Open No. 2001-293818.

The refractive index of a high-refractive index layer is commonly 1.70 to 2.20. The thickness of a high-refractive index layer is preferably 5 nm to 10 μm, more preferably 10 nm to 1 μm.

The refractive index of a middle-refractive index layer is adjusted so as to be a value between the refractive index of a low-refractive index layer and the refractive index of a high-refractive index layer. The refractive index of a middle-refractive index layer is preferably 1.50 to 1.70.

(C-3) Low-Refractive Index Layer

A low-refractive index layer is formed by laminating it on a high-refractive index layer in order. The refractive index of a low-refractive index layer is 1.20 to 1.55, preferably 1.30 to 1.50.

A low-refractive index layer is preferably structured as an outermost layer having scratch resistance and fouling resistance. An effective method to largely improve the scratch resistance is imparting lubricity on the surface and conventionally well-known methods for thin films comprising incorporation of silicones and fluorine can be applied.

The refractive index of fluorine-containing compounds is preferably 1.35 to 1.50, more preferably 1.36 to 1.47. Further, the fluorine-containing compounds are preferably compounds containing a crosslinkable or polymerizable functional group containing fluorine atoms in the range of 35 to 80% by mass.

These include, for example, compounds described in paragraphs 0018 to 0026 of Japanese Patent Application Laid-Open No. 9-222503, paragraphs 0019 to 0030 of Japanese Patent Application Laid-Open No. 11-38202, paragraphs 0027 to 0028 of Japanese Patent Application Laid-Open No. 2001-40284, and Japanese Patent Application Laid-Open No. 2000-284102.

The silicone compounds are compounds having a polysiloxane structure, and are preferably those which contain a curable functional group or a polymerizable functional group in their polymer chains and have a crosslinking structure in the film. These include, for example, reactive silicones (for example, SILAPLANE, made by Chisso Corp.), a polysiloxane having silanol groups at both terminals (Japanese Patent Application Laid-Open No. 11-258403, etc.).

The crosslinking or polymerization reaction of a fluorine-containing polymer and/or a siloxane polymer having a crosslinkable or polymerizable group is preferably performed by irradiating with light or heating a coating composition for forming an outermost layer containing a polymerization initiator, a sensitizer and the like, simultaneously when applying the coating composition, or right after applying the coating composition.

In addition, a sol-gel curing film is preferable which is cured by condensation reaction of an organometallic compound such as a silane coupling agent, and a silane coupling agent containing a specific fluorine-containing hydrocarbon under coexistence of a catalyst. This includes, for example, a polyfluoroalkyl group-containing silane compound or its partially hydrolyzed condensate (compounds described in Japanese Patent Application Laid-Open Nos. 58-142958, 58-147483, 58-147484, 9-157582 and 11-106704) and a silyl compound containing a poly(perfluoroalkyl ether) group being a fluorine-containing long chain group (compounds described in Japanese Patent Application Laid-Open Nos. 2000-117902, 2001-48590 and 2002-53804).

The low-refractive index layer can contain, as additives other than the above described, fillers (for example, silicon dioxide (silica), inorganic compounds having an average primary particle size of 1 to 150 nm and a low refractive index such as fluorine-containing particles (magnesium fluoride, calcium fluoride and barium fluoride), and organic microparticles described in paragraphs 0020 to 0038 of Japanese Patent Application Laid-Open No. 11-3820), a silane coupling agent, a lubricant, a surfactant and the like.

In the case where the low-refractive index layer is positioned at an underlayer of an outermost layer, the low-refractive index layer may be formed by the vapor phase method (vacuum vapor deposition, sputtering, ion plating, plasma CVD or the like). The coating method is preferable because this can manufacture the layer inexpensively. The film thickness of a low-refractive index layer is preferably 30 to 200 nm, more preferably 50 to 150 nm, most preferably 60 to 120 nm.

(C-4) Hard Coat Layer

A hard coat layer is provided on the surface of a transparent supporter for imparting a physical strength to the reflection preventing film. Particularly, it is preferably provided between the transparent supporter and the above-mentioned high-refractive index layer.

The hard coat layer is preferably formed by a crosslinking reaction or a polymerization reaction of a curable compound by light and/or heat.

As a curable functional group, a photopolymerizable functional group is preferable, and an organometallic compound containing a hydrolysable functional group is preferably an organic alkoxysilyl group.

Specific examples of these compounds include the similar compounds as exemplified in the high-refractive index layer. Specific compositions constituting a hard coat include, for example, those described in Japanese Patent Application Laid-Open Nos. 2002-144913 and 2000-9908 and WO0/46617, etc.

A high-refractive index layer can serve simultaneously as a hard coat. In such a case, the layer is preferably formed by dispersing finely microparticles and making them contained in the hard coat layer by using the method described in the high-refractive index layer. The hard coat layer also can serve simultaneously as an antiglare layer (described later) to which an antiglare function is imparted by making the hard coat layer contain particles having an average particle size of 0.2 to 10 μm.

The film thickness of a hard coat layer can be designed suitably according to applications. The thickness of a hard coat layer is preferably 0.2 to 10 μm, more preferably 0.5 to 7 μm. The strength of a hard coat layer is preferably not less than H in terms of pencil hardness test according to JIS K5400, more preferably not less than 2H, most preferably not less than 3H. The less abrasion amount of test pieces after the Taber test in the Taber test according to JIS K5400 is more preferable.

(C-5) Forward Scattering Layer

A forward scattering layer is provided for imparting an improving effect on the viewing angle when the viewing angle is tilted in the vertical and horizontal directions in the case of applying to a liquid crystal display. The forward scattering layer can serve simultaneously as a hard coat function by dispersing microparticles having a different refractive index in the above-mentioned hard coat. These are described, for example, in Japanese Patent Application Laid-Open No. 11-38208 wherein the forward scattering factor is specified, Japanese Patent Application Laid-Open No. 2000-199809 wherein the relative refractive index of a transparent resin and a microparticle is set at a specified range, and Japanese Patent Application Laid-Open No. 2002-107512 wherein the haze value is prescribed at not less than 40%.

(C-6) Other Layers

Other than the layers described above, a primer layer, an antistatic layer, an undercoat layer and a protection layer may be provided.

(C-7) Coating Method

Each layer of the reflection preventing layer can be formed by coating of dip coating, air knife coating, curtain coating, roller coating, wire bar coating, gravure coating, microgravure coating or extrusion coating (U.S. Pat. No. 2,681,294).

(C-8) Antiglare Function

The reflection preventing film may also have an antiglare function, which scatters external light. The antiglare function is obtained by forming irregularities on the surface of the reflection preventing film. In the case where the reflection preventing film has an antiglare function, the haze of the reflection preventing film is preferably 3 to 30%, more preferably 5 to 20%, most preferably 7 to 20%.

Any methods for forming irregularities on the surface of a reflection preventing film can be applied as long as they can sufficiently keep the surface shape. The methods include, for example, a method in which irregularities are formed on a film surface by using microparticles in a low-refractive index layer (e.g. Japanese Patent Application Laid-Open No. 2000-271878), a method in which a surface-irregular film is formed by adding a small amount (0.1 to 50% by mass) of relatively large particles (particle size of 0.05 to 2 μm) to an underlayer (a high-refractive index layer, middle-refractive index layer or hard coat layer) of a low-refractive index layer, and a low-refractive index layer is provided on the surface-irregular film while keeping the shape (e.g. Japanese Patent Application Laid-Open Nos. 2000-281410, 2000-95893, 2001-100004 and 2001-281407), and a method in which an irregular shape is transferred on the surface after the outermost layer (antifouling layer) is coated (for example, as emboss processing methods, described in Japanese Patent Application Laid-Open Nos. 63-278839, 11-183710, 2000-275401, etc.).

Hereinafter, measuring methods used in the present invention will be described.

[1] Measuring Method of Re and Rth

A sample film is conditioned at a temperature of 25° C. at a humidity of 60% RH for at least 3 hours; thereafter, retardation values thereof are measured at 25° C. at 60% RH from the direction perpendicular to the sample film surface and the direction tilted through ±40° from the normal line of the film surface at a wavelength of 550 nm, by using an automatic birefringence tester (KOBRA-21ADH/PR, made by Oji Scientific Instruments Co., Ltd.). The in-plane retardation (Re) is calculated from the measurement value in the perpendicular direction; and the thickness-direction retardation (Rth) is calculated from the measurement values in the perpendicular direction and the ±40° direction.

[2] Re and Rth, and Re and Rth Variations in the Width Direction and Longitudinal Direction (1) Sampling in MD Direction 100 pieces of a size of 1 cm-square are cut out at intervals of 0.5 m in the longitudinal direction of the sample film.

(2) Sampling in TD Direction 50 pieces of a size of 1 cm-square are cut out at equal intervals over the entire width of the film.

(3) Measurements of Re and Rth

A sample film is conditioned at a temperature of 25° C. at a humidity of 60% RH for at least 3 hours; thereafter, retardation values thereof are measured at 25° C. at 60% RH from the direction perpendicular to the sample film surface and the direction tilted through ±40° from the normal line of the film surface at a wavelength of 550 nm, by using an automatic birefringence tester (KOBRA-21ADH/PR, made by Oji Scientific Instruments Co., Ltd.). The in-plane retardation (Re) is calculated from the measurement value in the perpendicular direction; and the thickness-direction retardation (Rth) is calculated from the measurement value in the perpendicular direction and the ±40° direction.

The total averages of the above sampling pieces are defined as Re and Rth.

(4) Variations of Re and Rth

The Re variation and the Rth variation were obtained by dividing respective differences between the corresponding maximum and minimum of the 100 pieces of the MD direction and the 50 pieces of the TD direction by respective average values thereof and by showing them as percentage.

[3] Evaluation of Thermal Resistance

A sample film was humidity-conditioned at a temperature of 25° C. at a humidity of 60% RH for at least 3 hours, then thermally treated at 60° C. at 90% RH for 24 hours, and then humidity-conditioned again at a temperature of 25° C. at a humidity of 60% RH for at least 3 hours. The size of the sample film was measured with a pin gauge to measure the size change before and after the thermal treatment. When both of the longitudinal size change rate and the lateral one were not more than 0.3%, the size change was evaluated as "G"; when one of or both of the change rates were more than 0.3%, that was evaluated as "B".

[4] Substitution Degree of Cellulose Acylates

The acyl substitution degree of a cellulose acylate was determined from 13C-NMR by a method described in Carbohydr. Res., 273(1995), 83-91 (Tezuka, et al.).

[5] Crystal Melting Peak Caloric Value by DSC

A sample film was measured for DSC using DSC-50, made by Shimadzu Corp., at a temperature rising rate of 10° C./min and the caloric value of an endothermic peak emerging right after Tg was calculated in J/g. Tg was simultaneously measured.

[6] Haze

A sample film was measured for haze using a turbidity meter NDH-1001DP, made by Nippon Denshoku Kogyo KK.

[7] Yellowness Index (YI Value)

The yellowishness (YI: yellowness index) was measured using Z-II OPTICAL SENSOR according to JIS K7105 6.3.

Pellets were measured by the reflection method and films were measured for tristimulus values, X, Y, Z, by the transmission method. YI value was calculated by the below expression using the tristimulus values, X, Y, Z.

$$YI=\{(1.28X-1.06Z)/Y\} \times 100$$

Further, YI values of a film were compared in terms of per mm by dividing the YI values calculated by the above expression by the thickness of the film.

[8] Molecular Weight

A film sample was dissolved in dichloromethane and the molecular weight was measured using GPC.

[9] Moisture Content

A Karl Fischer moisture titrator is used; the temperature in the furnace of the moisture vaporization apparatus is set at 150° C.; the Karl Fisher titrator is switched on; and the air is made to flow at 100 ml/min to measure the blank value.

EXAMPLES

Experiment 1

Films were manufactured by changing test conditions such as the surface roughness of an elastic roller, the outer cylinder thickness of the elastic roller, the temperature of the elastic roller, the surface roughness of a cooling roller, the temperature of the cooling roller, the periphery speed ratio of the elastic roller and the cooling roller and the maximum linear pressure. Then, the retardations, strengths, hazes and film formability of the obtained films were determined and evaluated. The results are shown in the table in FIGS. 5A and 5B. Conditions such as the substitution degree of cellulose acylates, the molecular weight, the shearing rate and the film thickness are as shown in the table.

As is clear from the table of FIGS. 5A and 5B, in the tests 8 and 9 in which the surface roughness of the elastic roller exceeded 100 nm, haze was generated and the retardation became impossible to measure. In the test 16 in which the periphery speed ratio of the elastic roller and the cooling roller was less than 0.99 and the test 19 in which that exceeded 1.01, the retardation became too large to manufacture films having Re and Rth of not more than 20 nm.

On the other hand, in the tests 10 and 11 in which the difference in surface temperature between the elastic roller and the cooling roller was less than 0.01° C., the film formability decreased. In the test 15 in which that exceeded 30° C., the retardation became too large to manufacture films having Rth of not more than 20 nm. Similarly, in the test 20 in which the maximum linear pressure was less than 0.3 MPa, the film formability decreases, and in the test 23 in which the maximum linear pressure exceeded 3.0, the retardation became large; so in both the tests, films having Re and Rth of not more than 20 nm could not be manufactured.

From the above results, the surface roughness of an elastic roller of not more than 100 nm, the periphery speed ratio of the elastic roller and a cooling roller of not less than 0.99 and not more than 1.01, the surface temperature difference between the elastic roller and the cooling roller of not less than 0.01° C. and not more than 30° C. and the maximum linear pressure of not less than 0.3 MPa and not more than 3 MPa, are needed. Manufacturing films under such conditions allowed providing favorable films even in a high film forming speed of 30 m/sec. Herein, in the above-mentioned tests, results only about films of 80 µm in thickness are shown, but films of 30 to 200 µm exhibited similar results.

Further, as is clear from the table in FIGS. 5A and 5B, in the test 23 in which the outer cylinder thickness of the elastic roller exceeded 7 mm, the retardation became too large to manufacture films having Rth of not more than 20 nm. In the test 1 in which the molecular weight was less than 70,000, the film strength decreases, and in the test 7 in which that exceeded 200,000, the film formability decreased. In the tests 6 and 7 in which the shear viscosity exceeded 2,000, the film formability decreased.

(Experiment 2)

Tests similar to Experiment 1 were conducted by using cyclic polyolefins and changing the kinds. Films were manufactured by changing test conditions such as the surface roughness of an elastic roller, the outer cylinder thickness of the elastic roller, the temperature of the elastic roller, the surface roughness of a cooling roller, the temperature of the cooling roller, the periphery speed ratio of the elastic roller and the cooling roller and the maximum linear pressure. Then, the retardations, strengths, hazes and film formability of the obtained films were determined and evaluated. The results are shown in the table in FIGS. 6A and 6B. Conditions such as the kind of cyclic polyolefin, the shearing rate, the extrusion temperature and the film thickness are as shown in the table.

As is clear from the table of FIGS. 6A and 6B, in the tests 26 and 27 in which the surface roughness of the elastic roller exceeded 100 nm, haze was generated and the retardation became impossible to measure. In the test 34 in which the periphery speed ratio of the elastic roller and the cooling roller was less than 0.99 and the test 37 in which that exceeded 1.01, the retardation became too large to manufacture films having Re and Rth of not more than 20 nm.

On the other hand, in the tests 28 and 29 in which the difference in surface temperature between the elastic roller and the cooling roller was less than 0.01° C., the film formability decreased. In the test 33 in which that exceeded 30° C., the retardation became too large to manufacture films having Rth of not more than 20 nm. Similarly, in the test 38 in which the maximum linear pressure was less than 0.3 MPa, the film formability decreases, and in the test 41 in which the maximum linear pressure exceeded 3.0, the retardation became large; so in both the tests, films having Re and Rth of not more than 20 nm could not be manufactured.

From the above results, the surface roughness of an elastic roller of not more than 100 nm, the periphery speed ratio of the elastic roller and a cooling roller of not less than 0.99 and not more than 1.01, the surface temperature difference between the elastic roller and the cooling roller of not less 0.01° C. than and not more than 30° C. and the maximum linear pressure of not less than 0.3 MPa and not more than 3 MPa, are needed. Manufacturing films under such conditions allowed providing favorable films even in a high film forming speed of 30 m/sec. Herein, in the above-mentioned tests, results only about films of 80 µm in thickness are shown, but films of 30 to 200 µm exhibited similar results.

As is clear from the table in FIGS. 6A and 6B, the cases where the shear viscosity exceeded 2,000 Pa·s exhibited the result of decreased extrudability from a die.

What is claimed is:

1. A method for manufacturing a thermoplastic resin film by a melt-film forming method, comprising:
   extruding a thermoplastic resin melted by an extruder from a die as a sheet-like melted resin;
   nipping the sheet-like melted resin between a metallic elastic roller and a cooling roller; and
   cooling and solidifying the sheet-like melted resin on the cooling roller, wherein
   an arithmetic average height Ra of surfaces of the elastic roller and the cooling roller is not more than 100 nm,
   a periphery speed ratio (Vcd/Vtr) of a periphery speed Vtr of the elastic roller and a periphery speed Vcd of the cooling roller is 0.99 to 1.01,
   a difference (Tcd−Ttr) between a surface temperature Ttr of the elastic roller and a surface temperature Tcd of the cooling roller is 0.01° C. to 30° C.,
   a maximum linear pressure which is applied to the sheet-like melted resin passing through a vicinity of a portion where a gap between the elastic roller and the cooling roller is narrowest when the sheet-like melted resin is nipped between the elastic roller and the cooling roller is 0.3 MPa to 3 MPa,
   wherein the metallic elastic roller includes a metallic shaft, a liquid medium layer covering over the metallic shaft and a metallic cylinder covering over the liquid medium layer and said metallic cylinder having a wall thickness of 1.5 mm to 5 mm,
   a surface temperature Ttr of the elastic roller is lower than a surface temperature Tcd of the cooling roller, and
   wherein retardation due to residual strain is not generated.

2. The method for manufacturing a thermoplastic resin film according to claim 1, wherein the cooling roller has a periphery speed of not less than 20 m/min.

3. The method for manufacturing a thermoplastic resin film according to claim 1, wherein
the thermoplastic resin has a weight-average molecular weight of 70,000 to 200,000; and where A denotes a substitution degree of an acetyl group and B denotes the sum total of substitution degrees of acyl groups having 3 to 7 carbon atoms, the acyl group satisfies the following substitution degree:

$$2.0 \leq A+B \leq 3.0$$

$$0.0 \leq A \leq 2.0$$

$$1.2 \leq B \leq 2.9.$$

4. The method for manufacturing a thermoplastic resin film according to claim 1, wherein the thermoplastic resin is a cyclic polyolefinic resin.

5. The method for manufacturing a thermoplastic resin film according to claim 1, wherein the thermoplastic resin has a zero-shear viscosity of not more than 2,000 Pa·s when the thermoplastic resin is discharged from the die.

6. The method for manufacturing a thermoplastic resin film according to claim 1, wherein the thermoplastic resin film has a thickness of 20 μm to 300 μm, an in-plane retardation Re of not more than 20 nm and a thickness-direction retardation Rth of not more than 20 nm.

7. The method of claim 1, wherein the elastic roller is formed such that the liquid medium layer is directly adjacent to the metallic cylinder covering.

8. The method for manufacturing a thermoplastic resin film according to claim 1, wherein retardation due to residual strain is not generated.

* * * * *